United States Patent
Liu et al.

(10) Patent No.: US 11,906,353 B2
(45) Date of Patent: Feb. 20, 2024

(54) DIGITAL PIXEL WITH EXTENDED DYNAMIC RANGE

(71) Applicant: Meta Platforms Technologies, LLC, Menlo Park, CA (US)

(72) Inventors: Xinqiao Liu, Medina, WA (US); Song Chen, Redmond, WA (US); Andrew Samuel Berkovich, Bellevue, WA (US); Wei Gao, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/435,451

(22) Filed: Jun. 7, 2019

(65) Prior Publication Data
US 2019/0376845 A1  Dec. 12, 2019

Related U.S. Application Data

(60) Provisional application No. 62/683,550, filed on Jun. 11, 2018.

(51) Int. Cl.
*G01J 1/44* (2006.01)

(52) U.S. Cl.
CPC ........... *G01J 1/44* (2013.01); *G01J 2001/446* (2013.01)

(58) Field of Classification Search
CPC .......... G01J 1/44; G01J 2001/446; G01J 1/46; G02B 27/017; H04N 5/3591;
(Continued)

(56) References Cited

U.S. PATENT DOCUMENTS 4,596,977 A   6/1986  Bauman et al.
5,053,771 A   10/1991 Mcdermott
(Continued)

FOREIGN PATENT DOCUMENTS

CN   1490878 A   4/2004
CN   1490878 A   4/2004
(Continued)

OTHER PUBLICATIONS

U.S. Appl. No. 16/436,049, "Notice of Allowance", dated Oct. 21, 2020, 8 pages.
(Continued)

*Primary Examiner* — John R Lee
(74) *Attorney, Agent, or Firm* — Kilpatrick Townsend & Stockton LLP

(57) ABSTRACT

In one example, an apparatus comprises a photodiode, a charge storage unit, and a processing circuits configured to: transfer overflow charge from the photodiode to the charge storage unit to develop a first voltage; compare the first voltage against a first ramping threshold voltage to generate a first decision; generate, based on the first decision, a first digital value; transfer residual charge from the photodiode to the charge storage unit to develop a second voltage; compare the second voltage against a static threshold voltage to determine whether the photodiode saturates to generate a second decision; compare the second voltage against a second ramping threshold voltage to generate a third decision; generate, based on the third decision, a second digital value; and output, based on the second decision, one of the first digital value or the second digital value to represent an intensity of light received by the photodiode.

24 Claims, 22 Drawing Sheets

(58) Field of Classification Search
CPC ............. H04N 5/37455; H04N 5/3559; H04N 5/35545; H04N 5/35554; H04N 25/00; H04N 25/40; H04N 25/60; H04N 23/64; H04N 25/57; H04N 25/772; H04N 25/77; H04N 25/76

See application file for complete search history.

(56) References Cited

U.S. PATENT DOCUMENTS

| | | |
|---|---|---|
| 5,650,643 A | 7/1997 | Konuma |
| 5,844,512 A | 12/1998 | Gorin et al. |
| 5,963,369 A | 10/1999 | Steinthal et al. |
| 6,181,822 B1 | 1/2001 | Miller et al. |
| 6,384,905 B1 | 5/2002 | Barrows |
| 6,522,395 B1 | 2/2003 | Bamji et al. |
| 6,529,241 B1 | 3/2003 | Clark |
| 6,864,817 B1 | 3/2005 | Salvi et al. |
| 6,963,369 B1 | 11/2005 | Olding |
| 7,326,903 B2 | 2/2008 | Ackland |
| 7,362,365 B1 | 4/2008 | Reyneri et al. |
| 7,659,772 B2 | 2/2010 | Nomura et al. |
| 7,659,925 B2 | 2/2010 | Krymski |
| 7,719,589 B2 | 5/2010 | Turchetta et al. |
| 7,880,779 B2 | 2/2011 | Storm |
| 7,956,914 B2 | 6/2011 | Xu |
| 8,134,623 B2 | 3/2012 | Purcell et al. |
| 8,144,227 B2 | 3/2012 | Kobayashi |
| 8,369,458 B2 | 2/2013 | Wong et al. |
| 8,426,793 B1 | 4/2013 | Barrows |
| 8,754,798 B2 | 6/2014 | Lin |
| 8,773,562 B1 | 7/2014 | Fan |
| 8,779,346 B2 | 7/2014 | Fowler et al. |
| 8,946,610 B2 | 2/2015 | Iwabuchi et al. |
| 9,001,251 B2 | 4/2015 | Smith et al. |
| 9,094,629 B2 | 7/2015 | Ishibashi |
| 9,185,273 B2 | 11/2015 | Beck et al. |
| 9,274,151 B2 | 3/2016 | Lee et al. |
| 9,282,264 B2 | 3/2016 | Park et al. |
| 9,332,200 B1 | 5/2016 | Hseih et al. |
| 9,343,497 B2 | 5/2016 | Cho |
| 9,363,454 B2 | 6/2016 | Ito et al. |
| 9,478,579 B2 | 10/2016 | Dai et al. |
| 9,497,396 B2 | 11/2016 | Choi |
| 9,531,990 B1 | 12/2016 | Wilkins et al. |
| 9,800,260 B1 | 10/2017 | Banerjee |
| 9,819,885 B2 | 11/2017 | Furukawa et al. |
| 9,832,370 B2 | 11/2017 | Cho et al. |
| 9,909,922 B2 | 3/2018 | Schweickert et al. |
| 9,948,316 B1 | 4/2018 | Yun et al. |
| 9,955,091 B1 | 4/2018 | Dai et al. |
| 9,967,496 B2 | 5/2018 | Ayers et al. |
| 10,003,759 B2 | 6/2018 | Fan |
| 10,015,416 B2 | 7/2018 | Borthakur et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,321,081 B2 | 6/2019 | Watanabe et al. |
| 10,345,447 B1 | 7/2019 | Hicks |
| 10,419,701 B2 | 9/2019 | Liu |
| 10,574,925 B2 | 2/2020 | Otaka |
| 10,594,974 B2 | 3/2020 | Ivarsson et al. |
| 10,598,546 B2 | 3/2020 | Liu |
| 10,608,101 B2 | 3/2020 | Liu |
| 10,686,996 B2 | 6/2020 | Liu |
| 10,726,627 B2 | 7/2020 | Liu |
| 10,750,097 B2 | 8/2020 | Liu |
| 10,764,526 B1 | 9/2020 | Liu et al. |
| 10,804,926 B2 | 10/2020 | Gao et al. |
| 10,812,742 B2 | 10/2020 | Chen et al. |
| 10,825,854 B2 | 11/2020 | Liu |
| 10,834,344 B2 | 11/2020 | Chen et al. |
| 10,897,586 B2 | 1/2021 | Liu et al. |
| 10,903,260 B2 | 1/2021 | Chen et al. |
| 10,917,589 B2 | 2/2021 | Liu |
| 10,951,849 B2 | 3/2021 | Liu |
| 10,969,273 B2 | 4/2021 | Berkovich et al. |
| 11,004,881 B2 | 5/2021 | Liu et al. |
| 11,057,581 B2 | 7/2021 | Liu |
| 11,595,598 B2* | 2/2023 | Liu .................. H04N 25/771 |
| 11,595,602 B2* | 2/2023 | Gao .................. H04N 25/75 |
| 11,729,525 B2* | 8/2023 | Liu .................. H04N 25/67 |
| | | 348/311 |
| 2002/0067303 A1 | 6/2002 | Lee et al. |
| 2002/0113886 A1 | 8/2002 | Hynecek |
| 2002/0118289 A1 | 8/2002 | Choi |
| 2003/0001080 A1 | 1/2003 | Kummaraguntla et al. |
| 2003/0020100 A1 | 1/2003 | Guidash |
| 2003/0049925 A1 | 3/2003 | Layman et al. |
| 2004/0095495 A1 | 5/2004 | Inokuma et al. |
| 2004/0118994 A1 | 6/2004 | Mizuno |
| 2004/0251483 A1 | 12/2004 | Ko et al. |
| 2005/0046715 A1 | 3/2005 | Lim et al. |
| 2005/0057389 A1 | 3/2005 | Krymski |
| 2005/0104983 A1 | 5/2005 | Raynor |
| 2005/0206414 A1 | 9/2005 | Cottin et al. |
| 2005/0237380 A1 | 10/2005 | Kakii et al. |
| 2005/0280727 A1 | 12/2005 | Sato et al. |
| 2006/0023109 A1 | 2/2006 | Mabuchi et al. |
| 2006/0146159 A1 | 7/2006 | Farrier |
| 2006/0157759 A1 | 7/2006 | Okita et al. |
| 2006/0158541 A1 | 7/2006 | Ichikawa |
| 2007/0013983 A1 | 1/2007 | Kitamura et al. |
| 2007/0076109 A1 | 4/2007 | Krymski |
| 2007/0076481 A1 | 4/2007 | Tennant |
| 2007/0092244 A1 | 4/2007 | Pertsel et al. |
| 2007/0102740 A1 | 5/2007 | Ellis-Monaghan et al. |
| 2007/0131991 A1 | 6/2007 | Sugawa |
| 2007/0208526 A1 | 9/2007 | Staudt et al. |
| 2007/0222881 A1 | 9/2007 | Mentzer |
| 2008/0001065 A1 | 1/2008 | Ackland |
| 2008/0007731 A1 | 1/2008 | Botchway et al. |
| 2008/0042888 A1 | 2/2008 | Danesh |
| 2008/0068478 A1 | 3/2008 | Watanabe |
| 2008/0088014 A1 | 4/2008 | Adkisson et al. |
| 2008/0191791 A1 | 8/2008 | Nomura et al. |
| 2008/0226170 A1 | 9/2008 | Sonoda |
| 2008/0226183 A1 | 9/2008 | Lei et al. |
| 2008/0266434 A1 | 10/2008 | Sugawa et al. |
| 2009/0002528 A1 | 1/2009 | Manabe et al. |
| 2009/0033588 A1 | 2/2009 | Kajita et al. |
| 2009/0040364 A1 | 2/2009 | Rubner |
| 2009/0091645 A1 | 4/2009 | Trimeche et al. |
| 2009/0128640 A1 | 5/2009 | Yumiki |
| 2009/0140305 A1 | 6/2009 | Sugawa |
| 2009/0219266 A1 | 9/2009 | Lim et al. |
| 2009/0224139 A1 | 9/2009 | Buettgen et al. |
| 2009/0237536 A1 | 9/2009 | Purcell et al. |
| 2009/0244346 A1 | 10/2009 | Funaki |
| 2009/0245637 A1 | 10/2009 | Barman et al. |
| 2009/0261235 A1* | 10/2009 | Lahav .................. H04N 5/37455 |
| | | 250/208.1 |
| 2009/0321615 A1 | 12/2009 | Sugiyama et al. |
| 2010/0013969 A1 | 1/2010 | Ui |
| 2010/0140732 A1 | 6/2010 | Eminoglu et al. |
| 2010/0194956 A1 | 8/2010 | Yuan et al. |
| 2010/0232227 A1* | 9/2010 | Lee .................. G11C 16/3454 |
| | | 365/185.19 |
| 2010/0276572 A1 | 11/2010 | Iwabuchi et al. |
| 2011/0049589 A1 | 3/2011 | Chuang et al. |
| 2011/0122304 A1 | 5/2011 | Sedelnikov |
| 2011/0149116 A1 | 6/2011 | Kim |
| 2011/0155892 A1 | 6/2011 | Neter et al. |
| 2011/0254986 A1 | 10/2011 | Nishimura et al. |
| 2012/0016817 A1 | 1/2012 | Smith et al. |
| 2012/0039548 A1 | 2/2012 | Wang et al. |
| 2012/0068051 A1 | 3/2012 | Ahn et al. |
| 2012/0092677 A1 | 4/2012 | Suehira et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0127284 A1 | 5/2012 | Bar-zeev et al. |
| 2012/0133807 A1 | 5/2012 | Wu et al. |
| 2012/0138775 A1 | 6/2012 | Cheon et al. |

(56) References Cited

U.S. PATENT DOCUMENTS

| | | |
|---|---|---|
| 2012/0153123 A1 | 6/2012 | Mao et al. |
| 2012/0188420 A1 | 7/2012 | Black et al. |
| 2012/0200499 A1 | 8/2012 | Osterhout et al. |
| 2012/0205520 A1 | 8/2012 | Hsieh et al. |
| 2012/0212465 A1 | 8/2012 | White et al. |
| 2012/0241591 A1 | 9/2012 | Wan et al. |
| 2012/0262616 A1 | 10/2012 | Sa et al. |
| 2012/0267511 A1 | 10/2012 | Kozlowski |
| 2012/0273654 A1 | 11/2012 | Hynecek et al. |
| 2012/0305751 A1 | 12/2012 | Kusuda |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0082313 A1 | 4/2013 | Manabe |
| 2013/0113969 A1 | 5/2013 | Manabe et al. |
| 2013/0126710 A1 | 5/2013 | Kondo |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0214127 A1 | 8/2013 | Ohya et al. |
| 2013/0214371 A1 | 8/2013 | Asatsuma et al. |
| 2013/0218728 A1 | 8/2013 | Hashop et al. |
| 2013/0221194 A1 | 8/2013 | Manabe |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0293752 A1 | 11/2013 | Peng et al. |
| 2013/0299674 A1 | 11/2013 | Fowler et al. |
| 2014/0021574 A1 | 1/2014 | Egawa |
| 2014/0042299 A1 | 2/2014 | Wan et al. |
| 2014/0042582 A1 | 2/2014 | Kondo |
| 2014/0070974 A1 | 3/2014 | Park et al. |
| 2014/0078336 A1* | 3/2014 | Beck .............. H04N 5/225 348/222.1 |
| 2014/0085523 A1 | 3/2014 | Hynecek |
| 2014/0176770 A1 | 6/2014 | Kondo |
| 2014/0211052 A1 | 7/2014 | Choi |
| 2014/0232890 A1 | 8/2014 | Yoo et al. |
| 2014/0247382 A1 | 9/2014 | Moldovan et al. |
| 2014/0306276 A1 | 10/2014 | Yamaguchi |
| 2014/0368687 A1 | 12/2014 | Yu et al. |
| 2015/0070544 A1 | 3/2015 | Smith et al. |
| 2015/0077611 A1 | 3/2015 | Yamashita et al. |
| 2015/0083895 A1 | 3/2015 | Hashimoto et al. |
| 2015/0085134 A1 | 3/2015 | Novotny et al. |
| 2015/0090863 A1 | 4/2015 | Mansoorian et al. |
| 2015/0172574 A1 | 6/2015 | Honda et al. |
| 2015/0179696 A1 | 6/2015 | Kurokawa et al. |
| 2015/0189209 A1 | 7/2015 | Yang et al. |
| 2015/0201142 A1 | 7/2015 | Smith et al. |
| 2015/0208009 A1 | 7/2015 | Oh et al. |
| 2015/0229859 A1* | 8/2015 | Guidash ............ H04N 5/378 348/308 |
| 2015/0237274 A1 | 8/2015 | Yang et al. |
| 2015/0279884 A1 | 10/2015 | Kusumoto |
| 2015/0281613 A1 | 10/2015 | Vogelsang et al. |
| 2015/0287766 A1 | 10/2015 | Kim et al. |
| 2015/0309311 A1 | 10/2015 | Cho |
| 2015/0309316 A1 | 10/2015 | Osterhout et al. |
| 2015/0312461 A1 | 10/2015 | Kim et al. |
| 2015/0312502 A1 | 10/2015 | Borremans |
| 2015/0312557 A1 | 10/2015 | Kim |
| 2015/0350582 A1 | 12/2015 | Korobov et al. |
| 2015/0358569 A1 | 12/2015 | Egawa |
| 2015/0358571 A1 | 12/2015 | Dominguez Castro et al. |
| 2015/0358593 A1 | 12/2015 | Sato |
| 2015/0381907 A1 | 12/2015 | Boettiger et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0028980 A1 | 1/2016 | Kameyama et al. |
| 2016/0037111 A1 | 2/2016 | Dai et al. |
| 2016/0078614 A1 | 3/2016 | Ryu et al. |
| 2016/0088253 A1 | 3/2016 | Tezuka |
| 2016/0100113 A1 | 4/2016 | Oh et al. |
| 2016/0100115 A1 | 4/2016 | Kusano |
| 2016/0111457 A1 | 4/2016 | Sekine |
| 2016/0112626 A1 | 4/2016 | Shimada |
| 2016/0118992 A1 | 4/2016 | Milkov |
| 2016/0165160 A1 | 6/2016 | Hseih et al. |
| 2016/0197117 A1 | 7/2016 | Nakata et al. |
| 2016/0204150 A1 | 7/2016 | Oh et al. |
| 2016/0210785 A1 | 7/2016 | Balachandreswaran et al. |
| 2016/0240570 A1 | 8/2016 | Bama et al. |
| 2016/0249004 A1 | 8/2016 | Saeki et al. |
| 2016/0255293 A1 | 9/2016 | Gesset |
| 2016/0277010 A1 | 9/2016 | Park et al. |
| 2016/0307945 A1 | 10/2016 | Madurawe |
| 2016/0307949 A1 | 10/2016 | Madurawe |
| 2016/0337605 A1 | 11/2016 | Ito |
| 2016/0353045 A1 | 12/2016 | Kawahito et al. |
| 2016/0360127 A1 | 12/2016 | Dierickx et al. |
| 2017/0013215 A1 | 1/2017 | Mccarten |
| 2017/0039906 A1 | 2/2017 | Jepsen |
| 2017/0041571 A1 | 2/2017 | Tyrrell et al. |
| 2017/0053962 A1 | 2/2017 | Oh et al. |
| 2017/0059399 A1 | 3/2017 | Suh et al. |
| 2017/0062501 A1 | 3/2017 | Velichko et al. |
| 2017/0069363 A1 | 3/2017 | Baker |
| 2017/0070691 A1 | 3/2017 | Nishikido |
| 2017/0099422 A1 | 4/2017 | Goma et al. |
| 2017/0099446 A1 | 4/2017 | Cremers et al. |
| 2017/0104021 A1 | 4/2017 | Park et al. |
| 2017/0104946 A1 | 4/2017 | Hong |
| 2017/0111600 A1 | 4/2017 | Wang et al. |
| 2017/0141147 A1 | 5/2017 | Raynor |
| 2017/0154909 A1 | 6/2017 | Ishizu |
| 2017/0170223 A1 | 6/2017 | Hynecek et al. |
| 2017/0195602 A1 | 7/2017 | Iwabuchi et al. |
| 2017/0201693 A1 | 7/2017 | Sugizaki et al. |
| 2017/0207268 A1 | 7/2017 | Kurokawa |
| 2017/0228345 A1 | 8/2017 | Gupta et al. |
| 2017/0251151 A1 | 8/2017 | Hicks |
| 2017/0270664 A1 | 9/2017 | Hoogi et al. |
| 2017/0272667 A1 | 9/2017 | Hynecek |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0310910 A1 | 10/2017 | Smith et al. |
| 2017/0318250 A1 | 11/2017 | Sakakibara et al. |
| 2017/0324917 A1 | 11/2017 | Mlinar et al. |
| 2017/0338262 A1 | 11/2017 | Hirata |
| 2017/0339327 A1 | 11/2017 | Koshkin et al. |
| 2017/0346579 A1 | 11/2017 | Barghi |
| 2017/0350755 A1 | 12/2017 | Geurts |
| 2017/0359497 A1 | 12/2017 | Mandelli et al. |
| 2017/0366766 A1 | 12/2017 | Geurts et al. |
| 2018/0019269 A1 | 1/2018 | Klipstein |
| 2018/0077368 A1 | 3/2018 | Suzuki |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0152650 A1 | 5/2018 | Sakakibara et al. |
| 2018/0167575 A1 | 6/2018 | Watanabe et al. |
| 2018/0175083 A1 | 6/2018 | Takahashi |
| 2018/0176545 A1 | 6/2018 | Aflaki Beni |
| 2018/0204867 A1 | 7/2018 | Kim et al. |
| 2018/0220093 A1 | 8/2018 | Murao et al. |
| 2018/0224658 A1 | 8/2018 | Teller |
| 2018/0227516 A1 | 8/2018 | Mo et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0376046 A1 | 12/2018 | Liu |
| 2018/0376090 A1 | 12/2018 | Liu |
| 2019/0035154 A1 | 1/2019 | Liu |
| 2019/0046044 A1 | 2/2019 | Tzvieli et al. |
| 2019/0052788 A1 | 2/2019 | Liu |
| 2019/0052821 A1 | 2/2019 | Berner et al. |
| 2019/0056264 A1 | 2/2019 | Liu |

(56) References Cited

U.S. PATENT DOCUMENTS

| | | | |
|---|---|---|---|
| 2019/0057995 A1 | 2/2019 | Liu | |
| 2019/0058058 A1 | 2/2019 | Liu | |
| 2019/0098232 A1 | 3/2019 | Mori et al. | |
| 2019/0104263 A1 | 4/2019 | Ochiai et al. | |
| 2019/0104265 A1 | 4/2019 | Totsuka et al. | |
| 2019/0110039 A1 | 4/2019 | Linde et al. | |
| 2019/0123088 A1 | 4/2019 | Kwon | |
| 2019/0141270 A1* | 5/2019 | Otaka | H04N 5/35527 |
| 2019/0149751 A1 | 5/2019 | Wise | |
| 2019/0157330 A1 | 5/2019 | Sato et al. | |
| 2019/0172227 A1 | 6/2019 | Kasahara | |
| 2019/0172868 A1 | 6/2019 | Chen et al. | |
| 2019/0191116 A1 | 6/2019 | Madurawe | |
| 2019/0246036 A1 | 8/2019 | Wu et al. | |
| 2019/0253650 A1 | 8/2019 | Kim | |
| 2019/0327439 A1 | 10/2019 | Chen et al. | |
| 2019/0331914 A1 | 10/2019 | Lee et al. | |
| 2019/0335151 A1 | 10/2019 | Rivard et al. | |
| 2019/0348460 A1 | 11/2019 | Chen et al. | |
| 2019/0355782 A1 | 11/2019 | Do et al. | |
| 2019/0363118 A1 | 11/2019 | Berkovich et al. | |
| 2019/0371845 A1 | 12/2019 | Chen et al. | |
| 2019/0376845 A1* | 12/2019 | Liu | H04N 25/772 |
| 2019/0379388 A1 | 12/2019 | Gao et al. | |
| 2019/0379827 A1 | 12/2019 | Berkovich et al. | |
| 2019/0379846 A1 | 12/2019 | Chen et al. | |
| 2020/0007800 A1 | 1/2020 | Berkovich et al. | |
| 2020/0053299 A1 | 2/2020 | Zhang et al. | |
| 2020/0059589 A1 | 2/2020 | Liu et al. | |
| 2020/0068189 A1 | 2/2020 | Chen et al. | |
| 2020/0186731 A1 | 6/2020 | Chen et al. | |
| 2020/0195875 A1 | 6/2020 | Berkovich et al. | |
| 2020/0217714 A1 | 7/2020 | Liu | |
| 2020/0228745 A1 | 7/2020 | Otaka | |
| 2020/0374475 A1 | 11/2020 | Fukuoka et al. | |
| 2021/0026796 A1 | 1/2021 | Graif et al. | |
| 2021/0099659 A1 | 4/2021 | Miyauchi et al. | |
| 2021/0185264 A1 | 6/2021 | Wong et al. | |
| 2021/0227159 A1 | 7/2021 | Sambonsugi | |
| 2021/0368124 A1 | 11/2021 | Berkovich et al. | |
| 2023/0080288 A1* | 3/2023 | Berkovich | G06F 3/011 348/38 |
| 2023/0092325 A1* | 3/2023 | Tsai | G02B 27/0172 348/308 |
| 2023/0239582 A1* | 7/2023 | Berkovich | H04N 25/78 348/272 |

FOREIGN PATENT DOCUMENTS

| | | |
|---|---|---|
| CN | 1728397 A | 2/2006 |
| CN | 1728397 A | 2/2006 |
| CN | 1812506 A | 8/2006 |
| CN | 1812506 A | 8/2006 |
| CN | 101753866 A | 6/2010 |
| CN | 103002228 A | 3/2013 |
| CN | 103207716 A | 7/2013 |
| CN | 104125418 A | 10/2014 |
| CN | 104204904 A | 12/2014 |
| CN | 104469195 A | 3/2015 |
| CN | 104469195 A | 3/2015 |
| CN | 104704812 A | 6/2015 |
| CN | 104733485 A | 6/2015 |
| CN | 104733485 A | 6/2015 |
| CN | 104754255 A | 7/2015 |
| CN | 104754255 A | 7/2015 |
| CN | 204633945 U | 9/2015 |
| CN | 105144699 A | 12/2015 |
| CN | 105529342 A | 4/2016 |
| CN | 105706439 A | 6/2016 |
| CN | 205666884 U | 10/2016 |
| CN | 106255978 A | 12/2016 |
| CN | 106791504 A | 5/2017 |
| CN | 107852473 A | 3/2018 |
| CN | 109298528 A | 2/2019 |
| DE | 202016105510 | 10/2016 |
| EP | 0675345 | 10/1995 |
| EP | 1681856 | 7/2006 |
| EP | 1732134 | 12/2006 |
| EP | 1746820 | 1/2007 |
| EP | 1788802 A1 | 5/2007 |
| EP | 2037505 A1 | 3/2009 |
| EP | 2063630 | 5/2009 |
| EP | 2538664 | 12/2012 |
| EP | 2804074 A2 | 11/2014 |
| EP | 2833619 | 2/2015 |
| EP | 3032822 | 6/2016 |
| EP | 3229457 A1 | 10/2017 |
| EP | 3258683 | 12/2017 |
| EP | 3425352 | 1/2019 |
| EP | 3439039 A1 | 2/2019 |
| EP | 3744085 A2 | 12/2020 |
| JP | h08195906 | 7/1996 |
| JP | 2001008101 A | 1/2001 |
| JP | 2002199292 A | 7/2002 |
| JP | 2003319262 A | 11/2003 |
| JP | 2005328493 A | 11/2005 |
| JP | 2006197382 A | 7/2006 |
| JP | 2006203736 A | 8/2006 |
| JP | 2007074447 A | 3/2007 |
| JP | 2011216966 A | 10/2011 |
| JP | 2012054495 A | 3/2012 |
| JP | 2012054876 A | 3/2012 |
| JP | 2012095349 A | 5/2012 |
| JP | 2013009087 A | 1/2013 |
| JP | 2013055581 A | 3/2013 |
| JP | 2013172203 A | 9/2013 |
| JP | 2013225774 A | 10/2013 |
| JP | 2014107596 A | 6/2014 |
| JP | 2014165733 A | 9/2014 |
| JP | 2014236183 A | 12/2014 |
| JP | 2015065524 A | 4/2015 |
| JP | 2015126043 A | 7/2015 |
| JP | 2015530855 A | 10/2015 |
| JP | 2015211259 A | 11/2015 |
| JP | 2016092661 A | 5/2016 |
| JP | 2016513942 A | 5/2016 |
| JP | 2017509251 A | 3/2017 |
| KR | 100574959 | 4/2006 |
| KR | 20080019652 A | 3/2008 |
| KR | 20090023549 A | 3/2009 |
| KR | 20110050351 | 5/2011 |
| KR | 20110134941 A | 12/2011 |
| KR | 20120058337 A | 6/2012 |
| KR | 20120117953 A | 10/2012 |
| KR | 20150095841 | 8/2015 |
| KR | 20160008267 A | 1/2016 |
| KR | 20160008287 | 1/2016 |
| TW | 201448184 A | 12/2014 |
| TW | 201719874 A | 6/2017 |
| TW | 201728161 A | 8/2017 |
| TW | I624694 B | 5/2018 |
| WO | 2006124592 A2 | 11/2006 |
| WO | 200612962 A1 | 1/2009 |
| WO | 2010117462 A1 | 10/2010 |
| WO | 2013099723 A1 | 7/2013 |
| WO | WO-2014055391 A2 | 4/2014 |
| WO | 2014144391 A1 | 9/2014 |
| WO | 2015135836 A1 | 9/2015 |
| WO | 2015182390 A1 | 12/2015 |
| WO | 2016014860 A1 | 1/2016 |
| WO | WO-2016095057 A1 | 6/2016 |
| WO | 2016194653 A1 | 12/2016 |
| WO | WO-2017003477 A1 | 1/2017 |
| WO | WO-2017013806 A1 | 1/2017 |
| WO | WO-2017047010 A1 | 3/2017 |
| WO | 2017058488 | 4/2017 |
| WO | 2017069706 | 4/2017 |
| WO | 2017169882 | 10/2017 |
| WO | WO-2017169446 A1 | 10/2017 |
| WO | WO-2019018084 A1 | 1/2019 |
| WO | WO-2019111528 A1 | 6/2019 |
| WO | WO-2019145578 A1 | 8/2019 |
| WO | 2019168929 | 9/2019 |

(56) References Cited

FOREIGN PATENT DOCUMENTS

OTHER PUBLICATIONS

U.S. Appl. No. 16/436,137, "Non-Final Office Action", dated Dec. 4, 2020, 12 pages.
U.S. Appl. No. 16/566,583, "Corrected Notice of Allowability", dated Dec. 11, 2020, 2 pages.
U.S. Appl. No. 15/668,241, Advisory Action dated Oct. 23, 2019, 5 pages.
U.S. Appl. No. 15/668,241, Final Office Action dated Jun. 17, 2019, 19 pages.
U.S. Appl. No. 15/668,241, Non-Final Office Action dated Dec. 21, 2018, 3 pages.
U.S. Appl. No. 15/668,241, Notice of Allowance dated Jun. 29, 2020, 8 pages.
U.S. Appl. No. 15/668,241, Notice of Allowance dated Mar. 5, 2020, 8 pages.
U.S. Appl. No. 15/668,241, Supplemental Notice of Allowability dated Apr. 29, 2020, 5 pages.
U.S. Appl. No. 15/719,345, Final Office Action dated Apr. 29, 2020, 14 pages.
U.S. Appl. No. 15/719,345, Non-Final Office Action dated Nov. 25, 2019, 14 pages.
U.S. Appl. No. 15/719,345, Notice of Allowance dated Aug. 12, 2020, 11 pages.
U.S. Appl. No. 15/801,216, Advisory Action dated Apr. 7, 2020, 3 pages.
U.S. Appl. No. 15/801,216, Final Office Action dated Dec. 26, 2019, 5 pages.
U.S. Appl. No. 15/801,216, Non-Final Office Action dated Jun. 27, 2019, 13 pages.
U.S. Appl. No. 15/801,216, Notice of Allowance dated Jun. 23, 2020, 5 pages.
U.S. Appl. No. 15/847,517, Non-Final Office Action dated Nov. 23, 2018, 21 pages.
U.S. Appl. No. 15/847,517, Notice of Allowance dated May 1, 2019, 11 pages.
U.S. Appl. No. 15/861,588, Non-Final Office Action dated Jul. 10, 2019, 11 pages.
U.S. Appl. No. 15/861,588, Notice of Allowance dated Nov. 26, 2019, 9 pages.
U.S. Appl. No. 15/876,061, Corrected Notice of Allowability dated Apr. 28, 2020, 3 pages.
U.S. Appl. No. 15/876,061, Non-Final Office Action dated Sep. 18, 2019, 23 pages.
U.S. Appl. No. 15/876,061, Notice of Allowability dated May 6, 2020, 2 pages.
U.S. Appl. No. 15/876,061, Notice of Allowance dated Feb. 4, 2020, 13 pages.
U.S. Appl. No. 15/927,896, Non-Final Office Action dated May 1, 2019, 10 pages.
U.S. Appl. No. 15/983,379, Notice of Allowance dated Oct. 18, 2019, 9 pages.
U.S. Appl. No. 15/983,391, Non-Final Office Action dated Aug. 29, 2019, 12 pages.
U.S. Appl. No. 15/983,391, Notice of Allowance dated Apr. 8, 2020, 8 pages.
U.S. Appl. No. 16/177,971, Final Office Action dated Feb. 27, 2020, 9 pages.
U.S. Appl. No. 16/177,971, Non-Final Office Action dated Sep. 25, 2019, 9 pages.
U.S. Appl. No. 16/177,971, Notice of Allowance dated Apr. 24, 2020, 6 pages.
U.S. Appl. No. 16/210,748, Final Office Action dated Jul. 7, 2020, 11 pages.
U.S. Appl. No. 16/210,748, Non-Final Office Action dated Jan. 31, 2020, 11 pages.
U.S. Appl. No. 16/249,420, Non-Final Office Action dated Jul. 22, 2020, 9 pages.
U.S. Appl. No. 16/286,355, Non-Final Office Action dated Oct. 1, 2019, 6 pages.
U.S. Appl. No. 16/286,355, Notice of Allowance dated Feb. 12, 2020, 7 pages.
U.S. Appl. No. 16/286,355, Notice of Allowance dated Jun. 4, 2020, 7 pages.
U.S. Appl. No. 16/369,763, Non-Final Office Action dated Jul. 22, 2020, 15 pages.
U.S. Appl. No. 16/382,015, Notice of Allowance dated Jun. 11, 2020, 11 pages.
U.S. Appl. No. 16/384,720, Non-Final Office Action dated May 1, 2020, 6 pages.
U.S. Appl. No. 16/384,720, Notice of Allowance dated Aug. 26, 2020, 8 pages.
U.S. Appl. No. 16/431,693, Notice of Allowance dated Jun. 24, 2020, 7 pages.
U.S. Appl. No. 16/435,449, Notice of Allowance dated Jul. 27, 2020, 8 pages.
U.S. Appl. No. 16/436,049, Non-Final Office Action dated Jun. 30, 2020, 11 pages.
U.S. Appl. No. 16/454,787, Notice of Allowance dated Apr. 22, 2020, 10 pages.
U.S. Appl. No. 16/454,787, Notice of Allowance dated Jul. 9, 2020, 9 pages.
U.S. Appl. No. 16/566,583, Final Office Action dated Apr. 15, 2020, 24 pages.
U.S. Appl. No. 16/566,583, Non-Final Office Action dated Jul. 27, 2020, 11 pages.
U.S. Appl. No. 16/566,583, Non-Final Office Action dated Oct. 1, 2019, 10 pages.
Cho et al., A Low Power Dual CDS for a Column-Parallel CMOS Image Sensor, Journal of Semiconductor Technology and Science, vol. 12, No. 4, Dec. 30, 2012, pp. 388-396.
European Application No. 18179838.0, Extended European Search Report dated May 24, 2019, 17 pages.
European Application 18179838.0, Partial European Search Report dated Dec. 5, 2018, 14 pages.
European Application No. 18179846.3, Extended European Search Report dated Dec. 7, 2018, 10 pages.
U.S. Appl. No. 15/719,345, "Notice of Allowance", dated Sep. 3, 2020, 12 pages.
U.S. Appl. No. 16/435,449, "Notice of Allowance", dated Sep. 16, 2020, 7 pages.
U.S. Appl. No. 16/454,787, "Notice of Allowance", dated Sep. 9, 2020, 9 pages.
U.S. Appl. No. 16/707,988, "Non-Final Office Action", dated Sep. 22, 2020, 15 pages.
U.S. Appl. No. 16/431,693, "Non-Final Office Action", dated Jan. 30, 2020, 6 pages.
U.S. Appl. No. 16/436,049, "Non-Final Office Action", dated Mar. 4, 2020, 9 pages.
European Application No. EP18179851.3, Extended European Search Report, dated Dec. 7, 2018, 8 pages.
European Application No. EP18188684.7, Extended European Search Report, dated Jan. 16, 2019, 10 pages.
European Application No. EP18188684.7, Office Action, dated Nov. 26, 2019, 9 pages.
European Application No. EP18188962.7, Extended European Search Report, dated Oct. 23, 2018, 8 pages.
European Application No. EP18188962.7, Office Action, dated Aug. 28, 2019, 6 pages.
European Application No. EP18188968.4, Extended European Search Report, dated Oct. 23, 2018, 8 pages.
European Application No. EP18188968.4, Office Action, dated Aug. 14, 2019, 5 pages.
European Application No. EP18189100.3, Extended European Search Report, dated Oct. 9, 2018, 8 pages.
Kavusi et al., Quantitative Study of High-Dynamic-Range Image Sensor Architectures, Proceedings of Society of Photo-Optical Instrumentation Engineers—The International Society for Optical Engineering, vol. 5301, Jun. 2004, pp. 264-275.
International Application No. PCT/US2018/039350, International Preliminary Report on Patentability, dated Jan. 9, 2020, 10 pages.

(56) References Cited

OTHER PUBLICATIONS

International Application No. PCT/US2018/039350, International Search Report and Written Opinion, dated Nov. 15, 2018, 13 pages.
International Application No. PCT/US2018/039352, International Search Report and Written Opinion, dated Oct. 26, 2018, 10 pages.
International Application No. PCT/US2018/039431, International Search Report and Written Opinion, dated Nov. 7, 2018, 14 pages.
International Application No. PCT/US2018/045661, International Search Report and Written Opinion, dated Nov. 30, 2018, 11 Pages.
International Application No. PCT/US2018/045666, International Preliminary Report on Patentability, dated Feb. 27, 2020, 11 pages.
International Application No. PCT/US2018/045666, International Search Report and Written Opinion, dated Dec. 3, 2018, 13 pages.
International Application No. PCT/US2018/045673, International Search Report and Written Opinion, dated Dec. 4, 2018, 13 pages.
International Application No. PCT/US2018/046131, International Search Report and Written Opinion, dated Dec. 3, 2018, 10 pages.
International Application No. PCT/US2018/064181, International Preliminary Report on Patentability, dated Jun. 18, 2020, 9 pages.
International Application No. PCT/US2018/064181, International Search Report and Written Opinion, dated Mar. 29, 2019, 12 pages.
International Application No. PCT/US2019/014044, International Search Report and Written Opinion, dated May 8, 2019, 11 pages.
International Application No. PCT/US2019/019756, International Search Report and Written Opinion, dated Jun. 13, 2019, 11 pages.
International Application No. PCT/US2019/025170, International Search Report and Written Opinion, dated Jul. 9, 2019, 11 pages.
International Application No. PCT/US2019/027727, International Search Report and Written Opinion, dated Jun. 27, 2019, 11 pages.
International Application No. PCT/US2019/031521, International Search Report and Written Opinion, dated Jul. 11, 2019, 11 pages.
International Application No. PCT/US2019/035724, International Search Report and Written Opinion, dated Sep. 10, 2019, 12 pages.
International Application No. PCT/US2019/036484, International Search Report and Written Opinion, dated Sep. 19, 2019, 10 pages.
International Application No. PCT/US2019/036492, International Search Report and Written Opinion, dated Sep. 25, 2019, 9 pages.
International Application No. PCT/US2019/036536, International Search Report and Written Opinion, dated Sep. 26, 2019, 14 pages.
International Application No. PCT/US2019/036575, International Search Report and Written Opinion, dated Sep. 30, 2019, 16 pages.
International Application No. PCT/US2019/039410, International Search Report and Written Opinion, dated Sep. 30, 2019, 11 pages.
International Application No. PCT/US2019/039758, International Search Report and Written Opinion, dated Oct. 11, 2019, 13 pages.
International Application No. PCT/US2019/047156, International Search Report and Written Opinion, dated Oct. 23, 2019, 9 pages.
International Application No. PCT/US2019/048241, International Search Report and Written Opinion, dated Jan. 28, 2020, 16 pages.
International Application No. PCT/US2019/049756, International Search Report and Written Opinion, dated Dec. 16, 2019, 8 pages.
International Application No. PCT/US2019/059754, International Search Report and Written Opinion, dated Mar. 24, 2020, 15 pages.
International Application No. PCT/US2019/065430, International Search Report and Written Opinion, dated Mar. 3, 2020, 15 pages.
Snoeij, A Low Power Column-Parallel 12-Bit ADC for CMOS Imagers, Institute of Electrical and Electronics Engineers Workshop on Charge-Coupled Devices and Advanced Image Sensors, Jun. 2005, pp. 169-172.
Tanner et al., Low-Power Digital Image Sensor for Still Picture Image Acquisition, Visual Communications and Image Processing, vol. 4306, Jan. 22, 2001, 8 pages.
Xu et al., A New Digital-Pixel Architecture for CMOS Image Sensor With Pixel-Level ADC and Pulse Width Modulation using a 0.18 Mu M CMOS Technology, Institute of Electrical and Electronics Engineers Conference on Electron Devices and Solid-State Circuits, Dec. 16-18, 2003, pp. 265-268.
International Application No. PCT/US2019/027729, International Search Report and Written Opinion, dated Jun. 27, 2019, 10 pages.
U.S. Appl. No. 16/566,583, "Corrected Notice of Allowability", dated Feb. 3, 2021, 2 pages.
U.S. Appl. No. 16/896,130, "Non-Final Office Action", dated Mar. 15, 2021, 16 pages.
International Search Report and Written Opinion for International Application No. PCT/US2021/065174 dated Mar. 28, 2022, 10 pages.
Office Action dated Mar. 15, 2022 for Japanese Patent Application No. 2020505830, filed on Aug. 9, 2018, 12 pages.
Corrected Notice of Allowance dated Mar. 7, 2022 for U.S. Appl. No. 17/150,925, filed Jan. 15, 2021, 2 Pages.
International Search Report and Written Opinion for International Application No. PCT/US2021/054327, dated Feb. 14, 2022, 8 pages.
Non-Final Office Action dated Mar. 2, 2022 for U.S. Appl. No. 17/127,670, filed Dec. 18, 2020, 18 pages.
Notice of Allowance dated Mar. 2, 2022 for U.S. Appl. No. 16/453,538, filed Jun. 26, 2019, 8 pages.
Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Notification of the First Office Action dated Oct. 28, 2021 for Chinese Application No. 2019800218483, filed Jan. 24, 2019, 17 pages.
Corrected Notice of Allowability dated Jul. 26, 2021 for U.S. Appl. No. 16/707,988, filed Dec. 9, 2019, 2 Pages.
Final Office Action dated Dec. 3, 2021 for U.S. Appl. No. 17/072,840, filed Oct. 16, 2020, 23 pages.
Non-Final Office Action dated Jul. 2, 2021 for U.S. Appl. No. 16/820,594, filed Mar. 16, 2020, 8 Pages.
Non-Final Office Action dated Jun. 8, 2021 for U.S. Appl. No. 17/072,840, filed Oct. 16, 2020, 7 Pages.
Notice of Allowance dated Nov. 3, 2020 for U.S. Appl. No. 16/566,583, filed Sep. 10, 2019, 11 Pages.
Notice of Allowance dated May 5, 2021 for U.S. Appl. No. 16/707,988, filed Dec. 9, 2019, 14 Pages.
Notice of Allowance dated Jan. 7, 2022 for U.S. Appl. No. 16/899,908, filed Jun. 12, 2020, 10 pages.
Notice of Allowance dated Jul. 8, 2021 for U.S. Appl. No. 17/150,925, filed Jan. 15, 2021, 10 Pages.
Notice of Allowance dated Jul. 13, 2021 for U.S. Application No. 16/896, 130, filed Jun. 8, 2020, 8 Pages.
Notice of Allowance dated Nov. 17, 2021 for U.S. Appl. No. 16/899,908, filed Jun. 12, 2020, 7 Pages.
Notice of Allowance dated Sep. 17, 2021 for U.S. Appl. No. 16/899,908, filed Jun. 12, 2020, 11 Pages.
Notice of Allowance dated Nov. 22, 2021 for U.S. Appl. No. 16/820,594, filed Mar. 16, 2020, 18 pages.
Notice of Allowance dated Nov. 22, 2021 for U.S. Appl. No. 16/820,594, filed Mar. 16, 2020, 8 pages.
Notice of Allowance dated Oct. 26, 2021 for U.S. Application No. 16/896, 130, filed Jun. 8, 2020, 8 Pages.
Office Action dated Sep. 30, 2021 for Taiwan Application No. 107124385, 17 Pages.
Office Action dated Mar. 17, 2022 for Taiwan Application No. 20180124384, 26 pages.
Office Action dated Mar. 29, 2022 for Japanese Patent Application No. 2020520431, filed on Jun. 25, 2018, 10 pages.
International Search Report and Written Opinion for International Application No. PCT/US2021/057966, dated Feb. 22, 2022, 15 pages.
Advisory Action dated Oct. 8, 2020 for U.S. Appl. No. 16/210,748, filed Dec. 5, 2018, 4 Pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.

(56) References Cited

OTHER PUBLICATIONS

Communication Pursuant Article 94(3) dated Dec. 23, 2021 for European Application No. 19744961.4, filed Jun. 28, 2019, 8 pages.
Communication Pursuant Article 94(3) dated Jan. 5, 2022 for European Application No. 19740456.9, filed Jun. 27, 2019, 12 pages.
Corrected Notice of dated Apr. 9, 2021 for U.S. Appl. No. 16/255,528, filed Jan. 23, 2019, 5 Pages.
Extended European Search Report for European Application No. 19743908.6, dated Sep. 30, 2020, 9 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Search Report and Written Opinion for International Application No. PCT/US2019/014904, dated Aug. 5, 2019, 7 Pages.
International Search Report and Written Opinion for International Application No. PCT/US2019/019765, dated Jun. 14, 2019, 9 Pages.
International Search Report and Written Opinion for International Application No. PCT/US2019/034007, dated Oct. 28, 2019, 18 Pages.
International Search Report and Written Opinion for International Application No. PCT/US2019/066805, dated Mar. 6, 2020, 9 Pages.
International Search Report and Written Opinion for International Application No. PCT/US2019/066831, dated Feb. 27, 2020, 11 Pages.
International Search Report and Written Opinion for International Application No. PCT/US2020/044807, dated Sep. 30, 2020, 12 Pages.
International Search Report and Written Opinion for International Application No. PCT/US2020/058097, dated Feb. 12, 2021, 09 Pages.
International Search Report and Written Opinion for International Application No. PCT/US2020/059636, dated Feb. 11, 2021, 18 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
International Search Report and Written Opinion for International Application No. PCT/US2021/041775, dated Nov. 29, 2021, 14 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Jan. 1, 2021 for U.S. Appl. No. 16/715,792, filed Dec. 16, 2019, 15 Pages.
Non-Final Office Action dated Sep. 2, 2021 for U.S. Appl. No. 16/910,844, filed Jun. 24, 2020, 7 Pages.
Non-Final Office Action dated May 7, 2021 for U.S. Appl. No. 16/421,441, filed May 23, 2019, 17 Pages.
Non-Final Office Action dated Jul. 10, 2020 for U.S. Appl. No. 16/255,528, filed Jan. 23, 2019, 27 Pages.
Non-Final Office Action dated May 14, 2021 for U.S. Appl. No. 16/716,050, filed Dec. 16, 2019, 16 Pages.
Non-Final Office Action dated Apr. 21, 2021 for U.S. Appl. No. 16/453,538, filed Jun. 26, 2019, 16 Pages.
Non-Final Office Action dated Apr. 21, 2021 for U.S. Appl. No. 17/083,920, filed Oct. 29, 2020, 17 Pages.
Non-Final Office Action dated Oct. 21, 2021 for U.S. Appl. No. 17/083,920, filed Oct. 29, 2020, 19 Pages.
Non-Final Office Action dated Jul. 25, 2019 for U.S. Appl. No. 15/909, 162, filed Mar. 1, 2018, 20 Pages.
Non-Final Office Action dated Apr. 27, 2021 for U.S. Appl. No. 16/829,249, filed Mar. 25, 2020, 9 Pages.
Notice of Allowance dated Apr. 1, 2021 for U.S. Appl. No. 16/255,528, filed Jan. 23, 2019, 7 Pages.
Notice of Allowance dated Nov. 2, 2021 for U.S. Appl. No. 16/453,538, filed Jun. 26, 2019, 8 Pages.
Notice of Allowance dated Dec. 8, 2021 for U.S. Appl. No. 16/829,249, filed Mar. 25, 2020, 6 pages.
Notice of Allowance dated Jul. 13, 2021 for U.S. Appl. No. 16/896,130, filed Jun. 8, 2020, 8 Pages.
Notice of Allowance dated Oct. 14, 2020 for U.S. Appl. No. 16/384,720, filed Apr. 15, 2019, 8 Pages.
Notice of Allowance dated Oct. 15, 2020 for U.S. Appl. No. 16/544, 136, filed Aug. 19, 2019, 11 Pages.
Notice of Allowance dated Apr. 16, 2021 for U.S. Appl. No. 16/715,792, filed Dec. 16, 2019, 10 Pages.
Notice of Allowance dated Mar. 18, 2020 for U.S. Appl. No. 15/909, 162, filed Mar. 1, 2018, 9 Pages.
Notice of Allowance dated Nov. 18, 2020 for U.S. Appl. No. 16/249,420, filed Jan. 16, 2019, 8 Pages.
Notice of Allowance dated Dec. 21, 2021 for U.S. Appl. No. 16/550,851, filed Aug. 26, 2019, 10 pages.
Notice of Allowance dated Dec. 22, 2021 for U.S. Appl. No. 16/910,844, filed Jun. 24, 2020, 7 pages.
Notice of Allowance dated Jan. 22, 2021 for U.S. Appl. No. 16/369,763, filed Mar. 29, 2019, 8 Pages.
Notice of Allowance dated Nov. 24, 2021 for U.S. Appl. No. 16/910,844, filed Jun. 24, 2020, 8 pages.
Notice of Allowance dated Aug. 25, 2021 for U.S. Appl. No. 16/715,792, filed Dec. 16, 2019, 9 Pages.
Notice of Allowance dated Oct. 26, 2021 for U.S. Appl. No. 16/896, 130, filed Jun. 8, 2020, 8 Pages.
Notice of Allowance dated Aug. 30, 2021 for U.S. Appl. No. 16/829,249, filed Mar. 25, 2020, 8 pages.
Notice of Reason for Rejection dated Nov. 16, 2021 for Japanese Application No. 2019- 571699, filed Jun. 25, 2018, 13 pages.
Office Action dated Jul. 3, 2020 for Chinese Application No. 201810821296, filed Jul. 24, 2018, 17 Pages.
Office Action dated Jul. 7, 2021 for European Application No. 19723902.3, filed Apr. 1, 2019, 3 Pages.
Office Action dated Jul. 7, 2021 for European Application No. 19737299.8, filed Jun. 11, 2019, 5 Pages.
Office Action dated Mar. 9, 2021 for Chinese Application No. 201810821296, filed Jul. 24, 2018, 10 Pages.
Office Action dated Dec. 14, 2021 for Japanese Application No. 2019571598, filed Jun. 26, 2018, 12 pages.
Office Action dated Jun. 28, 2020 for Chinese Application No. 201810821296, filed Jul. 24, 2018, 2 Pages.
Partial International Search Report and Provisional Opinion for International Application No. PCT/US2021/041775, dated Oct. 8, 2021, 12 pages.
Restriction Requirement dated Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Snoeij M.F., et al., "A low Power col. Parallel 12-bit ADC for CMOS Imagers," XP007908033, Jun. 1, 2005, pp. 169-172.
Non-Final Office Action dated Apr. 13, 2022 for U.S. Appl. No. 16/820,594, filed Mar. 16, 2020, 7 pages.
Notice of Allowance dated Jul. 5, 2022 for U.S. Appl. No. 16/899,908, filed Jun. 12, 2020, 10 pages.
Notice of Allowance dated Jun. 8, 2022 for U.S. Appl. No. 17/150,925, filed Jan. 15, 2021, 10 pages.

(56) References Cited

OTHER PUBLICATIONS

Office Action for European Application No. 18179851.3, dated May 19, 2022, 7 pages.
Office Action dated Jul. 5, 2022 for Korean Application No. 10-2020-7002533, filed Jun. 25, 2018, 13 pages.
Office Action dated May 18, 2022 for Taiwan Application No. 108122878, 24 pages.
Office Action dated Jul. 12, 2022 for Japanese Application No. 2019-571699, filed Jun. 25, 2018, 5 pages.
Office Action dated Jul. 19, 2022 for Japanese Application No. 2019571598, filed Jun. 26, 2018, 10 pages.
Notice of Allowance dated Oct. 21, 2022 for U.S. Appl. No. 16/899,908, filed Jun. 12, 2020, 10 pages.
Office Action dated Nov. 1, 2022 for Japanese Patent Application No. 2020-520431, filed Jun. 25, 2018, 11 pages.
Office Action dated Sep. 26, 2022 for Korean Patent Application No. 10-2020-7002496, filed Jun. 26, 2018, 17 pages.
Office Action dated Sep. 29, 2022 for Taiwan Application No. 108122878, filed Jun. 28, 2019, 9 pages.
Office Action dated Aug. 30, 2022 for Japanese Patent Application No. 2020505830, filed Aug. 9, 2018, 5 pages.
Corrected Notice of Allowability dated Jan. 9, 2023 for U.S. Appl. No. 17/150,925, filed Jan. 15, 2021, 8 pages.
Final Office Action dated Dec. 2, 2022 for U.S. Appl. No. 17/072,840, filed Oct. 16, 2020, 9 pages.
Notice of Allowance dated Dec. 6, 2022 for U.S. Appl. No. 16/896,130, filed Jun. 8, 2020, 8 pages.
Notice of Allowance dated Apr. 7, 2021 for U.S. Appl. No. 16/436,137, filed Jun. 10, 2019, 9 pages.
Notice of Allowance dated Feb. 10, 2023 for U.S. Appl. No. 16/899,908, filed Jun. 12, 2020, 9 pages.
Notice of Allowance dated Dec. 13, 2022 for U.S. Appl. No. 16/820,594, filed Mar. 16, 2020, 5 pages.
Notice of Allowance dated Nov. 21, 2022 for U.S. Appl. No. 17/242,152, filed Apr. 27, 2021, 10pages.
Notice of Allowance dated Dec. 22, 2022 for U.S. Appl. No. 17/496,712, filed Oct. 7, 2021, 13 pages.
Office Action dated Nov. 2, 2022 for Taiwan Application No. 107128759, filed Aug. 17, 2018, 16 pages.
Office Action dated Dec. 1, 2022 for Korean Application No. 10-2020-7002306, filed Jun. 25, 2018, 13 pages.
Office Action dated Nov. 15, 2022 for Taiwan Application No. 108120143, filed Jun. 11, 2019, 8 pages.
Office Action dated Jan. 5, 2023 for Chinese Application No. 201980043907.7, filed Jun. 28, 2019, 14 pages.
Office Action dated Feb. 7, 2023 for Japanese Application No. 2019-571699, filed Jun. 25, 2018, 5 pages.
Corrected Notice of Allowance dated Aug. 9, 2023 for U.S. Appl. No. 17/072,840, filed Oct. 16, 2020, 3 pages.
International Preliminary Report on Patentability for International Application No. PCT/US2021/054327, dated Apr. 20, 2023, 7 pages.
International Preliminary Report on Patentability for International Application No. PCT/US2021/057966, dated May 19, 2023, 12 pages.
International Preliminary Report on Patentability for International Application No. PCT/US2021/065174 dated Jul. 13, 2023, 9 pages.
Notice of Allowance dated Jun. 1, 2023 for U.S. Appl. No. 16/899,908, filed Jun. 12, 2020, 9 pages.
Notice of Allowance dated Mar. 1, 2023 for U.S. Appl. No. 17/242,152, filed Apr. 27, 2021, 9 pages.
Notice of Allowance dated Jul. 7, 2023 for U.S. Appl. No. 16/896,130, filed Jun. 8, 2020, 8 pages.
Notice of Allowance dated Apr. 13, 2023 for U.S. Appl. No. 17/072,840, filed Oct. 16, 2020, 6 pages.
Notice of Allowance dated Jun. 16, 2023 for U.S. Appl. No. 17/242,152, filed Apr. 27, 2021, 9 pages.
Notice of Allowance dated Mar. 17, 2023 for U.S. Appl. No. 16/896,130, filed Jun. 8, 2020, 8 pages.
Notice of Allowance dated Aug. 18, 2023 for U.S. Appl. No. 17/496,712, filed Oct. 7, 2021, 12 pages.
Notice of Allowance dated Jul. 19, 2023 for U.S. Appl. No. 16/820,594, filed Mar. 16, 2020, 5 pages.
Notice of Allowance dated Apr. 24, 2023 for U.S. Appl. No. 17/496,712, filed Oct. 7, 2021, 12 pages.
Notice of Allowance dated Mar. 27, 2023 for U.S. Appl. No. 16/820,594, filed Mar. 16, 2020, 5 pages.
Notice of Allowance dated Jul. 31, 2023 for U.S. Appl. No. 17/072,840, filed Oct. 16, 2020, 6 pages.
Office Action dated Jul. 4, 2023 for Korean Application No. 10-2020-7002533, filed Jun. 25, 2018, 3 pages.
Office Action dated Jun. 1, 2023 for Korean Application No. 10-2020-7002306, filed Jun. 25, 2018, 3 pages.
Office Action dated Mar. 10, 2023 for Chinese Application No. 201880053600.0, filed Jun. 25, 2018, 10 pages.
Office Action dated Feb. 15, 2023 for Chinese Application No. 201980049477.X, filed Jun. 11, 2019, 19 pages.
Office Action dated Mar. 16, 2023 for Korean Patent Application No. 10-2020-7002496, filed Jun. 26, 2018, 3 pages.
Office Action dated Jul. 4, 2023 for Japanese Application No. 2019571598, filed Jun. 26, 2018, 34 pages.
Office Action dated May 9, 2023 for Japanese Patent Application No. 2020-5204312, filed Jun. 25, 2018, 6 pages.
Office Action dated May 9, 2023 for Japanese Patent Application No. 2020-563959, filed Nov. 12, 2020, 5 pages.

\* cited by examiner

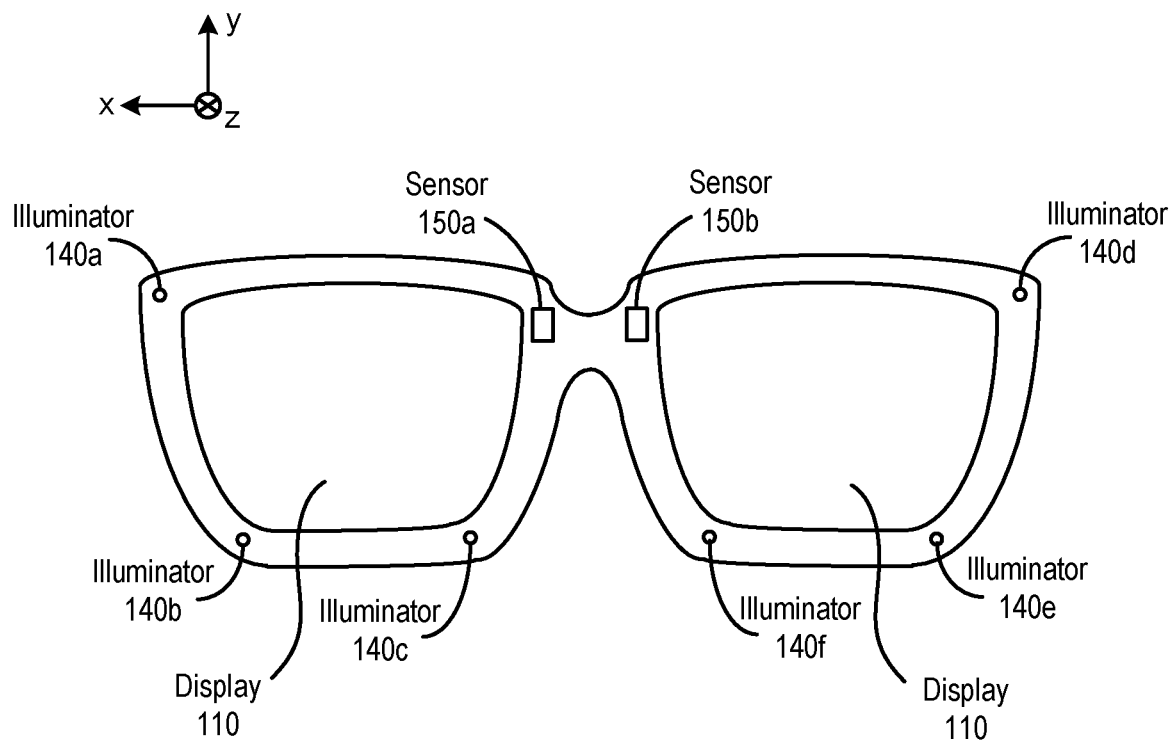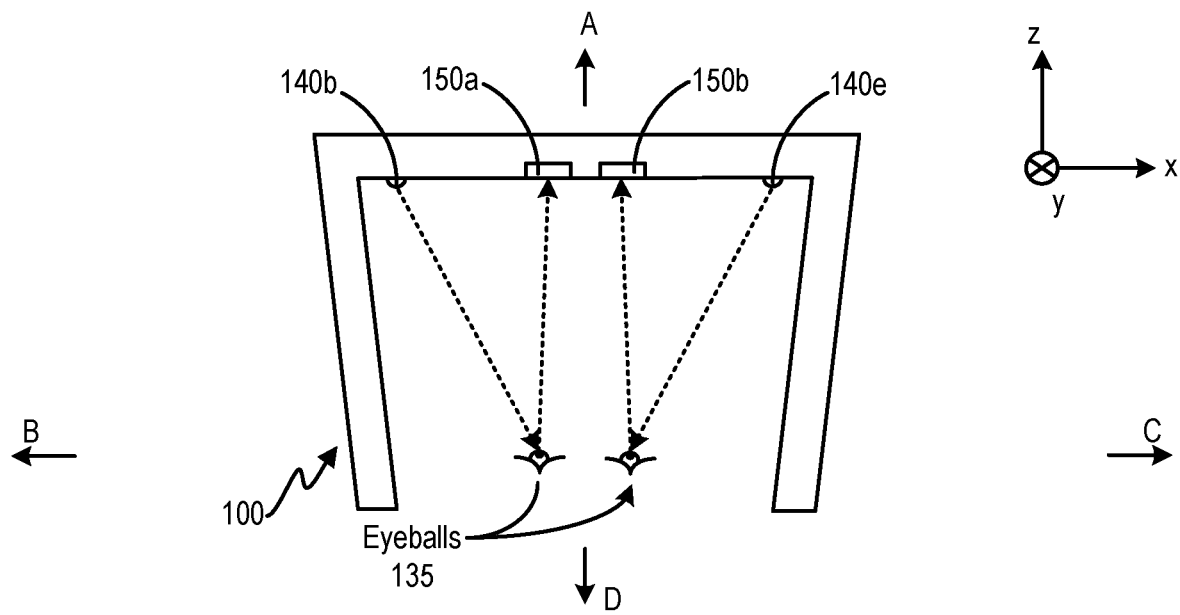
FIG. 1B

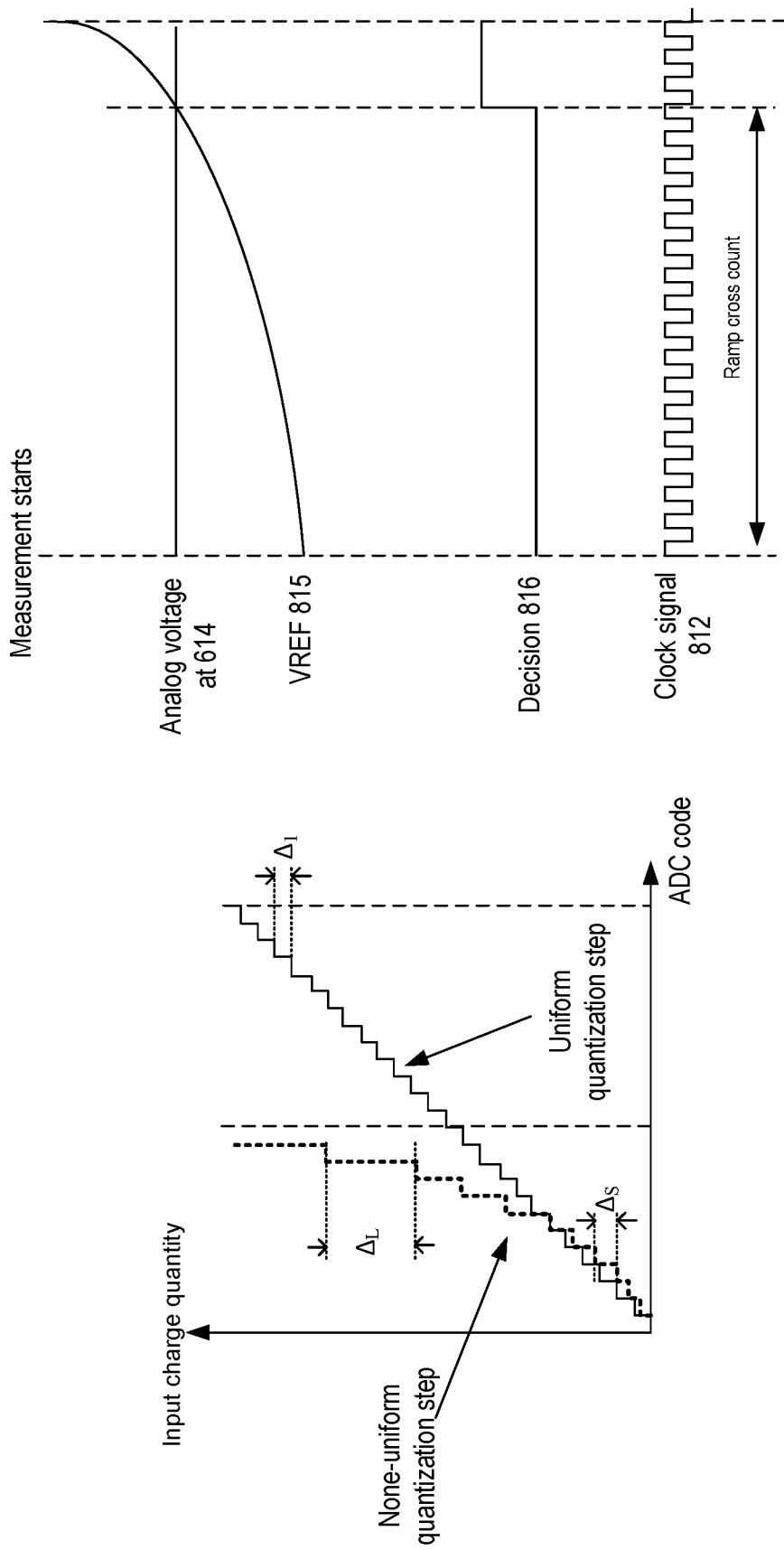

DIGITAL PIXEL WITH EXTENDED DYNAMIC RANGE

RELATED APPLICATION

This patent application claims priority to U.S. Provisional Patent Application Ser. No. 62/683,550, filed Jun. 11, 2018, entitled "DIGITAL PIXEL SENSOR WITH MULTIPLE QUANTIZATION MODES," which is assigned to the assignee hereof and is incorporated herein by reference in its entirety for all purposes.

BACKGROUND

The disclosure relates generally to image sensors, and more specifically to pixel cell structure including interfacing circuitries for determining light intensity for image generation.

A typical image sensor includes a photodiode to sense incident light by converting photons into charge (e.g., electrons or holes). The image sensor further includes a floating node configured as a capacitor to collect the charge generated by the photodiode during an exposure period. The collected charge can develop a voltage at the capacitor. The voltage can be buffered and fed to an analog-to-digital converter (ADC), which can quantize the voltage into a digital value representing the intensity of the incident light. The accuracy of the quantization, however, can be affected by various noise sources, such as dark current at the floating node.

SUMMARY

The present disclosure relates to image sensors. More specifically, and without limitation, this disclosure relates to a pixel cell. This disclosure also relates to operating the circuitries of pixel cells to measure the intensity of incident lights in different measurement modes.

The present disclosure provides an apparatus for measuring intensity of incident light.

In one example, an apparatus is provided. The apparatus comprises a photodiode, a charge storage unit, and processing circuits. The processing circuits are configured to: transfer overflow charge from the photodiode to the charge storage unit to develop a first voltage; compare the first voltage against a first ramping threshold voltage to generate a first decision; generate, based on the first decision, a first digital value; transfer residual charge from the photodiode to the charge storage unit to develop a second voltage; compare the second voltage against a static threshold voltage to determine whether the photodiode saturates to generate a second decision; compare the second voltage against a second ramping threshold voltage to generate a third decision; generate, based on the third decision, a second digital value; and output, based on the second decision, one of the first digital value or the second digital value to represent an intensity of light received by the photodiode.

In some aspects, the static threshold voltage is based on a third voltage developed at the charge storage unit when storing a quantity of the residual charge equal to a saturation capacity of the photodiode.

In some aspects, the static threshold voltage is further based on a voltage offset representing a dark charge deposited by dark current.

In some aspects, the second ramping threshold voltage starts or ends from the static threshold voltage.

In some aspects, the apparatus further comprises a counter and a memory. The processing circuits are configured to: store, based on the first decision, a first count value from the counter in the memory as the first digital value; store, based on the third decision, a second count value from the counter in the memory as the second digital value; and output, from the memory, one of the first digital value or the second digital value based on the second decision.

In some aspects, the processing circuits are configured to overwrite the first count value with the second count value in the memory based on the second decision.

In some aspects, the apparatus further comprises a register. The processing circuits are configured to: store a first flag value indicating the second decision in the register; and output, from the memory, one of the first digital value or the second digital value based on the first flag value from the register.

In some aspects, the processing circuits are configured to: determine a status of the first decision when the first ramping threshold voltage reaches a first breakpoint voltage; store a second flag value indicating the status of the first decision in the register; and output one of the first digital value or the second digital value based on the first flag value and the second flag value from the register.

In some aspects, the processing circuits are configured to reset the counter when the first ramping threshold voltage reaches the first breakpoint voltage.

In some aspects, the processing circuits are configured to: determine a status of the third decision when the second ramping threshold voltage reaches a second breakpoint voltage; store a second flag value indicating the status of the third decision in the register; and output one of the first digital value or the second digital value based on the first flag value and the second flag value from the register.

In some aspects, the processing circuits are configured to reset the counter when the first ramping threshold voltage reaches the second breakpoint voltage.

In some aspects, the static threshold voltage is a first static threshold voltage. The processing circuits are configured to: compare the first voltage against a second static threshold voltage representing a saturation capacity of the charge storage unit to generate a fourth decision; store a second flag value indicating the fourth decision in the register; store, based on the fourth decision, a third count value from the counter as a third digital value; and output, based on the first flag value and the second flag value, one of the first digital value, the second digital value or the third digital value to represent the intensity of light received by the photodiode.

In some aspects, the processing circuits are configured to: compare the first voltage against the second static threshold voltage within a pre-determined time period; determine a first status of the fourth decision when a pre-determined portion of the time period has elapsed; store the first flag value indicating the first status of the fourth decision in the register; determine a second status of the fourth decision when the time period has elapsed; store the second flag value indicating the second status of the fourth decision in the register; and output, based on the first flag value and the second flag value, one of the first digital value, the second digital value or the third digital value to represent the intensity of light received by the photodiode.

In some aspects, the processing circuits are configured to reset the counter when the pre-determined portion of the time period has elapsed.

In some aspects, a charge storage capacity of the charge storage unit is configurable by the processing circuit. The processing circuits are configured to: configure the charge storage unit to have a first capacity to develop the first voltage; and configure the charge storage unit to have a second capacity smaller than the first capacity to develop the second voltage.

In some aspects, the charge storage unit comprises a floating drain node and a capacitor.

In one example, a method is provided. The method comprises: transferring overflow charge from a photodiode to a charge storage unit to develop a first voltage; comparing the first voltage against a first ramping threshold voltage to generate a first decision; generating, based on the first decision, a first digital value; transferring residual charge from the photodiode to the charge storage unit to develop a second voltage; comparing the second voltage against a static threshold voltage to determine whether the photodiode saturates to generate a second decision; comparing the second voltage against a second ramping threshold voltage to generate a third decision; generating, based on the third decision, a second digital value; and outputting, based on the second decision, one of the first digital value or the second digital value to represent an intensity of light received by the photodiode.

In some aspects, the static threshold voltage is based on a third voltage developed at the charge storage unit when storing a quantity of the residual charge equal to a saturation capacity of the photodiode, and based on a voltage offset representing a dark charge deposited by dark current.

In some aspects, the second ramping threshold voltage starts or ends from the static threshold voltage.

In some aspects, the method further comprises: storing, based on the first decision, a first count value from a counter in a memory as the first digital value; storing, based on the third decision, a second count value from the counter in the memory as the second digital value; and outputting, from the memory, one of the first digital value or the second digital value based on the second decision.

BRIEF DESCRIPTION OF THE DRAWINGS

Illustrative examples are described with reference to the following figures.

FIG. 1A and FIG. 1B are diagrams of an example of a near-eye display.

FIG. 10A and FIG. 10B illustrate techniques for performing quantization.

Figure 1A:
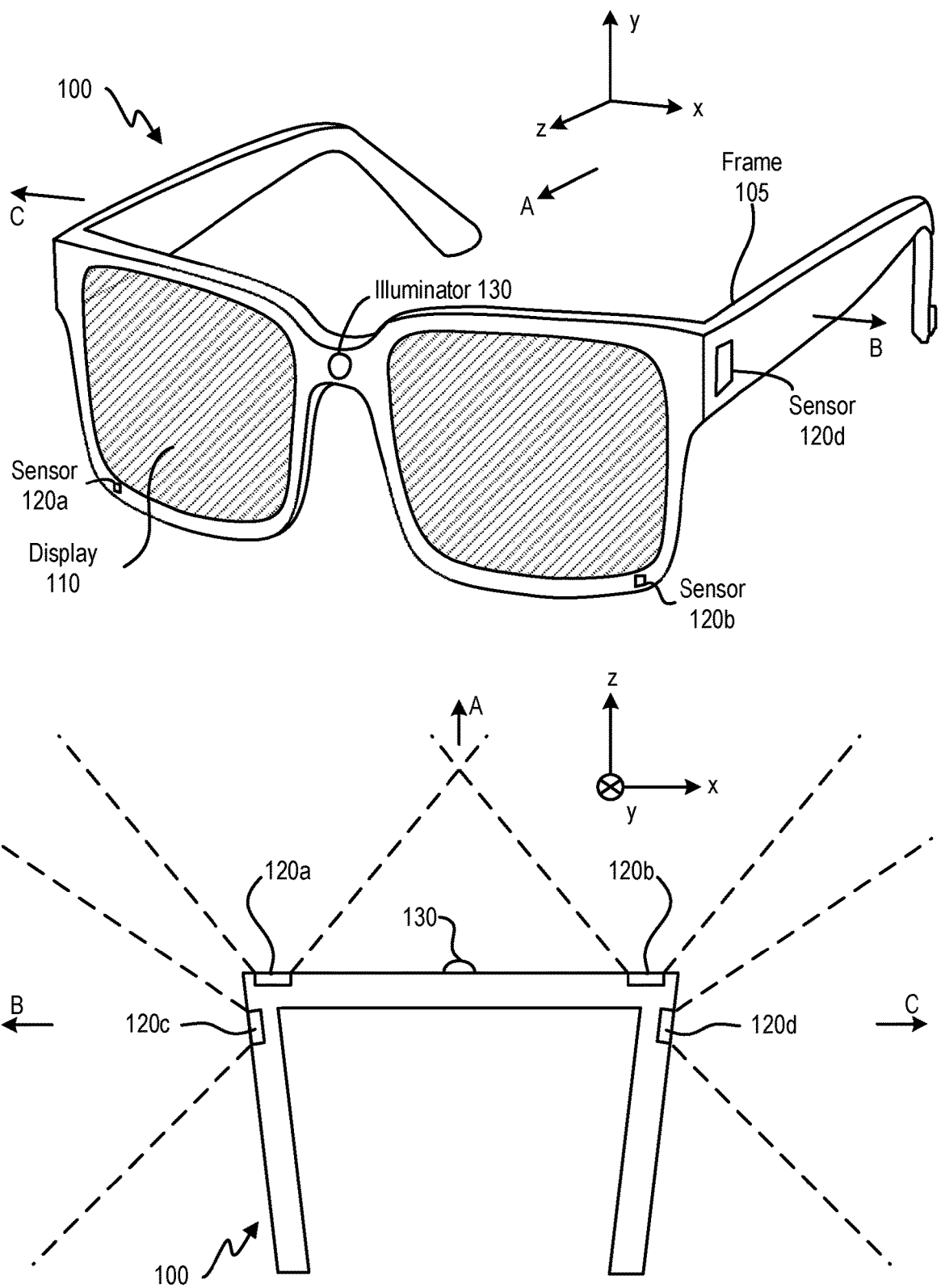

The figures depict examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive.

A typical image sensor includes a photodiode to sense incident light by converting photons into charge (e.g., electrons or holes). The image sensor further includes a floating node configured as a capacitor to collect the charge generated by the photodiode during an exposure period. The collected charge can develop a voltage at the capacitor. The voltage can be buffered and fed to an analog-to-digital converter (ADC), which can convert the voltage into a digital value representing the intensity of the incident light.

The digital value generated by the ADC, which reflects a quantity of charge stored at the floating node within a certain period, may correlate to the intensity of the incident light. However, the degree of correlation can be affected by different factors. First, the quantity of charge stored in the floating node can be directly related to the intensity of the incident light until the floating node reaches a saturation limit. Beyond the saturation limit, the floating node may be unable to accept additional charge generated by the photodiode, and the additional charge may be leaked and not stored. As a result, the quantity of the charge stored at the floating node may be lower than the quantity of charge actually generated by the photodiode. The saturation limit may determine an upper limit of the measureable light intensity of the image sensor.

Various factors can also set a lower limit of the measureable light intensity of the image sensor. For example, the charge collected at the floating node may include noise charge not related to the intensity of incident light, as well as dark charge contributed by dark current. Dark current can include leakage currents generated at the p-n junction of the photodiode and at the p-n junctions of other semiconductor devices connected to the capacitor, due to crystallographic defects. The dark currents can flow into the capacitor and add charges which are not correlated to the intensity of the incident light. The dark current generated at the photodiode is typically less than the dark current generated at other semiconductor devices. Another source of noise charge can be capacitive coupling with other circuitries. For example, when the ADC circuitries perform read operations to determine the quantity of charge stored in the floating node, the ADC circuitries can introduce noise charge into the floating node through capacitive coupling.

Besides noise charge, the ADC can also introduce measurement errors in determining the quantity of charge. The measurement errors can degrade the degree of correlation between the digital output and the intensity of the incident light. One source of measurement error is quantization error. In a quantization process, a discrete set of quantity levels can be used to represent a continuous set of quantities of charge, with each quantity level representing a pre-determined quantity of charge. The ADC can compare an input quantity of charge against the quantity levels, determine the quantity level that is closest to the input quantity, and output the determined quantity level (e.g., in the form of digital codes representing the quantity level). Quantization error can occur when there is a mismatch between a quantity of charge represented by the quantity level and the input quantity of charge mapped to the quantity level. The quantization error can be reduced with smaller quantization step sizes (e.g., by reducing the difference in charge quantities between two adjacent quantity levels). Other sources of measurement error may also include, for example, device noises (e.g., of the ADC circuitries) and comparator offsets that add to uncertainties in the measurement of the quantity of charge. The noise charge, dark charge, as well as the ADC measurement errors, can define a lower limit of the measureable light intensity of the image sensor, whereas the saturation limit may determine an upper limit of the measureable light intensity of the image sensor. A ratio between the upper limit and the lower limit defines a dynamic range, which may set a range of operational light intensities for the image sensor.

Image sensors can be found in many different applications. As an example, image sensors are included in digital imaging devices (e.g., digital cameras, smart phones, etc.) to provide digital imaging. As another example, image sensors can be configured as input devices to control or influence the operation of a device, such as controlling or influencing the display content of a near-eye display in wearable virtual-reality (VR) systems and/or augmented-reality (AR) and/or mixed reality (MR) systems. For example, the image sensors can be used to generate physical image data of a physical environment in which a user is located. The physical image data can be provided to a location tracking system operating a simultaneous localization and mapping (SLAM) algorithm to track, for example, a location of the user, an orientation of the user, and/or a path of movement of the user in the physical environment. The image sensors can also be used to generate physical image data including stereo depth information for measuring a distance between the user and an object in the physical environment. The image sensors can also be configured as a near-infrared (NIR) sensor. An illuminator may project a pattern of NIR light into the eyeballs of the user. The internal structures of the eyeballs (e.g., the pupils) may generate a reflective pattern from the NIR light. The image sensors can capture images of the reflective pattern, and provide the images to a system to track the movement of the eyeballs of the user to determine a gaze point of the user. Based on these physical image data, the VR/AR/MR system may generate and update virtual image data for displaying to the user via the near-eye display, to provide an interactive experience to the user. For example, the VR/AR/MR system may update the virtual image data based on the user's gazing direction (which may signal the user's interest in the object), a location of the user, etc.

A wearable VR/AR/MR system may operate in environments with a very wide range of light intensities. For example, the wearable VR/AR/MR system may be able to operate in an indoor environment or in an outdoor environment, and/or at different times of the day, and the light intensity of the operation environment of the wearable VR/AR/MR system may vary substantially. Moreover, the wearable VR/AR/MR system may also include the aforementioned NIR eyeball tracking system, which may require projecting lights of very low intensity into the eyeballs of the user to prevent damaging the eyeballs. As a result, the image sensors of the wearable VR/AR/MR system may need to have a wide dynamic range to be able to operate properly (e.g., to generate an output that correlates with the intensity of incident light) across a very wide range of light intensities associated with different operating environments. The image sensors of the wearable VR/AR/MR system may also need to generate images at sufficiently high speed to allow tracking of the user's location, orientation, gaze point, etc. Image sensors with relatively limited dynamic ranges and which generate images at relatively low speed may not be suitable for such a wearable VR/AR/MR system.

This disclosure relates to a pixel cell that can provide extended dynamic range. The pixel cell may include a photodiode, a charge storage unit, a transistor configured as a transfer gate between the photodiode and the charge storage unit, and a processing circuit. The photodiode can generate charge responsive to incident light and store at least some of the charge as residual charge until the photodiode saturates. The charge storage unit can be a floating drain of the transistor, a metal capacitor, a Metal-Oxide-Semiconductor (MOS) capacitor, or any combination thereof. The charge storage unit can store overflow charge, which is charge transferred from the photodiode when the photodiode saturates and cannot store additional charge, to develop a first voltage. The charge storage unit may include a floating drain node.

The processing circuits can measure the intensity of the incident light by performing multiple modes of measurement. In a first mode of measurement, the processing circuits can perform a quantization process by comparing the first voltage against a first ramping threshold voltage to generate a first decision. When the first decision indicates that the first voltage crosses the first ramping threshold voltage, a first count value can be captured from a counter and stored in a memory. The first count value can represent a measurement of the time it takes for the first ramping threshold voltage to cross the first voltage, which can also represent a result of quantizing the overflow charge stored in the charge storage unit. The quantity of the overflow charge can be proportional to the intensity of the incident light. For the rest of the disclosure, the first mode of measurement may be referred to as "FD ADC" operation.

The processing circuits can transfer the residual charge from the photodiode to the charge storage device to develop a second voltage for a second mode of measurement. In the second mode of measurement, the processing circuits can perform another quantization process by comparing the second voltage against a second ramping threshold voltage to generate a second decision. When the second decision indicates that the first crosses the second ramping reference voltage, a second count value can be captured from the counter and stored in the memory. The second count value can represent a measurement of the time it takes for the second ramping threshold voltage to cross the second voltage, which also represents a result of quantizing the residual charge stored in the charge storage unit. The quantity of the residual charge can be proportional to the intensity of the incident light. For the rest of the disclosure, the second mode of measurement may be referred to as "PD ADC" operation.

In some examples, the processing circuits can also perform a third mode of measurement. In the third mode of measurement, the processing circuits can compare the first voltage with a static threshold voltage representing a saturation limit of the charge storage unit to generate a third decision. When the third decision indicates that the charge storage unit reaches or exceeds the saturation limit, a third count value can be captured from the counter and stored in the memory. The third count value can represent a measurement of the time it takes for the charge storage unit to become saturated, and the duration of time can be inversely proportional to the intensity of the incident light. For the rest of the disclosure, the third mode of measurement may be referred as time-to-saturation (TTS) measurement operation. In some examples, the third mode of measurement can be performed before the first mode of measurement.

The different modes of measurements can be targeted for different light intensity ranges, and the processing circuits can output one of the first, second, or third count values from the memory to represent the intensity of the incident light based on which light intensity range the incident light belongs to. The first mode of measurement can be targeted at a medium light intensity range for which the photodiode is expected to reach full capacity and saturates. The second mode of measurement can be targeted at a low light intensity range for which the photodiode is not expected to saturate. The third mode of measurement can be targeted at a high light intensity range for which the charge storage unit saturates.

As discussed above, the processing circuits can select one of the first, second, or third count values from the memory to represent the intensity of the incident light. The selection can be based on one or more of the first and third decision outputs. For example, if the third decision output indicates that the charge storage unit saturates, the third count value can be selected over the first and second count values as the output. If the third decision output indicates that the charge storage unit does not saturate, the third count value can be discarded, and the processing circuits can select between the first and second count values as the output. If the first decision output (based on the overflow charge) indicates that the photodiode saturates, the processing circuits can select the first count value, which measures the quantity of overflow charge stored in the charge storage unit, as the output. But if the first decision output or the second decision output indicates that the photodiode does not saturate, the processing circuits can select the second count value, which measures the quantity of residual charge stored in the photodiode, as the output. In some examples, the pixel cell may include a set of registers to store at least some of the first, second, and third decisions as flags. The processing circuits can decide, based on the flag values, whether to store a count value at the memory or to discard the count value in each mode of measurement, or which of the count values to output from the memory after all modes of measurement have been completed.

The multi-mode measurement operation described above can extend the dynamic range of the light intensity measurement by a pixel cell. Specifically, the TTS measurement operation allows measurement of high light intensity beyond the intensity level that saturates the charge storage unit, which can extend the upper limit of the dynamic range. Moreover, the PD ADC operation measures residual charge stored in the photodiode for low light intensity. As the photodiode typically receives very little dark current, the magnitude of dark charge caused by dark current can remain small with respect to the real signal caused by the incident light, which can reduce the detectable incident light intensity and push down the lower limit of the dynamic range.

Although the multi-mode measurement operations can extend the dynamic range of a pixel cell, the accuracy of the light intensity measurement can still be affected by various noise sources. One noise source can be dark current. Specifically, as described above, the processing circuits selects one of the first count value or the second count value as output based on whether the first decision indicates the photodiode saturates, where the first decision is generated based on comparing the first voltage at the charge storage unit against a threshold voltage representing no overflow charge as part of the first voltage ramp. But the first decision can be affected by dark current which can add dark charge to the floating drain node, which typically receives several magnitude of order of dark current compared with the photodiode especially when the photodiode is a pinned photodiode. As the floating drain node accumulates the dark charge at the same time as the overflow charge, the dark charge can be relatively large and can lead to an incorrect first decision. For example, the floating drain node may store no overflow charge, but the dark charge accumulated in the floating drain node can be large enough to cause an incorrect first decision indicating that the floating drain node stores overflow charge. The incorrect first decision can cause the processing circuits to discard the second count value which provides a correct representation of the incident light in the low intensity range. As a result, the processing circuits may output an incorrect count value from the memory to represent the incident light intensity.

Another noise source that affects the multi-mode measurement operations is quantization error. As described above, the count values from the counter can represent a measurement of the time for a ramping voltage to reach a voltage at the charge storage device (for FD ADC and PD ADC), or a measurement of the time for the voltage at the charge storage device to reach a saturation limit (for TTS). In both cases, the accuracy of measurement of the time can be defined by the frequency at which the counter updates the count value, as well as the duration of the time to be measured, both of which can define the quantization error. Even if the PD ADC operation is less susceptible to dark current, the quantization error can define the minimum detectable light intensity and set the lower limit of the dynamic range.

This disclosure proposes several techniques to mitigate the effect of dark current and quantization error. In some examples, after transferring the residual charge from the photodiode to the charge storage unit to develop the second voltage, the processing circuits can compare the second voltage against a static threshold representing a quantity of residual charge that saturates the photodiode, to determine whether the photodiode saturates. The static threshold can be based on a voltage developed at the charge storage unit when such a quantity of residual charge is stored at the charge storage unit. Detecting the saturation of the photodiode based on the residual charge can be less susceptible to dark current than based on the overflow charge. This is because a photodiode typically receives much less dark current, while the time for transfer of the residual charge to the floating drain node is also relatively short, both of which can reduce the dark charge present in the floating drain node.

In some examples, each of the TTS, FD ADC, and PD ADC measurements can be split into two or more sub-stages based on one or more breakpoints. The processing circuits can check the status of the first decision (for FD ADC), the status of the second decision (for PD ADC), and/or the status of the third decision (for TTS) at those breakpoints, and determine whether the photodiode or the charge storage unit saturates based on the statuses of these decisions. Such arrangements can introduce redundancy to the detection of saturation of the photodiode and of the charge storage unit, which can improve the accuracy of the detection. Moreover, the counter can be reset at the beginning of each sub-stage, which shrinks the range of time (and the corresponding input voltage range) to be measured by the full output range of the counter. With the same number of bits of the counter, the counter can update at a higher frequency to measure the reduced range of time, which can reduce the quantization error. All these can further improve the accuracy of the multi-mode measurement operations.

Examples of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some examples, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 2:
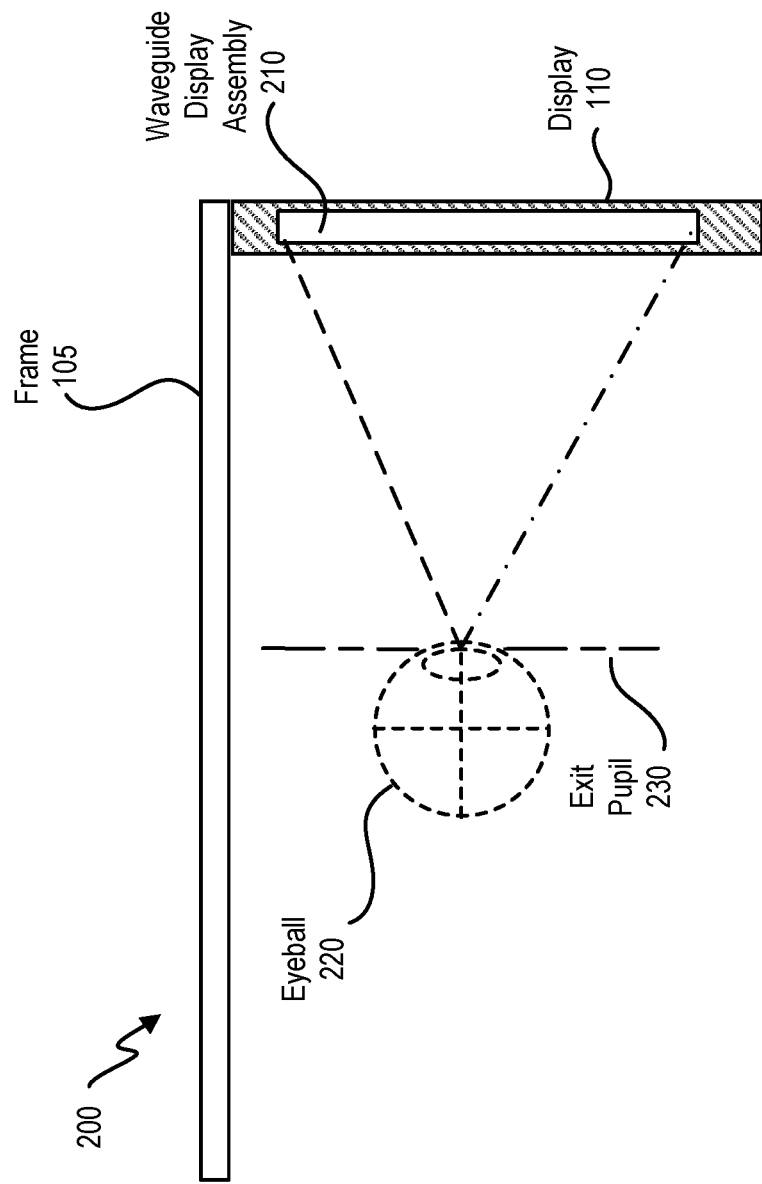
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
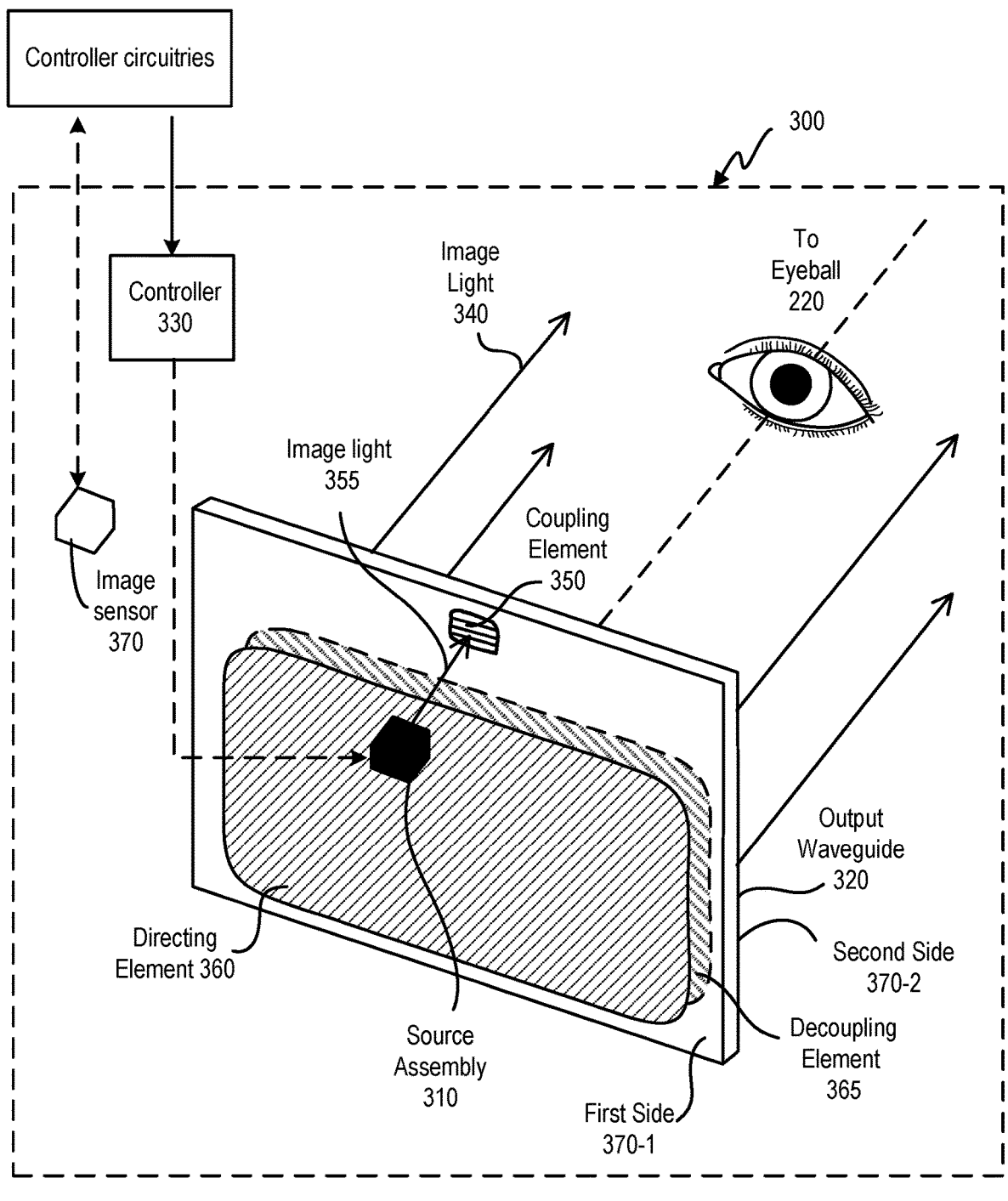
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
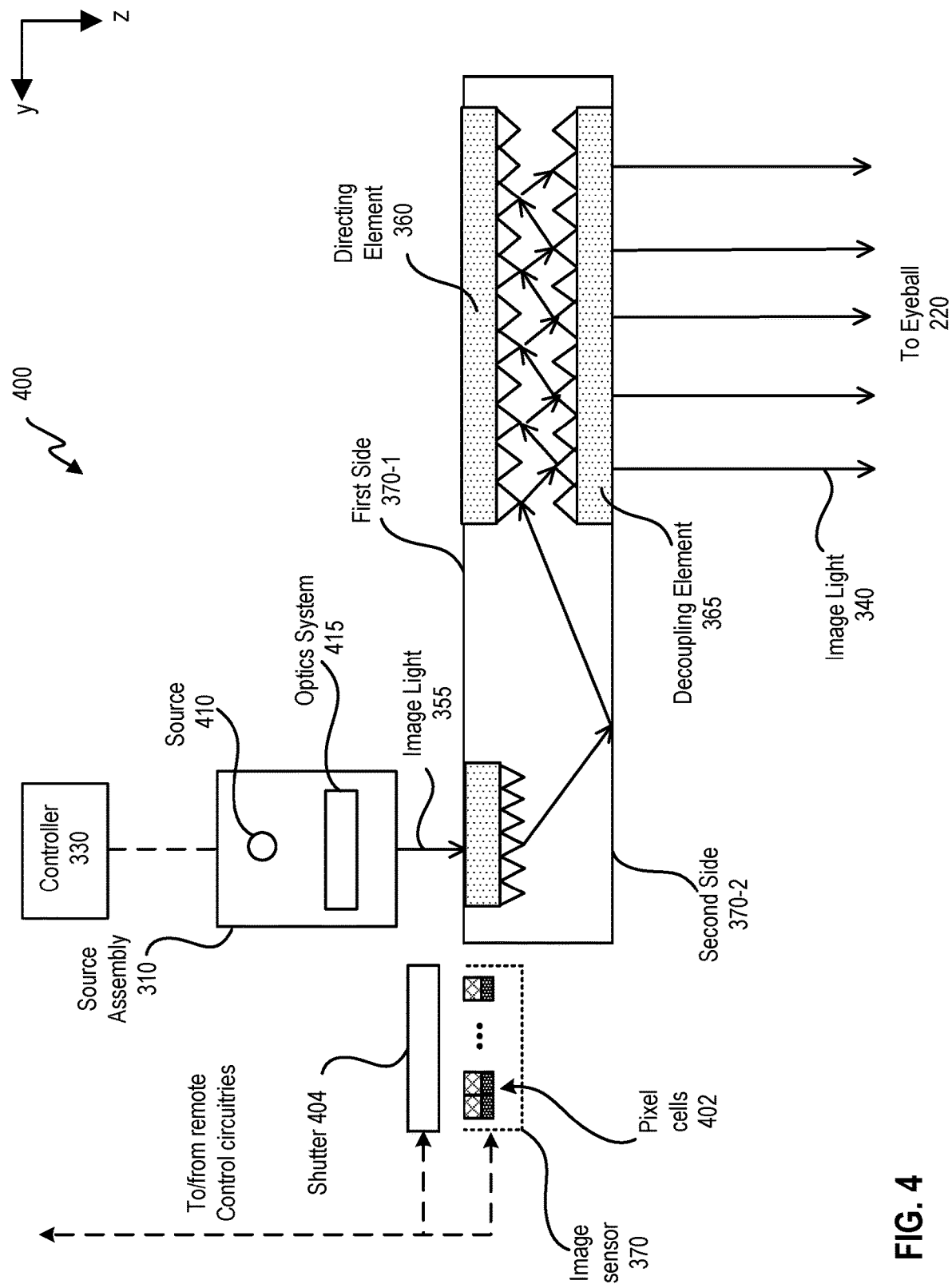
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
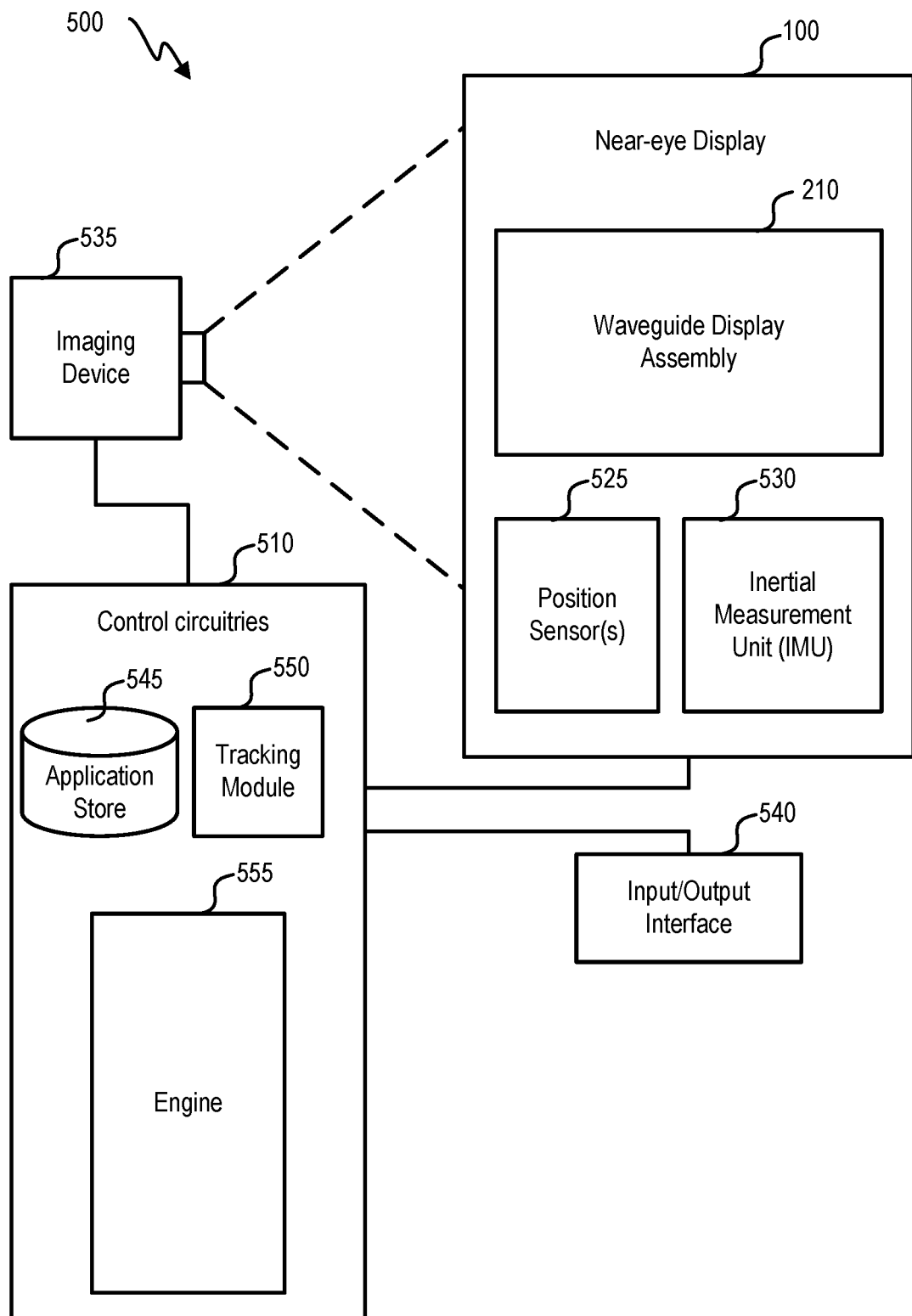
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuitries 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
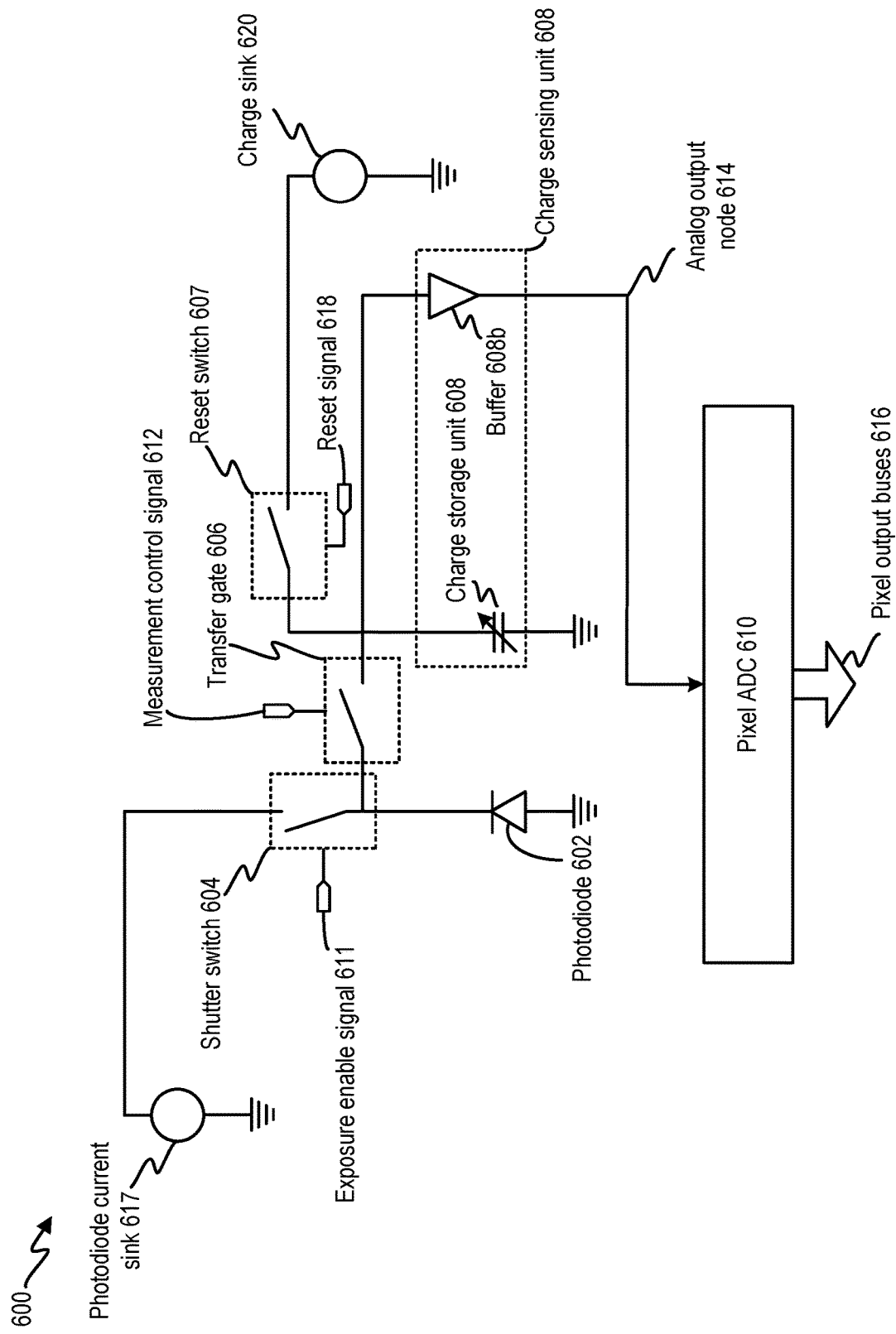
FIG. 6 illustrates block diagrams of examples of a pixel cell.

FIG. 6 illustrates an example of a pixel cell 600. Pixel cell 600 may be part of a pixel array and can generate digital intensity data corresponding to a pixel of an image. For example, pixel cell 600 may be part of pixel cells 402 of FIG. 4. As shown in FIG. 6, pixel cell 600 may include a photodiode 602 as well as processing circuits including a shutter switch 604, a transfer gate 606, a reset switch 607, a charge sensing unit 608 comprising charge storage unit 608a and a buffer 608b, and a pixel ADC 610.

In some examples, photodiode 602 may include, for example, a P-N diode, a P-I-N diode, a pinned diode, etc. Photodiode 602 can generate charge upon receiving light, and the quantity of charge generated can be proportional to the intensity of the light. Photodiode 602 can also store some of the generated charge until the photodiode saturates, which occurs when the well capacity of the photodiode is reached. Moreover, each of shutter switch 604, transfer gate 606, and reset switch 607 can include a transistor. The transistor may include, for example, a metal-oxide-semiconductor field-effect transistor (MOSFET), a bipolar junction transistor (BJT), etc. Shutter switch 604 can act as an electronic shutter gate (in lieu of, or in combination with, mechanical shutter 404 of FIG. 4) to control an exposure period of pixel cell 600. During the exposure period, shutter switch 604 can be disabled (turned off) by exposure enable signal 611, which allows photodiode 602 to store the generated charge and, when photodiode 602 saturates, allows the overflow charge to flow to charge storage unit 608a. At the end of the exposure period, shutter switch 604 can be enabled to steer the charge generated by photodiode 602 into photodiode current sink 617. Moreover, reset switch 607 can also be disabled (turned off) by reset signal 618, which allows charge storage unit 608a to accumulate the charge. Charge storage unit 608a can be a device capacitor at a floating terminal of transfer gate 606, a metal capacitor, a MOS capacitor, or any combination thereof. Charge storage unit 608a can be used to convert a quantity of charge to an analog voltage, which can be measured by pixel ADC 610 to provide a digital output representing the incident light intensity. After a mode of measurement completes, reset switch 607 can be enabled to empty the charge stored at charge storage unit 608a to charge sink 620, to make charge storage unit 608a available for the next measurement.

Figure 7:
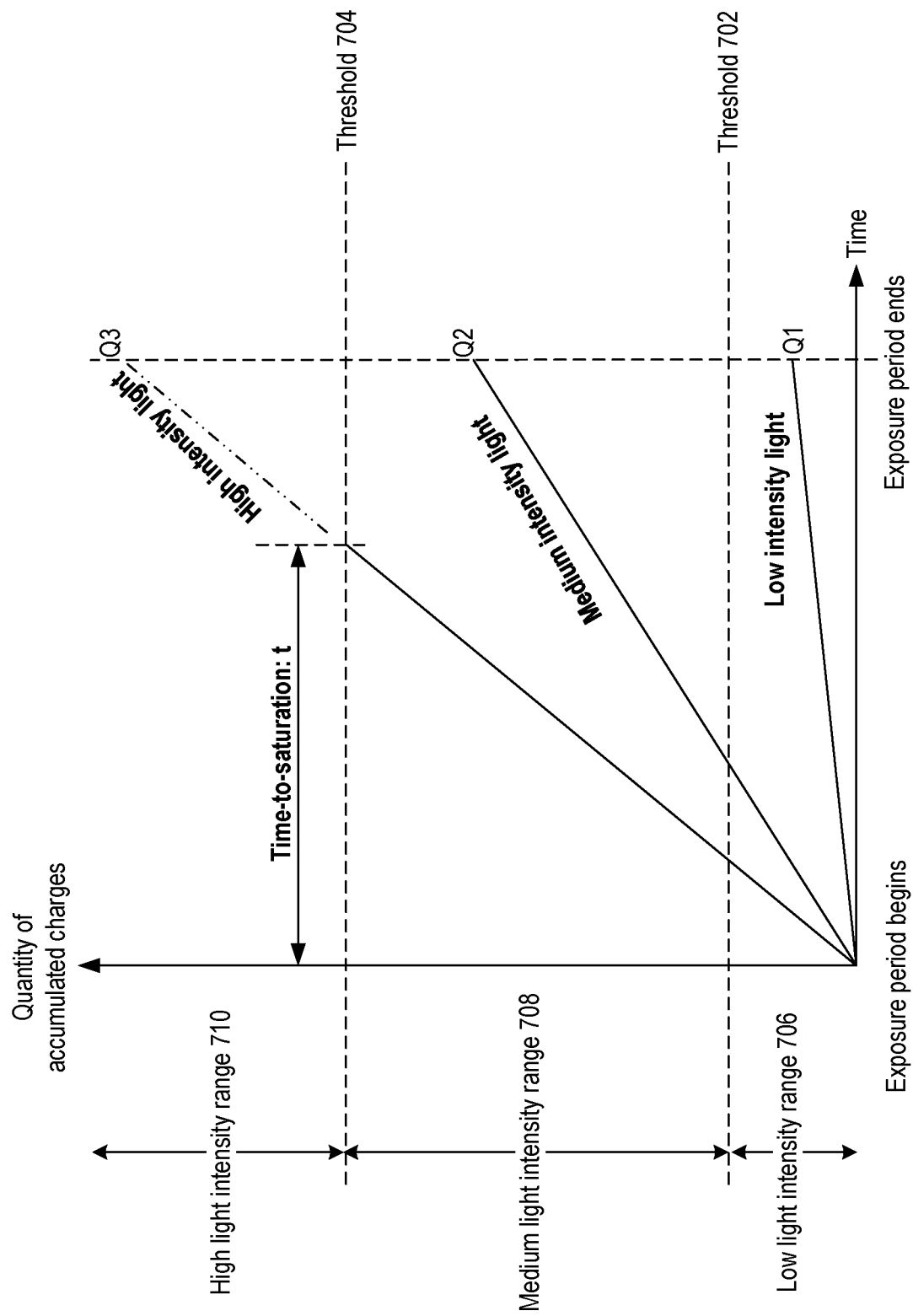
FIG. 7 illustrates operations for determining light intensities of different ranges by examples of FIG. 6.

Reference is now made to FIG. 7, which illustrates a quantity of charge accumulated with respect to time for different light intensity ranges. The total quantity of charge accumulated at a particular time point can reflect the intensity of light incident upon photodiode 602 during an exposure period. The quantity can be measured when the exposure period ends. A threshold 702 and a threshold 704 can be defined for a threshold's quantity of charge defining a low light intensity range 706, a medium light intensity range 708, and a high light intensity range 710 for the intensity of the incident light. For example, if the total accumulated charge is below threshold 702 (e.g., Q1), the incident light intensity is within low light intensity range 706. If the total accumulated charge is between threshold 704 and threshold 702 (e.g., Q2), the incident light intensity is within medium light intensity range 708. If the total accumulated charge is above threshold 704, the incident light intensity is within medium light intensity range 710. The quantity of the accumulated charge, for low and medium light intensity ranges, can correlate with the intensity of the incident light, if the photodiode does not saturate within the entire low light intensity range 706 and the measurement capacitor does not saturate within the entire medium light intensity range 708.

The definitions of low light intensity range 706 and medium light intensity range 708, as well as thresholds 702 and 704, can be based on the storage capacities of photodiode 602 and charge storage unit 608a. For example, low light intensity range 706 can be defined such that the total quantity of charge stored in photodiode 602, at the end of the exposure period, is below or equal to the storage capacity of the photodiode, and threshold 702 can be based on the storage capacity of photodiode 602. As to be described below, threshold 702 can be set based on a scaled storage capacity of photodiode 602 to account for potential capacity variation of the photodiode. Such arrangements can ensure that, when the quantity of charge stored in photodiode 602 is measured for intensity determination, the photodiode does not saturate, and the measured quantity relates to the incident light intensity. Moreover, medium light intensity range 708 can be defined such that the total quantity of charge stored in charge storage unit 608a, at the end of the exposure period, is below or equal to the storage capacity of the measurement capacitor, and threshold 704 can be based on the storage capacity of charge storage unit 608a. Typically threshold 704 is also set to be based on a scaled storage capacity of charge storage unit 608a to ensure that when the quantity of charge stored in charge storage unit 608a is measured for intensity determination, the measurement capacitor does not saturate, and the measured quantity also relates to the incident light intensity. As to be described below, thresholds 702 and 704 can be used to detect whether photodiode 602 and charge storage unit 608a saturate, which can determine the intensity range of the incident light and the measurement result to be output.

In addition, in a case where the incident light intensity is within high light intensity range 710, the total overflow charge accumulated at charge storage unit 608a may exceed threshold 704 before the exposure period ends. As additional charge is accumulated, charge storage unit 608a may reach full capacity before the end of the exposure period, and charge leakage may occur. To avoid measurement error caused due to charge storage unit 608a reaching full capacity, a time-to-saturation measurement can be performed to measure the time duration it takes for the total overflow charge accumulated at charge storage unit 608a to reach threshold 704. A rate of charge accumulation at charge storage unit 608a can be determined based on a ratio between threshold 704 and the time-to-saturation, and a hypothetical quantity of charge (Q3) that could have been accumulated at charge storage unit 608a at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 710.

Referring back to FIG. 6, transfer gate 606 can be controlled by a measurement control signal 612 to control the charge accumulations at residual charge capacitor 603 (do not see this in the FIG.) and charge storage unit 608a for different light intensity ranges as described above. To measure high light intensity range 710 and medium light intensity range 708, transfer gate 606 can be controlled to operate in a partially turned-on state. For example, the gate voltage of transfer gate 606 can be set based on a voltage developed at photodiode 602 corresponding to the charge storage capacity of the photodiode. With such arrangements, only overflow charge (e.g., charge generated by the photodiode after the photodiode saturates) will transfer through transfer gate 606 to reach charge storage unit 608a, to measure time-to-saturation (for high light intensity range 710) and the quantity of charge stored in charge storage unit 608a (for medium light intensity range 708). Moreover, to measure low light intensity range 706, transfer gate 606 can be controlled in a fully turned-on state to transfer the charge stored in photodiode 602 to charge storage unit 608a, to measure the quantity of the charge stored in photodiode 602.

The analog voltage generated by charge accumulation at charge storage unit 608a can be buffered by buffer 608b to generate a replica of the analog voltage (but with larger driving strength) at analog output node 614. The analog voltage at analog output node 614 can be converted into a set of digital data (e.g., comprising logical ones and zeros) by pixel ADC 610. The analog voltage developed at charge storage unit 608a can be sampled and digital output can be generated before the end of the exposure period (e.g., for medium light intensity range 708 and high light intensity range 710), or after the exposure period (for low light intensity range 706). The digital data can be transmitted by a set of pixel output buses 616 to, for example, control circuitries 510 of FIG. 5, to represent the light intensity during the exposure period.

In some examples, the capacitance of charge storage unit 608a can be configurable to improve the accuracy of light intensity determination for a low light intensity range. For example, the capacitance of charge storage unit 608a can be reduced when charge storage unit 608a is used to measure the residual charge stored at photodiode 602. The reduction in the capacitance of charge storage unit 608a can increase the charge-to-voltage conversion ratio at charge storage unit 608a, such that a higher voltage can be developed for a certain quantity of stored charge. The higher charge-to-voltage conversion ratio can reduce the effect of measurement errors (e.g., quantization error, comparator offset, etc.) introduced by pixel ADC 610 on the accuracy of low light intensity determination. The measurement error can set a limit on a minimum voltage difference that can be detected and/or differentiated by pixel ADC 610. By increasing the charge-to-voltage conversion ratio, the quantity of charge corresponding to the minimum voltage difference can be reduced, which in turn reduces the lower limit of a measurable light intensity by pixel cell 600 and extends the dynamic range. On the other hand, for medium light intensity, the capacitance of charge storage unit 608a can be increased to ensure that the charge storage unit 608a has sufficient capacity to store a quantity of charge up to, for example, the quantity defined by threshold 704.

Figure 8:
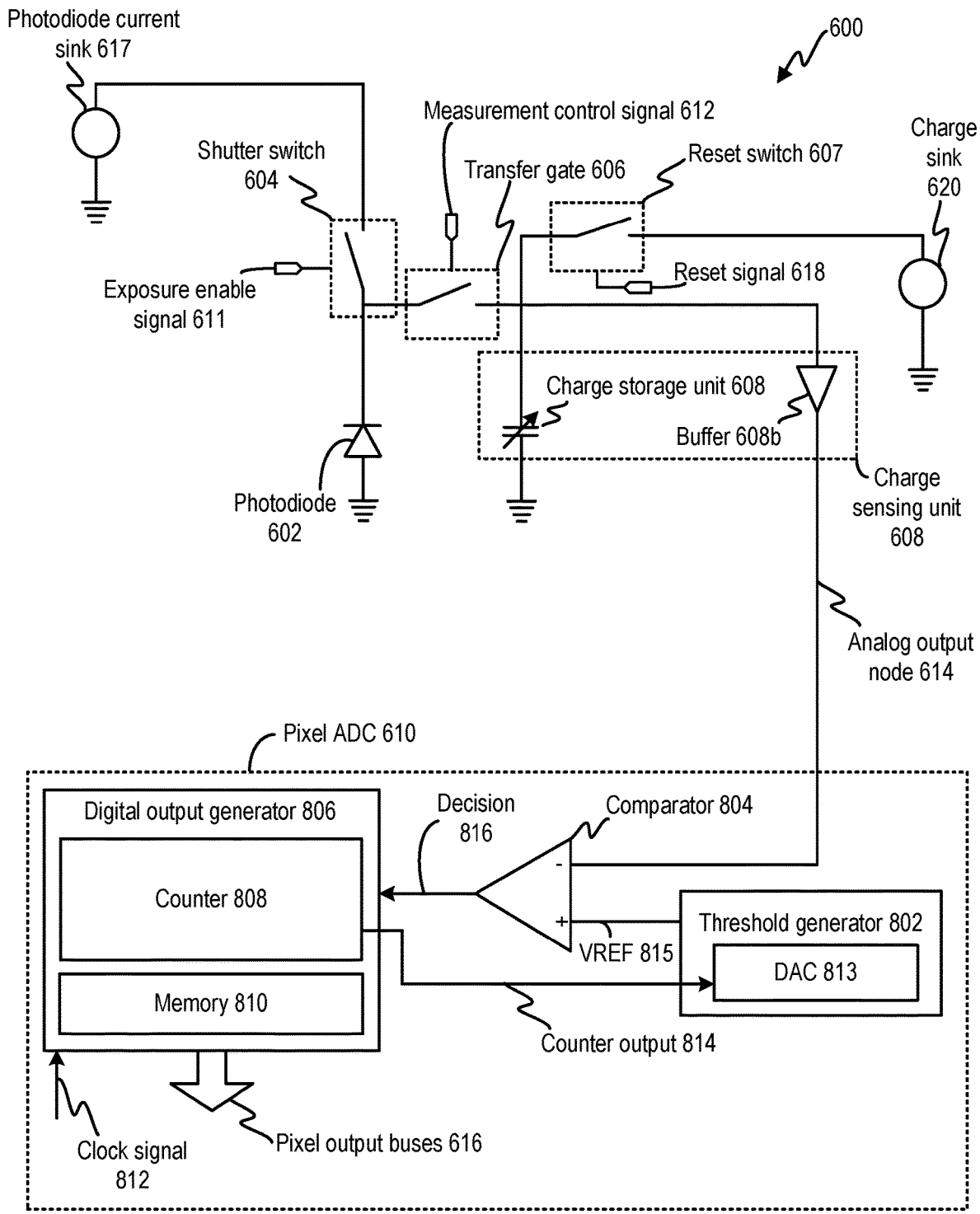
FIG. 8 illustrates examples of internal components of the pixel cell of FIG. 6.

FIG. 8 illustrates an example of the internal components of pixel ADC 610. As shown in FIG. 8, pixel ADC 610 includes a threshold generator 802, a comparator 804, and a digital output generator 806. Digital output generator 806 may further include a counter 808 and a memory 810. Counter 808 can generate a set of count values based on a free-running clock signal 812, whereas memory 810 can store at least some of the count values (e.g., the latest count value) generated by counter 808. In some examples, memory 810 may be part of counter 808. Memory 810 can be, for example, a latch circuit to store the counter value based on local pixel value as described below. Threshold generator 802 includes a digital-to-analog converter (DAC) 813 which can accept a set of digital values and output a reference voltage (VREF) 815 representing the set of digital values. As to be discussed in more detail below, threshold generator 802 may accept static digital values to generate a fixed threshold, or accept output 814 of counter 808 to generate a ramping threshold.

Although FIG. 8 illustrates that DAC 813 (and threshold generator 802) is part of pixel ADC 610, it is understood that DAC 813 (and threshold generator 802) can be coupled with multiple digital output generators 806 from different pixel cells. Moreover, at least part of digital output generator 806, such as counter 808, can be shared among a plurality of multiple pixel cells to generate the digital values.

Comparator 804 can compare the analog voltage developed at analog output node 614 against the threshold provided by threshold generator 802, and generate a decision 816 based on the comparison result. For example, comparator 804 can generate a logical one for decision 816 if the analog voltage at analog output node 614 equals or exceeds the threshold generated by threshold generator 802. Comparator 804 can also generate a logical zero for decision 816 if the analog voltage falls below the threshold. Decision 816 can control the counting operations of counter 808 and/or the count values stored in memory 810, to perform the aforementioned time-of-saturation measurement of a ramping analog voltage at analog output node 614 as well as quantization processing of the analog voltage at analog output node 614 for incident light intensity determination.

Figure 9B:
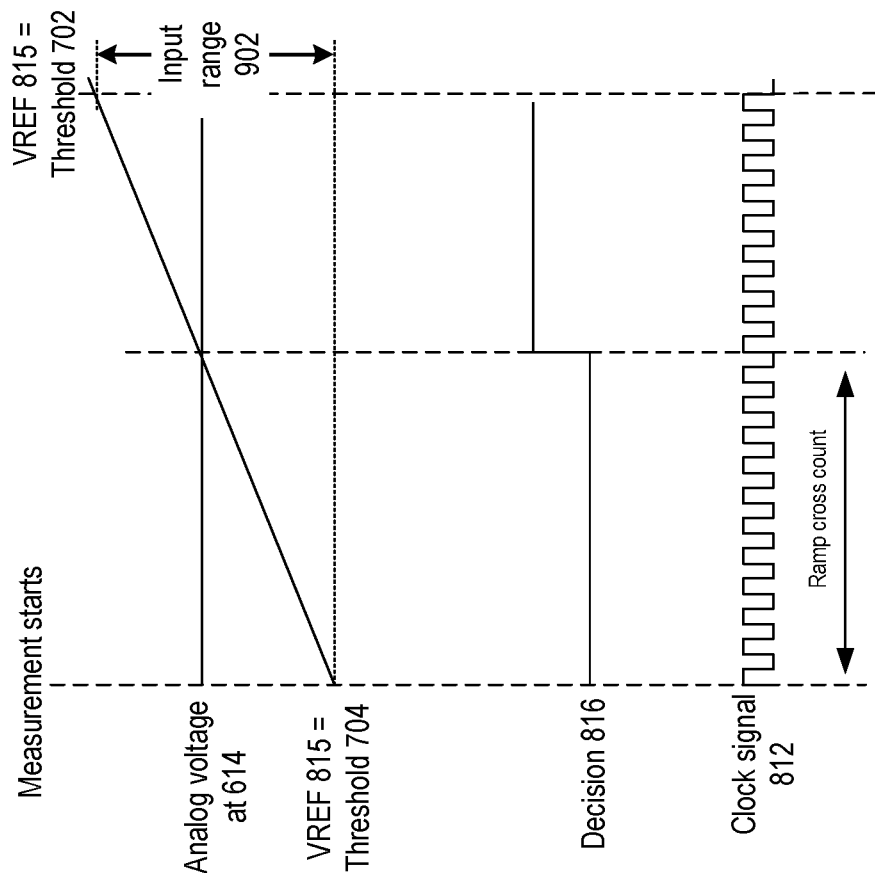
FIG. 9A and FIG. 9B illustrate example methods for determining a light intensity.
Figure 9A:
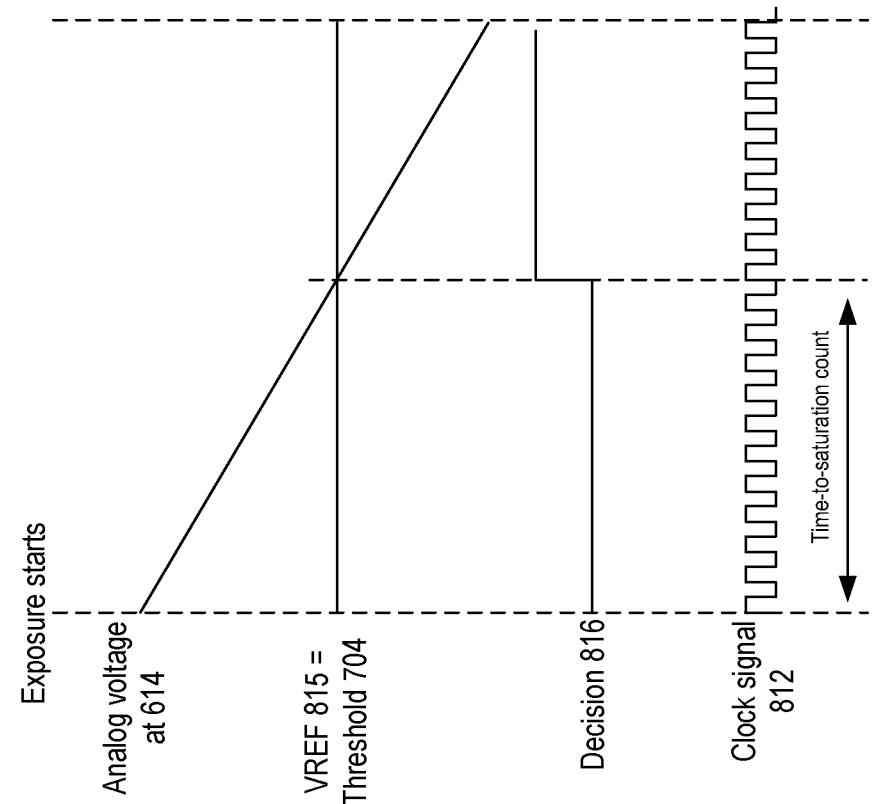

FIG. 9A illustrates an example of time-to-saturation measurement by pixel ADC 610. To perform the time-to-saturation measurement, threshold generator 802 can control DAC 813 to generate a fixed VREF 815. Fixed VREF 815 can be set at a voltage corresponding a charge quantity threshold for saturation of charge storage unit 608a (e.g., threshold 704 of FIG. 7). Counter 808 can start counting right after the exposure period starts (e.g., right after shutter switch 604 is disabled). As the analog voltage at analog output node 614 ramps down (or up depending on the implementation), clock signal 812 keeps toggling to update the count value at counter 808. The analog voltage may reach the fixed threshold at a certain time point, which causes decision 816 by comparator 804 to flip. The flipping of decision 816 may stop the counting of counter 808, and the count value at counter 808 may represent the time-to-saturation. As to be discussed in more details below, a rate of charge accumulation at charge storage unit 608a can also be determined based on the duration, and the incident light intensity can be determined based on the rate of charge accumulation.

FIG. 9B illustrates an example of quantizing an analog voltage by pixel ADC 610. After measurement starts, DAC 813 may be programmed by counter output 814 to generate a ramping VREF 815, which can either ramp up (in the example of FIG. 9B) or ramp down depending on implementation. The voltage range of ramping VREF 815 can be between threshold 704 (charge quantity threshold for saturation of charge storage unit 608a) and threshold 702 (charge quantity threshold for saturation of photodiode 602), which can define the medium light intensity range. In the example of FIG. 9B, the quantization process can be performed with uniform quantization steps, with VREF 815 increasing (or decreasing) by the same amount for each clock cycle of clock signal 812. The amount of increase (or decrease) of VREF 815 corresponds to a quantization step. When VREF 815 reaches within one quantization step of the analog voltage at analog output node 614, decision 816 by comparator 804 flips from negative to positive. The flipping of decision 816 may stop the counting of counter 808, and the count value can correspond to a total number of quantization steps accumulated to match, within one quantization step, the analog voltage. The count value corresponds to a measurement of time it takes for VREF 815 to reach the analog voltage and can be a digital representation of the quantity of charge stored at charge storage unit 608a, as well as the digital representation of the incident light intensity. As discussed above, the quantization of the analog voltage can occur during the exposure period (e.g., for medium light intensity range 708) and after the exposure period (e.g., for low light intensity range 706).

As discussed above, ADC 610 can introduce quantization errors when there is a mismatch between a quantity of charge represented by the quantity level output by ADC 610 (e.g., represented by the total number of quantization steps) and the actual input quantity of charge that is mapped to the quantity level by ADC 610. The quantization error can be reduced by using a smaller quantization step size. In the example of FIG. 9B, the quantization step size can be reduced by the amount of increase (or decrease) in VREF 815 per clock cycle based on, for example, reducing input range 902 of the quantization operation (between thresholds 702 and 704), reducing the corresponding range of time to be measured by counter 808, increasing the clock frequency of clock signal 812, or any combination therefore.

Although quantization error can be reduced by using smaller quantization step sizes, area and performance speed may limit how far the quantization step can be reduced. For example, in a case where the clock frequency of clock signal 812 is increased while input range 902 remains the same, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps, etc.). The larger number of data bits may require additional buses to be added to pixel output buses 616, which may not be feasible if pixel cell 600 is used on a head-mounted device or other wearable devices with very limited spaces. Moreover, with a larger number of quantization step size, ADC 610 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

One way to reduce quantization error is by employing a non-uniform quantization scheme, in which the quantization steps are not uniform across the input range. FIG. 10A illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 610 can be reduced. Therefore, the reduced quantization errors can push down the lower limit of the measureable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed, etc.) can be avoided.

FIG. 10B illustrates an example of quantizing an analog voltage by pixel ADC 610 using a non-uniform quantization process. Compared with FIG. 9B (which employs a uniform quantization process), VREF 815 increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF 815 increases at a slower rate. For higher counter count values (which correspond to a higher input quantity range), the quantization steps are made larger, hence VREF 815 increases at a higher rate. The uneven quantization steps in VREF 815 can be introduced using different schemes. For example, as discussed above, DAC 813 is configured to output voltages for different counter count values (from counter 808). DAC 813 can be configured such that the difference in the output voltage between two neighboring counter count values (which defines the quantization step size) is different for different counter count values. As another example, counter 808 can also be configured to generate jumps in the counter count values, instead of increasing or decreasing by the same count step, to generate the uneven quantization steps. In some examples, the non-uniform quantization process of FIG. 10B can be employed for light intensity determination for low light intensity range 706 and medium light intensity range 708.

Figure 11:
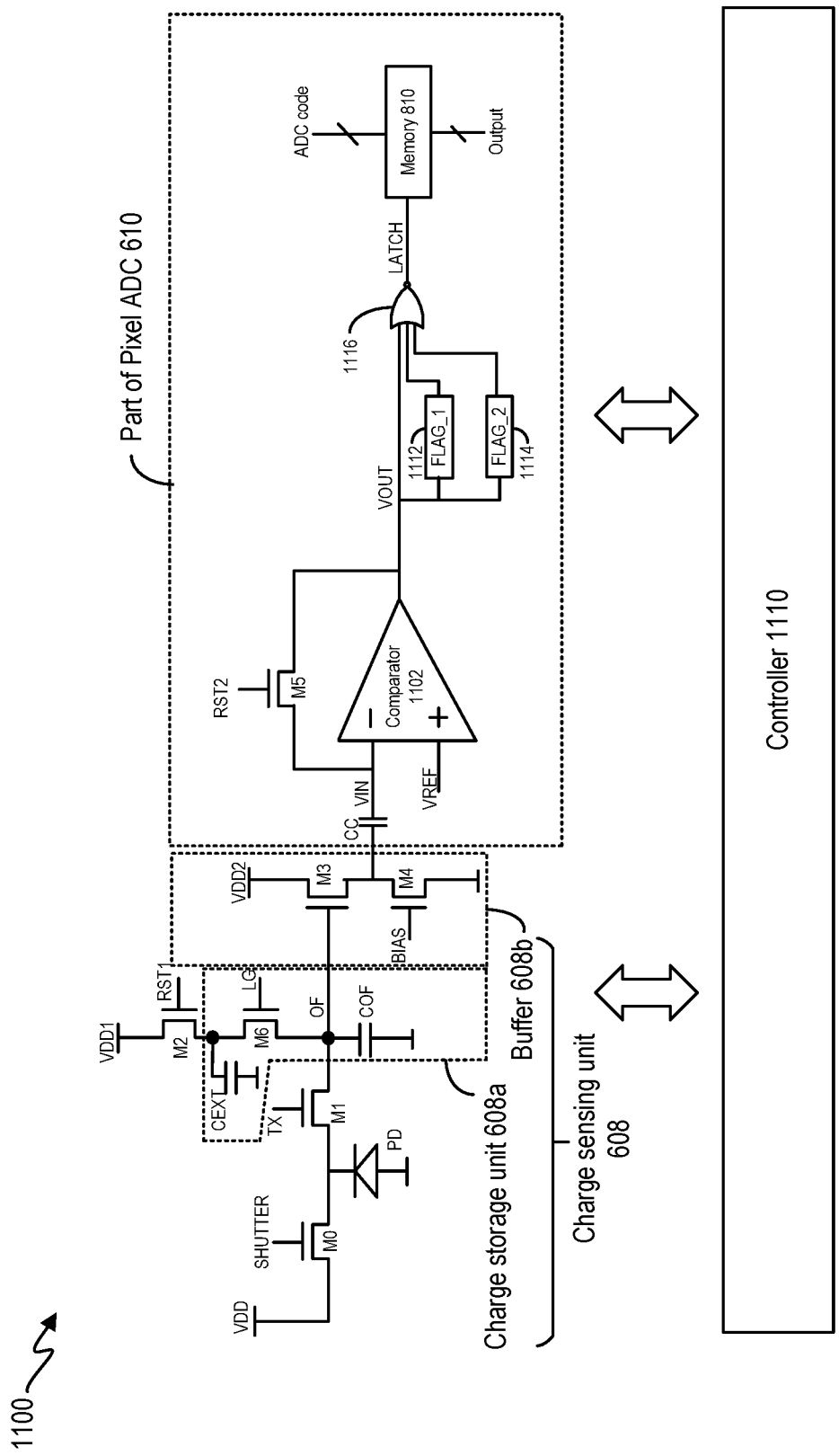
FIG. 11 illustrates block diagrams of an example of a pixel cell.

Reference is now made to FIG. 11, which illustrates an example of pixel cell 1100, which can be an example of pixel cell 600 of FIG. 6. In the example of FIG. 11, PD can correspond to photodiode 602, transistor M0 can correspond to shutter switch 604, transistor M1 can correspond to transfer gate 606, whereas transistor M2 can correspond to reset switch 607. Moreover, a combination of COF and CEXT capacitors can correspond to charge storage unit 608a. COF capacitor can be the parasitic capacitor of a floating drain node. The capacitance of charge storage unit 608a is configurable by the signal LG. When LG is enabled, charge storage unit 608a provides combined capacities of COF and CEXT capacitors. When LG is disabled, CEXT capacitor can be disconnected from the parallel combination, and charge storage unit 608a comprises only a COF capacitor (plus other parasitic capacitances). As discussed above, the capacitance of charge storage unit 608a can be reduced to increase the charge-to-voltage conversion ratio for the low light intensity determination, and can be increased to provide the requisite capacity for the medium light intensity determination.

Pixel cell 1100 further includes an example of buffer 608b and an example of pixel ADC 610. For example, transistors M3 and M4 form a source follower which can be buffer 608b of FIG. 6 to buffer an analog voltage developed at the OF node, which represents a quantity of charge stored at the COF capacitor (or at the COF and CEXT capacitors). Further, the CC capacitor, comparator 1102, transistor M5, NOR gate 1112, together with memory 810, can be part of pixel ADC 610 to generate a digital output representing the analog voltage at the OF node. As described above, the quantization can be based on a comparison result (VOUT), generated by comparator 1102, between the analog voltage developed at the OF node and VREF. Here, the CC capacitor is configured to generate a VIN voltage (at one input of comparator 1102) which tracks the output of buffer 608b, and provides the VIN voltage to comparator 1102 to compare against VREF. VREF can be a static voltage for time-of-saturation measurement (for high light intensity range) or a ramping voltage for quantization of an analog voltage (for low and medium light intensity ranges). The ADC code can be generated by a free-running counter (e.g., counter 808), and the comparison result generated by comparator 1102 can determine the ADC code to be stored in memory 810 and to be output as the digital representation of the incident light intensity. In some examples, the generation of VREF for low and medium light intensity determination can be based on a non-uniform quantization scheme as discussed in FIG. 10A and FIG. 10B.

Pixel cell 1100 includes techniques that can further improve the accuracy of the incident light intensity determination, in addition to the techniques disclosed above. For example, the combination of the CC capacitor and transistor M5 can be used to compensate for measurement errors (e.g., comparator offset) introduced by comparator 1102, as well as other error signals that are introduced to comparator 1102, such that the accuracy of comparator 1102 can be improved. The noise signals may include, for example, reset noise charge introduced by reset switch 607, a noise signal at the output of buffer 608b due to source follower threshold mismatches, etc. A quantity of charge reflecting the comparator offset as well as the error signals can be stored at the CC capacitor during a reset phase, when both transistors M2 and M5 are enabled. A voltage difference can also be developed across the CC capacitor during the reset phase due to the stored charge. During a measurement phase, the voltage difference across the CC capacitor remains, and the CC capacitor can track the output voltage of buffer 608b by subtracting away (or adding) the voltage difference to generate VIN. As a result, the VIN voltage can be compensated for the measurement errors and the error signals, which improves the accuracy of the comparison between VIN and VREF and the ensuing quantization.

In addition, pixel cell 1100 further includes a controller 1110. Controller 1110 can generate a sequence of control signals, such as SHUTTER, TX, RST1, RST2, etc., to operate pixel cell 1100 to perform a three-phase measurement operation corresponding to the three light intensity ranges of FIG. 7 (e.g., low light intensity range 706, medium light intensity range 708, and high light intensity range 710). In each phase, pixel cell 1100 can be operated in a measurement mode targeted for the corresponding light intensity range, and determine whether the incident light intensity falls within the corresponding light intensity range based on the decision output (VOUT) of comparator 1102. Pixel cell 1100 further includes a set of registers to store the decision outputs of some of the phases as FLAG_1 and FLAG_2 signals. Based on the FLAG_1 and FLAG_2 signals, controller 1110 can select the ADC code from one of the three phases to represent the incident light intensity. The selected ADC code can be stored in memory 810, and memory 810 can be locked based on a combination of the FLAG_1 and FLAG_2 signals by NOR gate 1116 to prevent subsequent measurement phases from overwriting the selected ADC code output in memory 810. At the end of the three-phase measurement process, controller 1110 can retrieve the ADC code stored in memory 810 and provide the ADC code as the digital output representing the incident light intensity.

Figure 12:
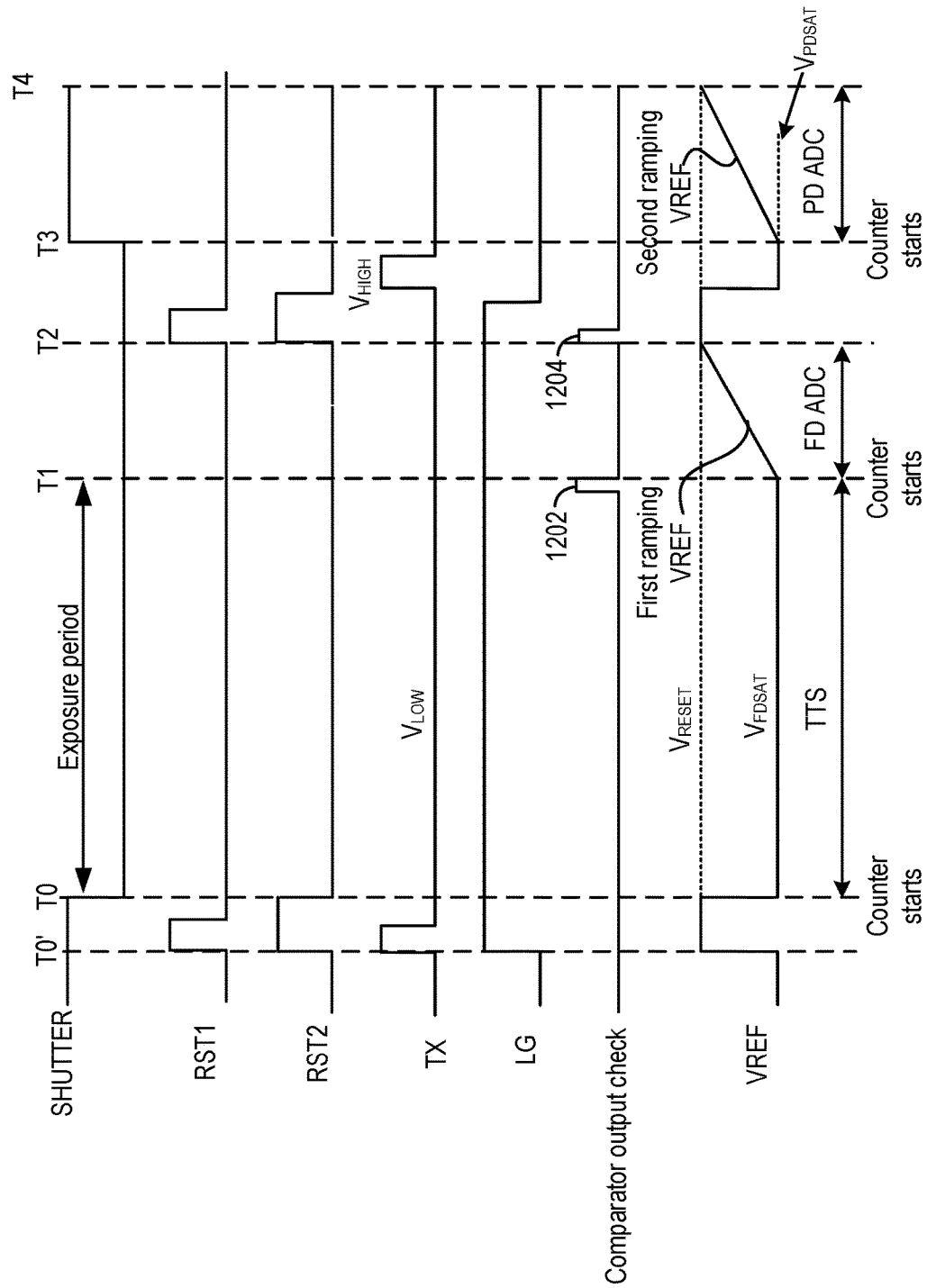
FIG. 12 illustrates an example sequence of control signals to perform light intensity measurement.

Reference is now made to FIG. 12, which illustrates a sequence of control signals of pixel cell 1100 for the three-phase measurement operation with respect to time. Referring to FIG. 12, the time between T0' and T0 corresponds to a first reset phase. The time period between T0 and T1 can correspond to an exposure period and a time-to-saturation measurement mode. The time period between T1 and T2 corresponds to a measurement mode to measure a quantity of overflow charge stored in a floating drain. The measurement mode for measurement of overflow charge is labelled "FD ADC" in FIG. 12 and can be used to measure medium light intensity 708. In addition, the time period between T2 and T3 includes a second reset phase followed by transfer of charge stored in photodiode 602 to the floating drain. Moreover, the time period between T3 and T4 corresponds to a measurement mode to measure a quantity of charge stored in the photodiode and transferred to the floating drain. The measurement mode for measuring the charge stored in the photodiode is labelled "PD ADC" in FIG. 12 and can be used to measure low light intensity 712. Pixel cell 1100 can provide the digital output representing the incident light intensity at time T4, and then start the next three-phase measurement operation.

As shown in FIG. 12, before T0, the RST1 and RST2 signals, the LG signal, and the shutter signal, are asserted, whereas the TX signal is biased at a voltage $V_{LOW}$ (not shown in the FIG). $V_{LOW}$ can correspond to the charge capacity of the photodiode PD to allow only overflow charge (if any) to flow from the photodiode PD to the CEXT capacitor and the COF capacitor via transistor M1. With such arrangements, both photodiode PD, as well as the CEXT capacitor and the COF capacitor, can be reset. Moreover, no charge is added to the capacitors because the charge generated by photodiode PD is diverted away by transistor M0. The voltage across the photodiode PD, as well as the OF node, can be set to a voltage equal to $V_{RESET}$, which can represent a state where the photodiode PD, the CEXT capacitor, and the COF capacitor do not store any charge. Further, comparator 1102 is also in a reset phase, and the CC capacitor can store charge reflecting the reset noise introduced by M2, the comparator offset, the threshold mismatch of buffer 608b, etc. In addition, the VREF can also be set to a value equal to $V_{RESET}$. In some examples, $V_{RESET}$ can be equal to a supply voltage (e.g., VDD) to pixel cell 1100. Moreover, counter 808 can be in a reset state.

At time T0, counter 808 can start counting from an initial value (e.g., zero). During the time period between T0 and T1, the shutter signal is de-asserted, while the LG signal remains asserted and the TX signal remains at $V_{LOW}$. The time period between T0 and T1 can be an exposure period. VREF can be set to a value equal to $V_{FDSAT}$, which can correspond to a voltage of the OF node when both CEXT and COF capacitors are at capacity. The difference between $V_{FDSAT}$ and $V_{RESET}$ can correspond to, for example, threshold 704 of FIG. 7. During the time period between T0 and T1, a time-to-saturation (TTS) measurement can be performed, in which overflow charge flows from the photodiode PD to the COF capacitor and the CEXT capacitor via transistor M1 to develop a ramping voltage at OF node. A buffered and error-compensated version of analog voltage at the OF node (VIN) can be compared against $V_{FDSAT}$ while counter 808 is free-running. If the total charge stored at the COF capacitor and the CEXT capacitor exceeds threshold 704 (based on the OF node voltage), the output of comparator 1102 can flip, which indicates that incident light is in the high intensity range and the TTS measurement result can be used to represent the intensity of incident light. Therefore, the count value generated by counter 808 at the time of flipping can be stored into memory 810. A checking 1202 of the output of comparator 1102 can be made at time T1, and the flipping of comparator 1102 also causes controller 1110 to assert the FLAG_1 signal in register 1112. The non-zero FLAG_1 signal value can cause the output of NOR gate 1116 to remain low regardless of other inputs to the NOR gate, and can lock the memory and prevent subsequent measurement phases from overwriting the count value. On the other hand, if comparator 1102 never flips during the time period between T1 and T2, which indicates that the incident light intensity is below the high light intensity range, the FLAG_1 signal stays zero. Controller 1110 does not update the FLAG_2 value stored in register 1114 between time period T0-T1, and the FLAG_2 value can remain zero.

At time T1, counter 808 can restart counting from its initial value (e.g., zero). During the time period between T1 and T2, the FD ADC operation can be performed, in which the analog voltage at the OF node can be quantized by ADC 610 to measure the quantity of overflow charge stored in the CEXT capacitor and the COF capacitor. In some examples, during the time period T1-T2, photodiode PD can be shielded from incident light (e.g., by mechanical shutter 404), so that the total overflow charge stored in the CEXT capacitor and the COF capacitor, and the analog voltage at the OF node, remain constant. A first ramping threshold voltage (labelled "first ramping VREF" in FIG. 12) can be supplied to comparator 1102 to be compared against the buffered and error-compensated version of analog voltage at the OF node (VIN). In some examples, the first ramping VREF can be generated by a DAC based on count values from the free running counter. If the ramping VREF matches the VIN (within one quantization step), the output of comparator 1102 can flip, and the count value generated by counter 808 at the time of flipping can be stored into memory 810, if the memory is not locked by the first phase of measurement (as indicated by the zero value of FLAG_1 signal). If the memory is locked, the count value will not be stored into memory 810.

In some examples, as shown in FIG. 12, the voltage range of the first ramping VREF can be between $V_{FDSAT}$ and $V_{RESET}$. $V_{FDSAT}$ can define the upper limit of the total overflow charge stored in the CEXT capacitor and the COF capacitor (when they are close to saturated), whereas $V_{RESET}$ can define the lower limit of the total overflow charge stored in the capacitors (when there is no overflow charge, hence the voltage of the OF node remains at $V_{RESET}$). The flipping of comparator 1102 in the FD ADC phase can indicate that the OF node voltage is lower than $V_{RESET}$, which may mean that the total overflow charge stored in the capacitors exceed the lower limit. Therefore, the flipping of comparator 1102 in the FD ADC phase can indicate that the photodiode PD saturates, hence there is overflow charge stored in the capacitors, and the quantization result of the overflow charge can represent the intensity of incident light. A checking 1204 of the output of comparator 1102 can be made at time T2 after the FD ADC phase, and controller 1110 can assert the FLAG_2 signal in register 1114 based on the flipping of comparator 1102 to lock the count value stored in memory 810, which prevents the subsequent phase from storing another count value in memory 810.

At the beginning of the time period between T2 and T3, both RST1 and RST2 signals can be asserted again for a second reset phase. The purpose of the second reset phase is to reset the CEXT and COF capacitors, and to prepare the COF capacitor for storing charge transferred from the PDCAP capacitor in the third phase of measurement (for low light intensity range). The LG signal can also be de-asserted to disconnect the CEXT capacitor from the COF capacitor and to reduce the capacitance of the measurement capacitor. The reduction of the capacitance is to increase the charge-to-voltage conversion ratio to improve the low light intensity determination, as discussed above. Comparator 1102 is also put into the reset state where the CC capacitor can be used to store the noise charge generated by the resetting of the CEXT and COF capacitors. Towards time T3, after the resetting completes, the RST1 and RST2 signals are de-asserted, whereas the bias TX can increase to a voltage $V_{HIGH}$ to fully turn on transistor M1. The charge stored in the photodiode PD can then move into the COF capacitor via M1.

At time T3, counter 808 can restart counting from its initial value (e.g., zero). During the time period between T3 and T4, PD ADC operation can be performed for the low light intensity range. During that period, the shutter signal is asserted, whereas the TX signal is de-asserted (e.g., setting to zero) or set back to a voltage $V_{LOW}$ to prevent charge stored at the COF capacitor from leaking via M1. A second ramping threshold voltage (labelled "second ramping VREF" in FIG. 12) can be supplied to comparator 1102 to be compared against the buffered and error-compensated version of analog voltage at the OF node (VIN). The second ramping VREF can have a voltage range between $V_{PDSAT}$, which represents the voltage at COF capacitor when it stores a quantity of residual charge that saturates the photodiode PD, and $V_{RESET}$. If the second ramping VREF matches the VIN (within one quantization step), the output of comparator 1102 may flip, and the count value generated by counter 808 at the time of flipping can be stored into memory 810, if the memory is not locked by the first phase of measurement (as indicated by the zero value of FLAG_1 signal) or by the second phase of measurement (as indicated by the zero value of FLAG_2 signal).

Although FIG. 12 shows a three-phase measurement operation to measure incident light intensity, it is understood that one or more of the phases be skipped based on, for example, an expected incident light intensity range for an operation environment. For example, if the pixel cell operates in an environment with low ambient light (e.g., in the night time), the first phase of measurement, which is targeted at high light intensity, can be skipped. Moreover, if the pixel cell operates in an environment with medium or strong ambient light (e.g., in the day time), the third phase of measurement, which is targeted at low light intensity, can be skipped.

As described above, the detection of whether photodiode PD saturates can be based on comparing the OF voltage against $V_{RESET}$ in FD ADC to determine whether there is overflow charge stored in the charge storage unit. The detection of saturation of photodiode PD based on measuring the overflow charge, however, can be prone to dark current. Specifically, the COF capacitor is formed by the floating drain node of M1 transistor, and the floating drain node can receive a large amount of dark current, which can accumulate in the floating drain node to become dark charge. The dark charge can lead to false detection of photodiode saturation. As an illustrative example, at room temperature the total dark charge can be around 50 e– per pixel and per second. With an exposure period (e.g., between T0 and T1) of about 10 milliseconds, there is less than one dark electron per frame. But the dark current on a floating drain node can be two or three orders of magnitudes. As the floating drain node receives such a large dark current while integrating the overflow charge during the exposure period, a large quantity of dark charge can be accumulated as a result. The dark charge can cause the OF voltage to drop below $V_{RESET}$ even if the floating drain node does not store overflow charge, which can lead to false detection of photodiode saturation. As a result, the FLAG_2 signal can be incorrectly asserted, which leads to the PD ADC output being discarded when in fact the PD ADC output provides a correct representation of the incident light in the low intensity range.

Figure 13A:
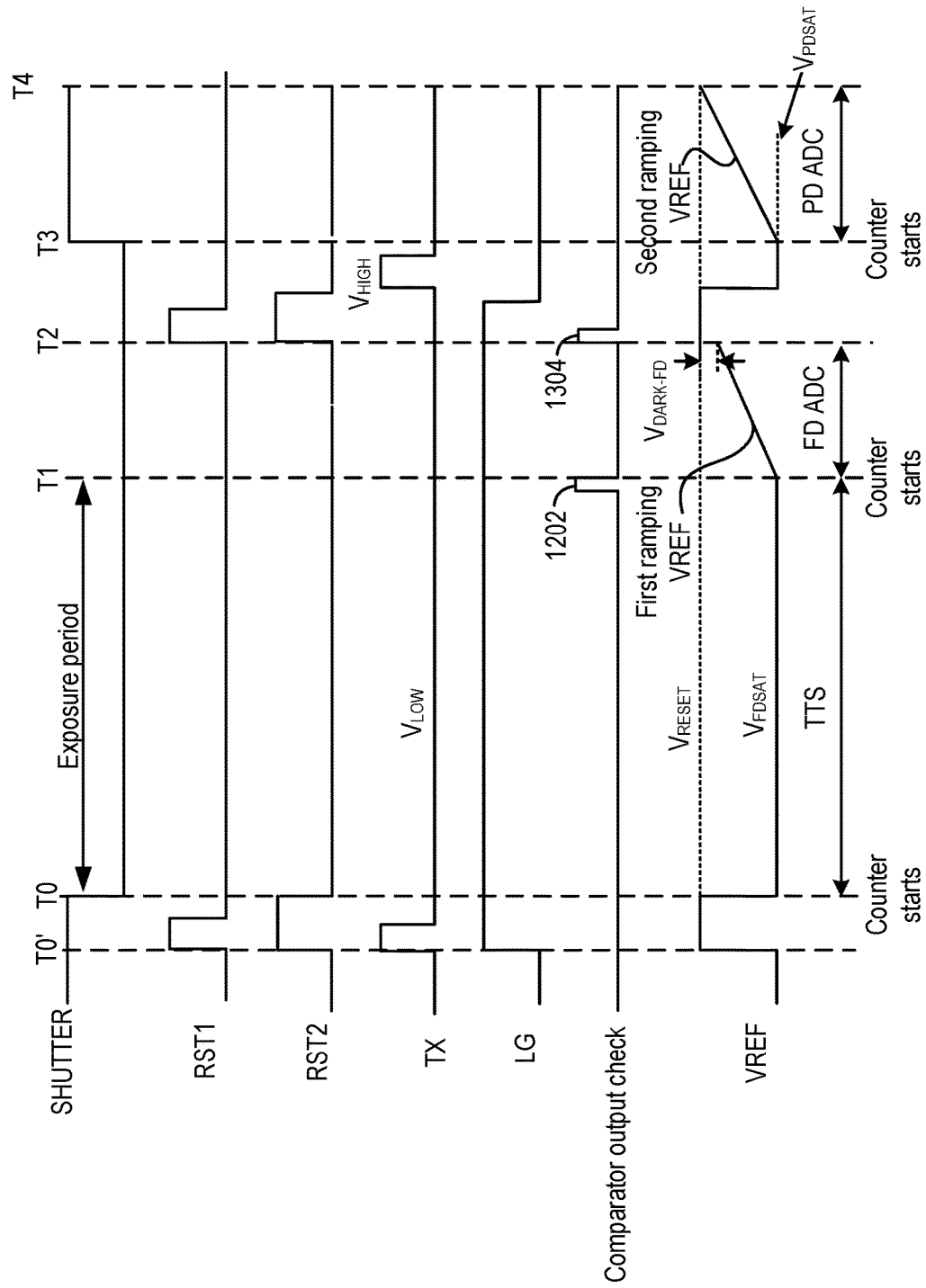
FIG. 13A and FIG. 13B illustrate another example sequence of control signals to perform light intensity measurement, and an example of measurement results.

FIG. 13A illustrates an example sequence of control signals for pixel cell 1100 that can mitigate the effect of dark current on the detection of photodiode PD saturation. As shown in FIG. 13A, the voltage range of the first ramping VREF, used to compare against the OF voltage, is between $V_{FDSAT}$ and $V_{RESET}-V_{DARK-FD}$. The $V_{DARK-FD}$ voltage can be a voltage guard band corresponding to a pre-determined quantity of charge. Specifically, for comparator 1102 output to flip during FD ADC to indicate that the photodiode PD saturates, the charge stored in the COF and CEXT capacitors, which may include overflow charge and dark charge, needs to exceed the pre-determined quantity of charge. The voltage guard band can be configured such that it is unlikely that dark charge alone can cause the output of comparator 1102 to flip, which can reduce the likelihood of false detection of photodiode saturation due to dark current. A checking 1304 of the status of comparator 1102 output can be made at time T2, after the FD ADC measurement completes, to determine whether to assert FLAG_2 to lock the count value stored in the memory.

Figure 13B:
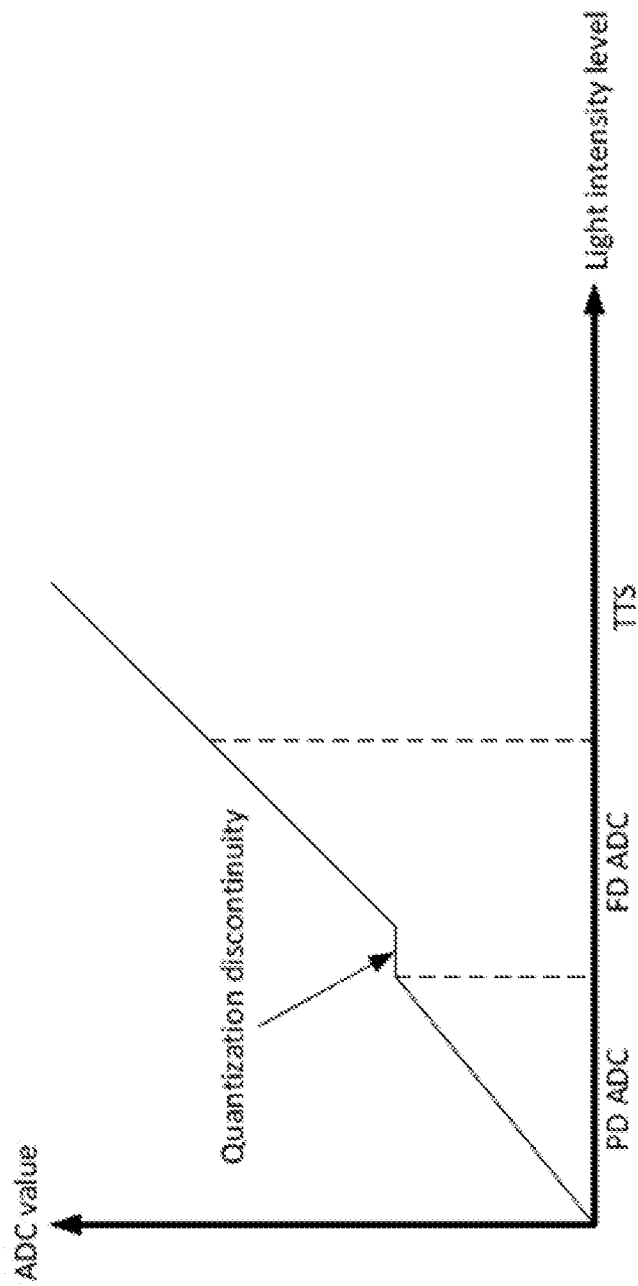

Although the arrangements in FIG. 13A can reduce the likelihood of false detection of photodiode saturation due to dark current, the voltage guard band $V_{DARK-FD}$ reduces the voltage range of the first ramping VREF, which also reduces the input voltage range for the quantization operation. An OF voltage that falls within the voltage guard band, and the corresponding quantity of overflow charge, will not be quantized, and a quantization gap may result as shown in FIG. 13B. The voltage guard band, as well as the resulting quantization gap, can be quite large to account for various sources of variations between pixels, such as random distribution of comparator offset variation, dark current variation, etc. In a case where the voltage guard band is configured to account for maximum comparator offset and maximum dark current, the voltage guard band can be so large that it can take up ⅛ of the input voltage range, and a large quantization gap can result. A large quantization gap can lead to significant increase in quantization noise and a large drop in the signal-to-noise ratio, especially for a light intensity range that crosses between the intensity ranges of FD ADC and PD ADC measurement operations.

Figure 14A:
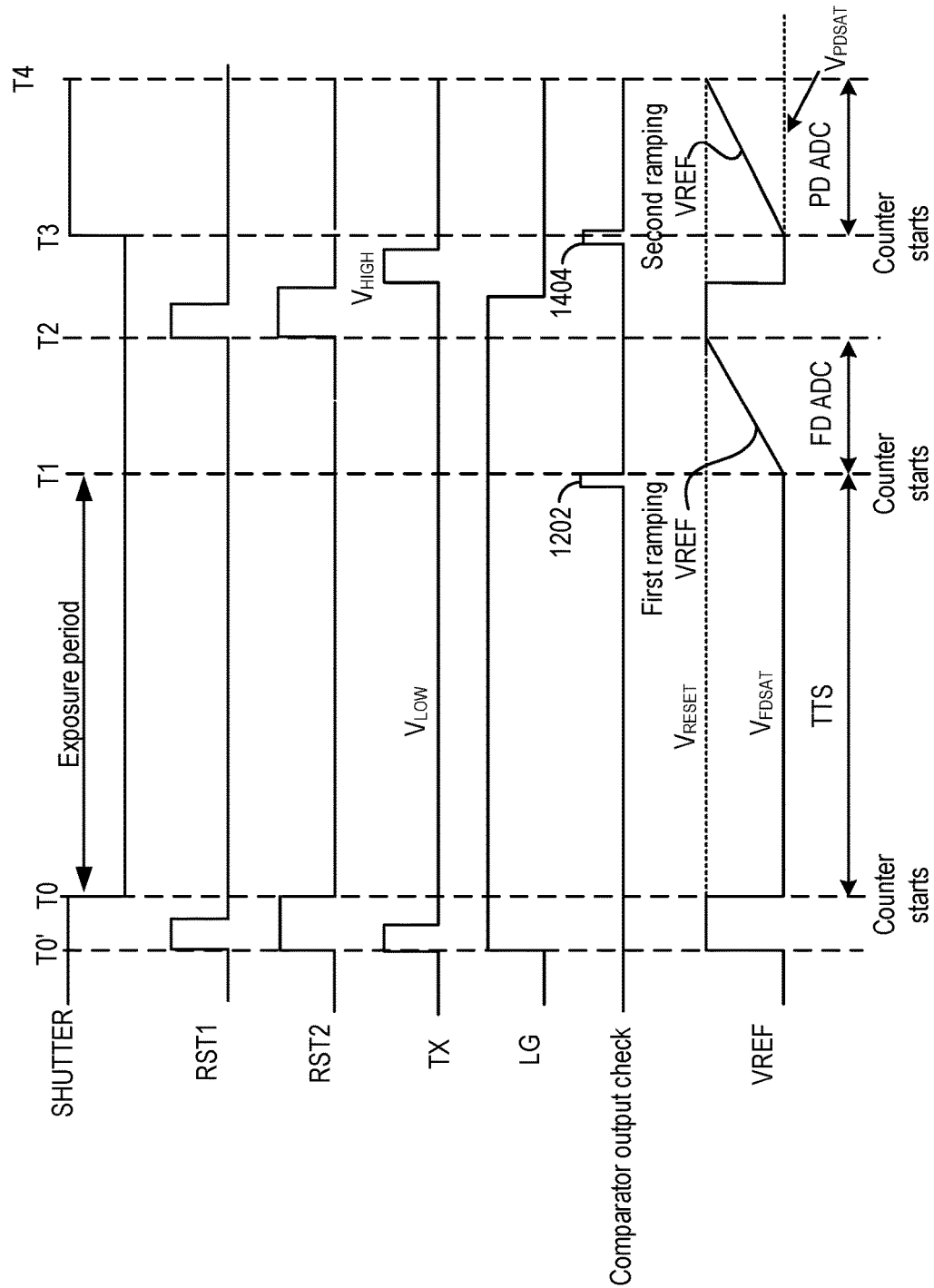
FIG. 14A and FIG. 14B illustrate another example sequence of control signals to perform light intensity measurement.

FIG. 14A illustrates an example sequence of control signals for pixel cell 1100 that can mitigate the effect of dark current on the detection of photodiode PD saturation while reducing the occurrence of quantization gap. Specifically, as shown in FIG. 14A, the detection of photodiode PD saturation can be performed at time T3 after CEXT is disconnected from the COF capacitor to reduce the capacitance of charge storage unit 608a and after residual charge is transferred to the COF capacitor for the subsequent PD ADC measurement operation. Specifically, at time T3, comparator 1102 compares the OF voltage against $V_{PDSAT}$ which, as described above, represents the voltage at the COF capacitor when it stores a quantity of residual charge that saturates the photodiode PD. If the residual charge stored in the COF capacitor is less than the saturation capacity of the photodiode PD, the voltage at the COF capacitor can be higher than $V_{PDSAT}$, and the output of comparator 1102 can remain low. On the other hand, if photodiode PD saturates, the residual charge stored in the COF capacitor equals the saturation capacity of the photodiode PD. The voltage at the COF capacitor can become lower than or equal to $V_{PDSAT}$, and the output of comparator 1102 can flip. A checking 1404 of the output of comparator 1102 can be made at time T3. If the output of comparator 1102 is positive at time T3, controller 1110 can assert FLAG_2 bit, otherwise FLAG_2 bit can become de-asserted, to either lock memory 810 or allow memory 810 to latch in the PD ADC output (if FLAG_1 bit is also low).

The arrangements of FIG. 14A can improve the robustness of the photodiode PD saturation detection against dark current, as the photodiode PD typically receives much less dark current than the floating drain node, therefore the dark charge accumulated by the photodiode PD during the exposure period (e.g., between T0 and T1) and present in the charge transferred from the photodiode PD is typically negligible and is less likely to cause false photodiode saturation detection. For example, as discussed above, at room temperature the total dark charge can be around 50 e− per pixel and per second, and with an exposure period of about 10 milliseconds, there is less than one dark electron per frame. Moreover, the time for transfer of the residual charge to the floating drain node (half of time period between T2 and T3) is relatively short compared with the exposure period, which can also reduce the dark charge accumulated by the floating drain node before the photodiode saturation detection. As a result, the dark charge present in the floating drain node (and in the COF capacitor) at the beginning of PD ADC can be significantly less than during FD ADC and is less likely to cause the output of comparator 1102 to flip when the photodiode PD does not saturate.

Figure 14B:
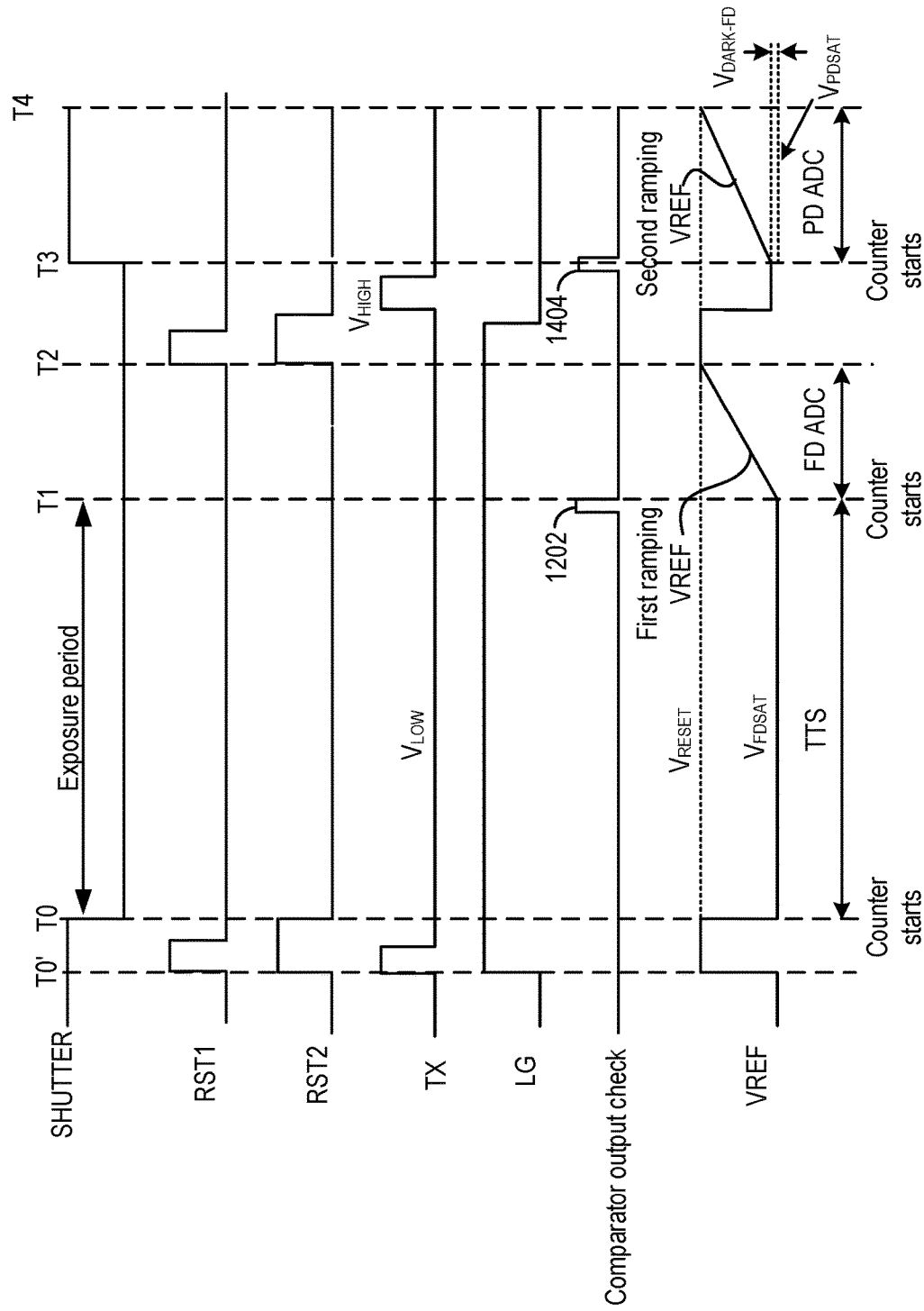

In some examples, as shown in FIG. 14B, a voltage guard band $V_{DARK-PD}$ can be added to $V_{PDSAT}$ such that the OF voltage is compared against a static threshold voltage of $V_{PDSAT}+V_{DARK-PD}$ for photodiode PD saturation detection. The second ramping VREF can start from $V_{PDSAT}+V_{DARK-PD}$ to $V_{RESET}$. Such arrangements can prevent false detection of photodiode saturation when, for example, the quantity of residual charge stored in the COF capacitor is slightly less than the saturation capacity of the photodiode PD, but due to the presence of the dark charge, the total charge at the COF capacitor exceeds the saturation capacity and the output of comparator 1102 flips. But the voltage guard band $V_{DARK-PD}$ can be made much smaller than the voltage guard band $V_{DARK-FD}$ of FIG. 13A because of the much lower expected quantity of dark charge (e.g., due to low dark current at the photodiode, short time of accumulation of additional dark charge at the floating drain node, etc.). As a result, the reduction in the input voltage range for the PD ADC operation due to the introduction of the $V_{DARK-PD}$ voltage guard band can be much less significant than in FIG. 13A and FIG. 13B, and the resulting quantization gap (if any) can be reduced as well.

In some examples, each of the TTS, FD ADC, and PD ADC measurements can be split into two or more sub-stages based on one or more breakpoints. Controller 1110 can check the output of comparator 1102 at those breakpoints and perform the detection of photodiode PD saturation (to select between FD ADC and PD ADC output) and the detection of charge storage unit saturation (to select between TTS output or FD ADC/PD ADC output) based on the statuses of output of comparator 1102 at those breakpoints. Such arrangements can introduce redundancy and improve the accuracy of the detection. Moreover, the counter can be reset at the beginning of each sub-stage, which shrinks the input voltage range and/or the range of time to be quantized. With the same number of bits of the counter, the counter can update at a higher frequency to measure the reduced range of time, which can reduce the quantization error.

Figure 15:
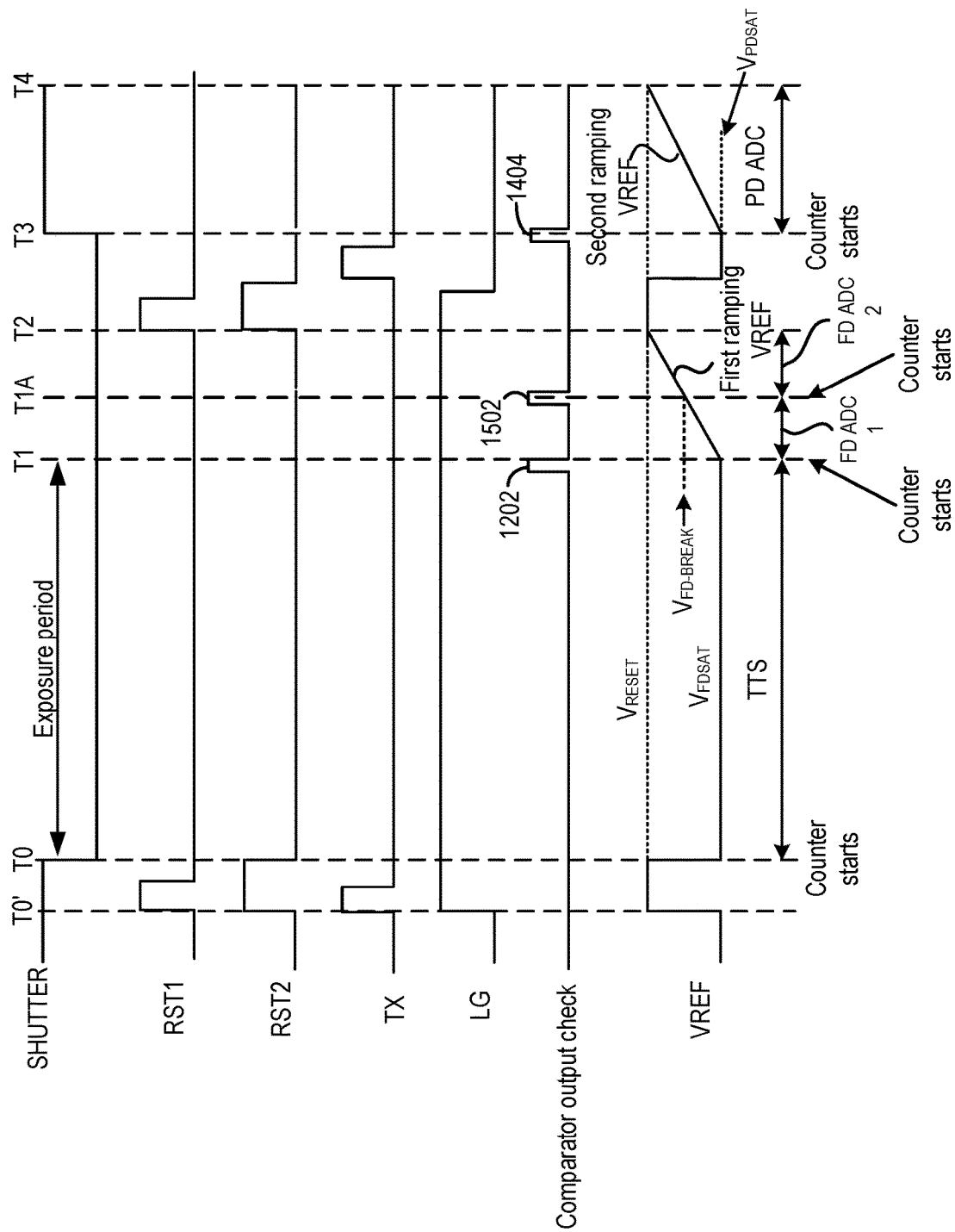
FIG. 15 illustrates another example sequence of control signals to perform light intensity measurement.

FIG. 15 illustrates an example of sequence of control signals for pixel cell 1100 having the FD ADC operation split into multiple sub-stages. As shown in FIG. 15, a voltage break point $V_{FD-BREAK}$, which corresponds to a voltage of the first ramping VREF at time T1A, can be set to split the FD ADC operation into FD ADC 1 and FD ADC 2 sub-stages. In some examples, $V_{FD-BREAK}$ can be configured as a voltage guard band based on a predetermined quantity of dark charge accumulated in the floating drain node (COF capacitor) during the exposure period.

At time T1, checking 1202 can be performed by controller 1110 to determine whether the output of comparator 1102 flips (and becomes positive) during TTS, which indicates charge storage unit 608a saturates. When the output of comparator 1102 flips during TTS, a count value from counter 808 can be stored in memory 810. Controller 1110 can assert FLAG_1 bit if charge storage unit 608a saturates to lock memory 810 and prevent the stored count value from being overwritten in subsequent FD ADC and PD ADC operations. Counter 808 can then be reset and start counting from an initial value after the TTS operation.

The FD ADC 1 sub-stage can occur between times T1 and T1A, in which comparator 1102 can compare the OF voltage with the first ramping VREF which ramps from $V_{FDSAT}$ to $V_{FD-BREAK}$. If the first ramping VREF crosses the OF voltage, comparator 1102 output can flip and a count value from counter 808 can be latched into memory 810, if FLAG_1 bit is not asserted from the TTS operation and memory 810 is not locked. If the first ramping VREF does not cross the OF voltage, comparator 1102 output can remain low and the stored count value in memory 810 (if any) is not updated.

At time T1A, controller 1110 can perform a checking 1502 of the output of comparator 1102 to determine whether the output of comparator 1102 is positive. The flipping of the output of comparator 1102 within the FD ADC 1 sub-stage can indicate that the OF voltage is below $V_{FD-BREAK}$, which can indicate that the charge stored in the floating drain node exceeds the pre-determined quantity of dark charge, and that the photodiode PD is likely to be saturated. Based on such an indication, controller 1110 can assert FLAG_2 bit. But as to be described below, controller 1110 will perform one more checking of the output of comparator 1102 before locking memory 810. Counter 808 can then be reset and start counting from an initial value after the FD ADC 1 operation completes.

The FD ADC 2 sub-stage can occur between times T1A and T2, in which comparator 1102 can compare the OF voltage with the first ramping VREF which continues the ramping from $V_{FD-BREAK}$ to $V_{RESET}$. If the first ramping VREF crosses the OF voltage, comparator 1102 output can flip and a count value from counter 808 can be latched into memory 810 if neither FLAG_1 nor FLAG_2 bit is asserted. If the first ramping VREF does not cross the OF voltage, comparator 1102 output can remain low and the stored count value in memory 810 (if any) is not updated. FD ADC 2 sub-stage can complete at time T2.

Between times T2 and T3, as described above with respect to FIG. 12, both COF and CEXT capacitors can be reset, and CEXT capacitor can be disconnected from the COF capacitor. Residual charge can be transferred from the photodiode PD to COF capacitor. The OF voltage can be compared against a static threshold $V_{PDSAT}$ (as shown in FIG. 13A) or $V_{PDSAT}+V_{DARK-PD}$ (as shown in FIG. 14B) to determine whether the quantity of residual charge exceeds the saturation capacity of the photodiode PD. The flipping of the output of comparator 1102, which indicates that the OF voltage is below the static threshold, can indicate the photodiode PD is saturated. Controller 1110 can perform checking 1404 at time T3 of the output of comparator 1102. If the output of comparator 1102 is positive at time T3, and if FLAG_1 bit is not asserted from checking 1202 at time T1, controller 1110 can assert FLAG_1 bit. The assertion of both the FLAG_1 and FLAG_2 bits can indicate that the photodiode PD saturates and the stored value in memory 810 is to be locked and not to be overwritten by the subsequent PD ADC output. On the other hand, if both FLAG_1 and FLAG_2 bits remain de-asserted, the subsequent PD ADC output can be stored into memory 810 to represent a measurement of the intensity of incident light.

The following Table 1 provides an example of mapping among the FLAG_1 and FLAG_2 values and which measurement operation stores the count value in memory 810 for the arrangements of FIG. 15:

TABLE 1

| FLAG_1 | FLAG_2 | Which measurement operation stores the count value in memory 810 |
|---|---|---|
| 1 | 0 | TTS |
| 0 | 1 | FD ADC 1 |
| 1 | 1 | FD ADC 2 |
| 0 | 0 | PD ADC |

In the arrangements of FIG. 15, the determination of whether the photodiode saturates can be based on both the measurement of overflow charge (checking 1502 at time T1A) and the measurement of residual charge (checking 1404), which can add redundancy and improve the robustness of the photodiode saturation detection. Moreover, as counter 808 is reset at time T1A, the input voltage range to be represented by the count values of counter 808 is shrunk, which allows counter 808 to update count values at a higher frequency (e.g., by operating with a faster clock) to reduce the quantization step and to improve the quantization resolution of the FD ADC operation, while the bit width of counter 808 (and the associated hardware circuits) needs not be expanded to support the improved quantization resolution.

Figure 16:
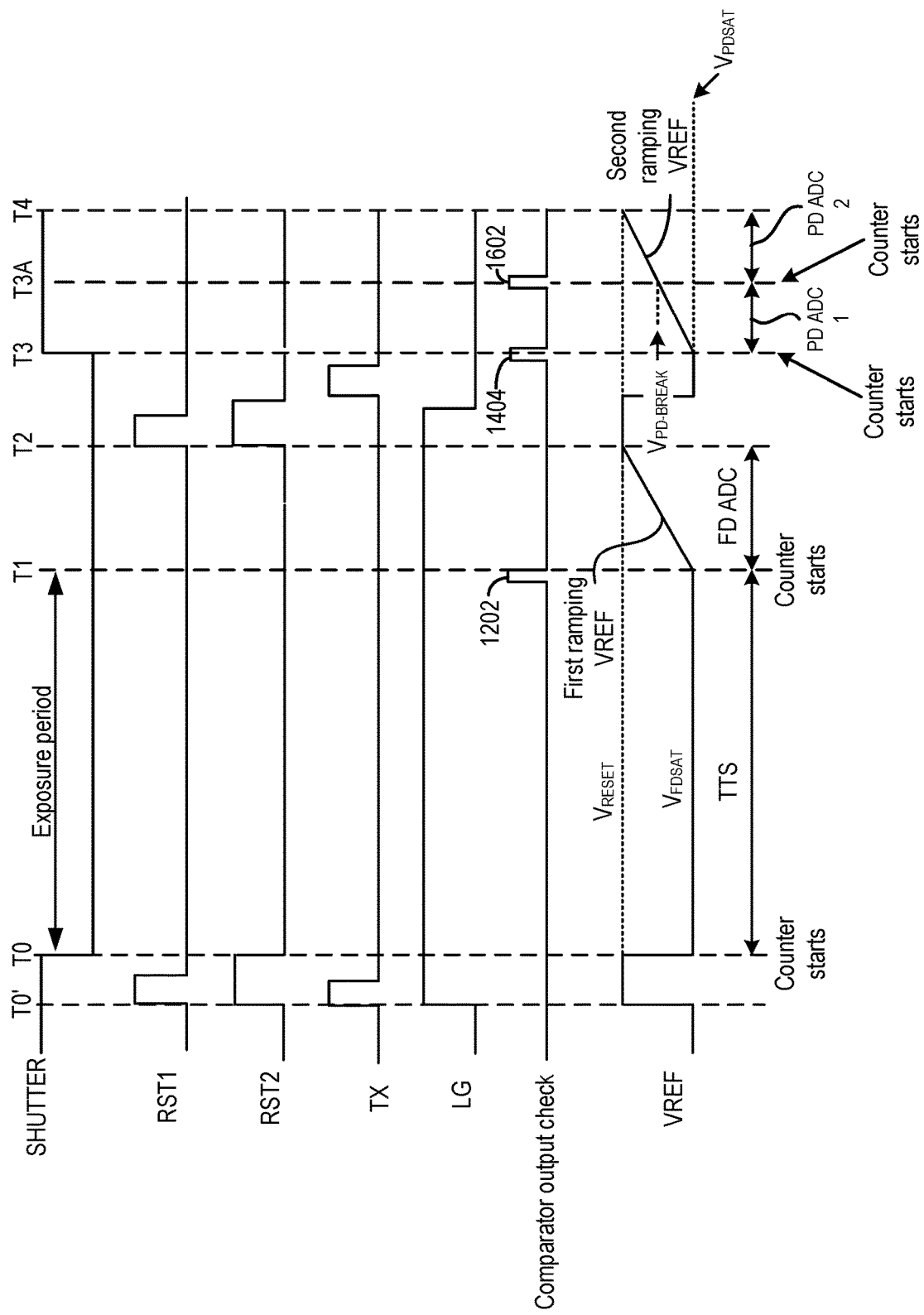
FIG. 16 illustrates another example sequence of control signals to perform light intensity measurement.

In addition, both the PD ADC and TTS measurement operations can also be split into multiple sub-stages, with counter 808 reset at the beginning of each sub-stage to improve quantization resolution. As shown in FIG. 16, a voltage break point $V_{PD-BREAK}$, which corresponds to a voltage of the second ramping VREF at time T3A, can be set to split the PD ADC operation into PD ADC 1 and PD ADC 2 sub-stages. A first input voltage range for PD ADC 1 can be from $V_{PDSAT}$ (as shown in FIG. 13A) or $V_{PDSAT}+V_{DARK-PD}$ (as shown in FIG. 14B) to $V_{PD-BREAK}$, whereas a second input voltage range for PD ADC 2 can be from $V_{PD-BREAK}$ to $V_{RESET}$.

At time T3, counter 808 can be reset and start counting from an initial value. The PD ADC 1 sub-stage can occur between times T3 and T3A, in which comparator 1102 can compare the OF voltage with the second ramping VREF which ramps from $V_{PDSAT}$ or $V_{PDSAT}+V_{DARK-PD}$ to $V_{PD-BREAK}$. If the second ramping VREF crosses the OF voltage, comparator 1102 output can flip and a count value from counter 808 can be latched into memory 810, if neither FLAG_1 bit nor FLAG_2 bit is asserted. If the first ramping VREF does not cross the OF voltage, comparator 1102 output can remain low and the stored count value in memory 810 (if any) is not updated.

At time T3A, controller 1110 can perform a checking 1602 of the output of comparator 1102 to determine whether PD ADC 1 output is stored into memory 810. If the output of comparator 1102 is positive, controller 1110 can assert both FLAG_1 bit and FLAG_2 bit (if neither has been asserted at this point) to prevent memory 810 from being overwritten with the output of PD ADC 2. Counter 808 can then be reset and start counting from an initial value after the PD ADC 1 operation completes.

The PD ADC 2 sub-stage can occur between times T3A and T4, in which comparator 1102 can compare the OF voltage with the second ramping VREF which continues the ramping from $V_{PD-BREAK}$ to $V_{RESET}$. If the second ramping VREF crosses the OF voltage, comparator 1102 output can flip and a count value from counter 808 can be latched into memory 810 if neither FLAG_1 nor FLAG_2 bit is asserted.

The following Table 2 provides an example of mapping among the FLAG_1 and FLAG_2 values and which measurement operation stores the count value in memory 810 for the arrangements of FIG. 16:

TABLE 2

| FLAG_1 | FLAG_2 | Which measurement operation stores the count value in memory 810 |
|---|---|---|
| 1 | 0 | TTS |
| 0 | 1 | FD ADC |
| 1 | 1 | PD ADC 1 |
| 0 | 0 | PD ADC 2 |

In the arrangements of FIG. 16, $V_{PD-BREAK}$ can be configured based on various criteria, such as an expected quantity of residual charge, to maximize the quantization resolution. For example, based on an application and/or an operation condition, it can be determined that the average quantity of residual charge is closer to the saturation capacity of the photodiode PD (represented by $V_{PDSAT}$). In such cases, $V_{PD-BREAK}$ can be set closer to $V_{PDSAT}$ than to $V_{RESET}$ to reduce the first input voltage range and to improve the quantization resolution of the first input voltage range. In some examples, $V_{PD-BREAK}$ can also be set at the midpoint between $V_{FDSAT}$ and $V_{RESET}$.

Figure 17:
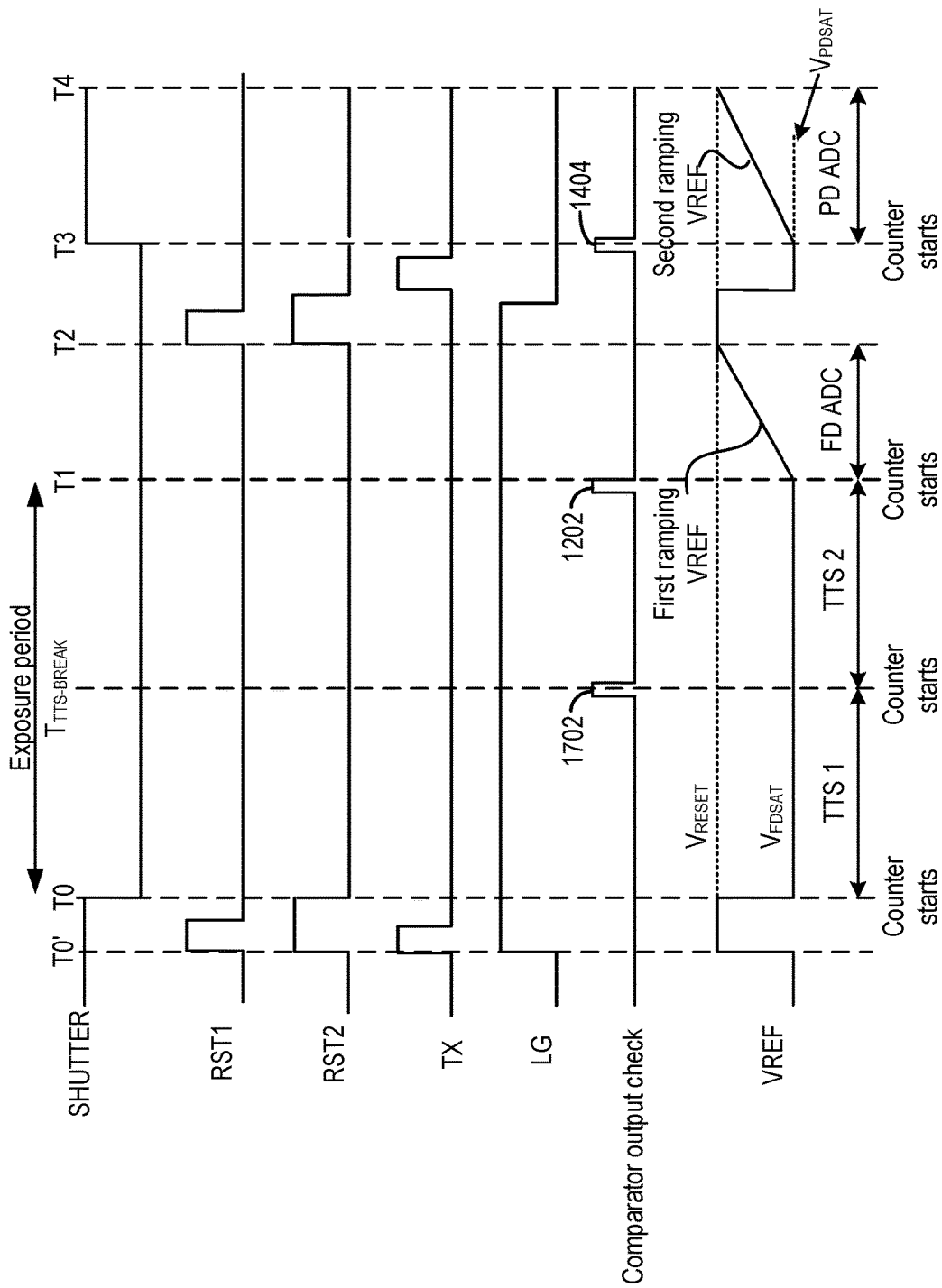
FIG. 17 illustrates another example sequence of control signals to perform light intensity measurement.

FIG. 17 illustrates an example of sequence of control signals for pixel cell 1100 having the FD ADC operation split into multiple sub-stages. As shown in FIG. 17, a time break point $T_{TTS-BREAK}$ can be set between times T0 and T1 to split the TTS operation into TTS 1 and TTS 2 sub-stages. Counter 808 can be reset and start counting from an initial value at time T0, and comparator 1102 can compare the OF voltage against the static threshold $V_{FDSAT}$. If the OF voltage is below $V_{FDSAT}$, which indicates that charge storage unit 608a saturates, the output of comparator 1102 flips (from negative to positive), a count value from counter 808 can be latched into memory 810. If the OF voltage does not go below $V_{FDSAT}$, comparator 1102 output can remain low and no value is stored into memory 810.

At time $T_{PD-BREAK}$, controller 1110 can perform a checking 1702 of the output of comparator 1102. If the output of comparator 1102 is positive at time $T_{TTS-BREAK}$, controller 1110 can assert the FLAG_1 bit to prevent subsequent TTS 2, FD ADC, and PD ADC operations. If the output of comparator 1102 remains negative (no flipping), FLAG_1 bit will not be asserted at $T_{TTS-BREAK}$. Counter 808 can also be reset and start counting from an initial value at time $T_{PD-BREAK}$. Between times $T_{TTS-BREAK}$ and T1, comparator 1102 can compare the OF voltage against the static threshold $V_{FDSAT}$. If the OF voltage is below $V_{FDSAT}$, which indicates that charge storage unit 608a saturates, the output of comparator 1102 flips (from negative to positive), a count value from counter 808 can be latched into memory 810. If the OF voltage does not go below $V_{FDSAT}$, comparator 1102 output can remain low and no value is stored into memory 810.

At time T1, controller 1110 can perform checking 1202 of the output of comparator 1102. If the output of comparator 1102 is positive at time T1, controller 1110 can assert the FLAG_1 bit (if FLAG_1 bit is not asserted at time $T_{TTS-BREAK}$) and the FLAG_2 bit. If the output of comparator 1102 remains negative, FLAG_1 bit and FLAG_2 bit will remain de-asserted, which allows one of the subsequent FD ADC or PD ADC operations to store a count value into memory 810.

The following Table 2 provides an example of mapping among the FLAG_1 and FLAG_2 values and which measurement operation stores the count value in memory 810 for the arrangements of FIG. 17:

TABLE 3

| FLAG_1 | FLAG_2 | Which measurement operation stores the count value in memory 810 |
|---|---|---|
| 1 | 0 | TTS 1 |
| 1 | 1 | TTS 2 |
| 0 | 1 | FD ADC |
| 0 | 0 | PD ADC |

In the arrangements of FIG. 17, $T_{TTS-BREAK}$ can be configured based on various criteria, such as an expected incident light intensity, to maximize the quantization resolution. For example, based on an application and/or an operation condition, it can be determined that the average incident light intensity is such that the time-to-saturation is closer to T0 and within the time period of TTS 1. In such cases, $T_{TTS-BREAK}$ can be set closer to T0 than to T1 to improve the quantization resolution of TTS 1. In some examples, $T_{TTS-BREAK}$ can also be set at the midpoint between T0 and T1.

Although each of FIG. 15-FIG. 17 illustrates either TTS, FD ADC, or PD ADC operation is split, it is understood that they can all be split into multiple sub-stages in the same multi-mode measurement operations.

Figure 18:
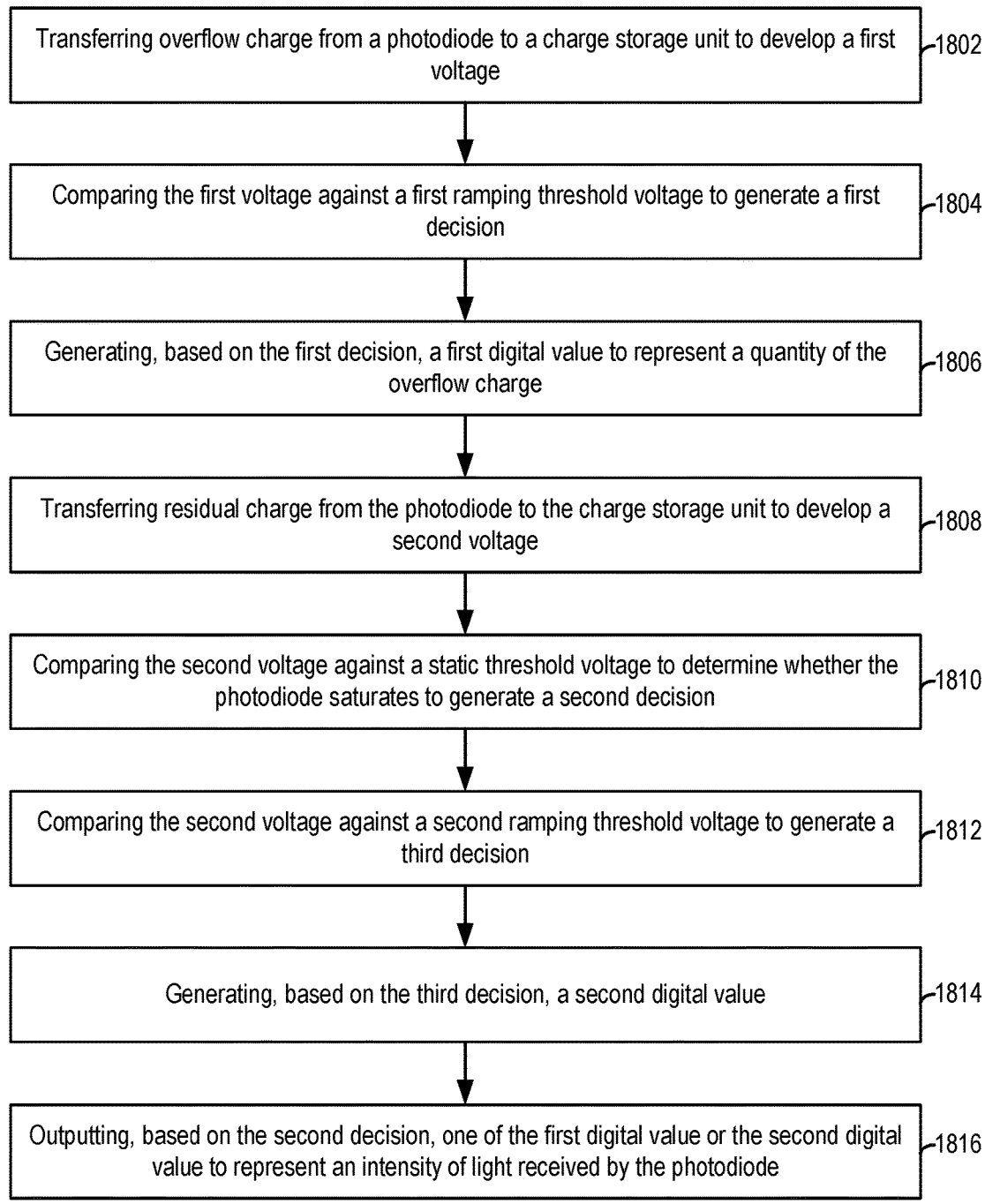
FIG. 18 illustrates a flowchart of an example process for measuring light intensity.

FIG. 18 illustrates a flowchart of an example method 1800 of measuring light intensity. The method can be performed by a processing circuits of pixel cell 1100 comprising, for example, M0, M1, M2, and M6 switches, charge storage unit 608a, comparator 1102, controller 1110, etc.

In step 1802, overflow charge can be transferred from the photodiode PD to charge storage unit 608a to develop a first voltage. The transfer can occur during the exposure period when the photodiode PD generates charge in response to incident light. The photodiode PD may store part of the charge as residual charge, and transfer, via M0 switch, the rest of the charge as overflow charge to charge storage unit 608a if the photodiode PD saturates.

In step 1804, comparator 1102 can compare the first voltage against a first ramping threshold voltage to generate a first decision. The first decision can indicate whether the first voltage crosses the first ramping threshold voltage.

In step 1806, based on the first decision, a first digital value can be generated to represent a quantity of the overflow charge. In some examples, a free running counter can start counting and generating count values at a starting point of the first ramping threshold voltage, and a first count value generated by the counter at the time when the first decision is generated can be stored in a memory. The first count value can be the first digital value.

In step 1808, residual charge can be transferred from the photodiode to the charge storage unit to develop a second voltage. The charge storage unit can be reset to remove the overflow charge prior to the transfer. The capacitance of the charge storage unit can be reduced (e.g., by disconnecting CEXT from COF) to increase the charge-to-voltage conversion rate.

In step 1810, comparator 1102 can compare the second voltage against a static threshold voltage to determine whether the photodiode saturates to generate a second decision. The static threshold voltage can represent a voltage at the COF capacitor when it stores a quantity of residual charge that saturates the photodiode PD, such as $V_{PDSAT}$. In some examples, the static threshold voltage can be offset by a dark current voltage $V_{DARK-PD}$ which can represent a total quantity of dark charge deposited by the dark current at the photodiode PD (during the exposure period) and at the floating drain node (during the transfer of the residual charge). In some examples, if the second decision indicates that the photodiode PD saturates, controller 1110 can assert a signal (e.g., FLAG_2 bit) to lock memory 810.

In step 1812, comparator 1102 can compare the second voltage against a second ramping threshold voltage to generate a third decision. The third decision can indicate whether the second voltage crosses the second ramping threshold voltage.

In step 1814, comparator 1102 can generate a second digital value based on the third decision. For example, a second count value from counter 808 at the time when the third decision is generated can be the second digital value.

In step 1816, controller 1110 can output, based on the second decision, one of the first digital value or the second digital value to represent an intensity of the light. In some examples, the memory is locked based on the second decision in step 1810, which prevents the memory from storing the second digital value, and the first digital value is output from the memory. In some examples, both the first digital value and the second digital value are stored in the memory, and controller 1110 can select one of the first digital value or the second digital value from the memory for outputting based on the second decision.

Figure 19:
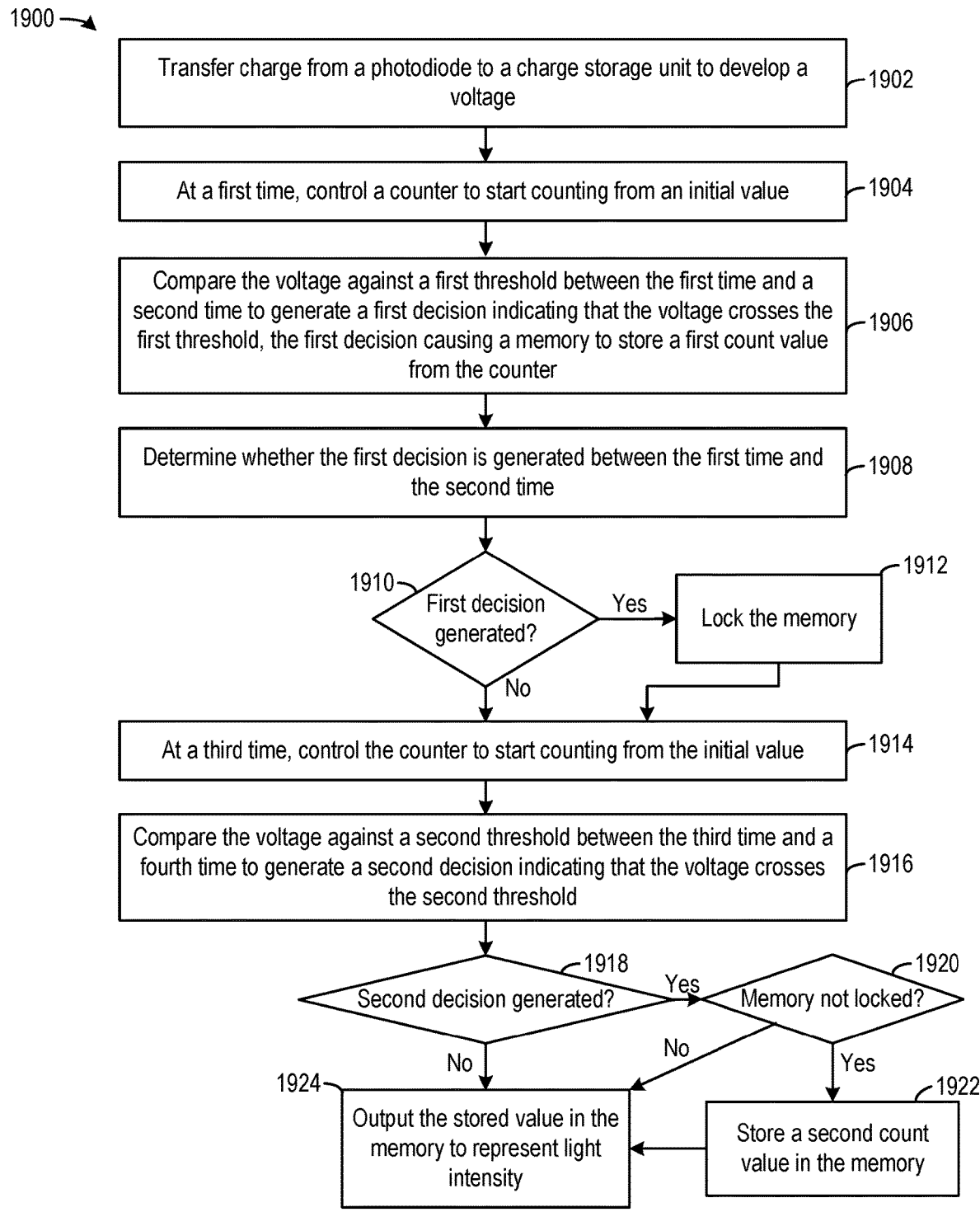
FIG. 19 illustrates a flowchart of another example process for measuring light intensity.

FIG. 19 illustrates a flowchart of an example method 1800 of measuring light intensity. The method can be performed by a processing circuits of pixel cell 1100 comprising, for example, M0, M1, M2, and M6 switches, charge storage unit 608a, comparator 1102, controller 1110, etc.

In step 1902, charge can be transferred from the photodiode PD to charge storage unit 608a to develop a first voltage. The charge can be overflow charge for the TTS or FD ADC measurements, or residual charge for the PD ADC measurement.

In step 1904, at a first time, controller 1110 can control a counter (e.g., counter 808) to start counting from an initial value. Step 1904 can be performed by resetting the counter followed by releasing the reset. Step 1904 can be performed at the beginning of charge transfer of step 1902 (e.g., for TTS), in the middle of the charge transfer (e.g., for FD ADC), or after the charge transfer completes (e.g., for PD ADC).

In step 1906, comparator 1102 can compare the voltage against a first threshold between the first time and a second time to generate a first decision. The second time can correspond to a voltage breakpoint (for FD ADC and PD ADC) or a time breakpoint (for TTS). The first threshold can be a static threshold voltage (for TTS) or a ramping threshold voltage (for FD ADC and PD ADC) that ends at the voltage breakpoint. A first count value from the counter can be stored into the memory at the time when the first decision is generated.

In step 1908, controller 1110 can determine whether the first decision is generated between the first time and the second time. If the first decision is generated (in step 1910), controller 1110 can proceed to step 1912 to lock the memory to prevent the first count value stored in the memory from being overwritten.

If the first decision is not generated (in step 1910), or after the memory is locked (in step 1912, controller 1110 can proceed to step 1914. In step 1914, at a third time, controller 1110 can control the counter to start counting from an initial value. Similar to step 1904, step 1914 can be performed by resetting the counter followed by releasing the reset. Step 1914 can be performed at the beginning of charge transfer of step 1902 (e.g., for TTS), in the middle of the charge transfer (e.g., for FD ADC), or after the charge transfer completes (e.g., for PD ADC).

In step 1916, comparator 1102 can compare the voltage against a second threshold between the third time and a fourth time to generate a second decision indicating that the voltage crosses the second threshold. The second threshold can be the same static threshold voltage as in step 1906 (for TTS) or part of the ramping threshold voltage (for FD ADC and PD ADC) starting from the voltage breakpoint.

If the second decision is generated (in step 1918), and if the memory is not locked (in step 1920), a second count value generated by the counter when the second decision is generated can be stored into the memory, in step 1922. But if the second decision is not generated (in step 1918), or if the memory is locked (in step 1920), the first count value stored in the memory can be maintained. The count value stored in the memory (first count value or second count value) can be output to represent light intensity, in step 1924

The foregoing description of the examples of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:
1. An apparatus comprising:
a photodiode;
a charge storage unit; and
a processing circuits configured to:
  transfer overflow charge from the photodiode to the charge storage unit to develop a first voltage;

compare the first voltage against a first ramping threshold voltage to generate a first decision;
generate, based on the first decision, a first digital value;
transfer residual charge from the photodiode to the charge storage unit to develop a second voltage;
compare the second voltage against a static threshold voltage to determine whether the photodiode saturates to generate a second decision, wherein the static threshold voltage is based on a quantity of the residual charge equal to a saturation capacity of the photodiode;
compare the second voltage against a second ramping threshold voltage to generate a third decision;
generate, based on the third decision, a second digital value; and
output, based on the second decision, one of the first digital value or the second digital value to represent an intensity of light received by the photodiode.

2. The apparatus of claim 1, wherein the static threshold voltage is further based on a voltage offset representing a dark charge deposited by dark current.

3. The apparatus of claim 2, wherein the second ramping threshold voltage starts or ends from the static threshold voltage.

4. The apparatus of claim 1, further comprising:
a counter; and
a memory;
wherein the processing circuits are configured to:
store, based on the first decision and the third decision, at least one of a first count value from the counter as the first digital value or a second count value from the counter as the second digital value in the memory; and
output the stored digital value in the memory to represent the intensity of light received by the photodiode.

5. The apparatus of claim 4, wherein the processing circuits are configured to overwrite the first count value with the second count value in the memory based on the second decision.

6. The apparatus of claim 4, further comprising a register;
wherein the processing circuits are configured to:
store a first flag value indicating the second decision in the register; and
output, from the memory, one of the first digital value or the second digital value based on the first flag value from the register.

7. The apparatus of claim 6, wherein the processing circuits are configured to:
determine a status of the first decision when the first ramping threshold voltage reaches a first breakpoint voltage;
store a second flag value indicating the status of the first decision in the register; and
output, from the memory, the one of the first digital value or the second digital value based on the first flag value and the second flag value from the register.

8. The apparatus of claim 7, wherein the processing circuits are configured to reset the counter when the first ramping threshold voltage reaches the first breakpoint voltage.

9. The apparatus of claim 6, wherein the processing circuits are configured to:
determine a status of the third decision when the second ramping threshold voltage reaches a second breakpoint voltage;
store a second flag value indicating the status of the third decision in the register; and
output, from the memory, the one of the first digital value or the second digital value based on the first flag value and the second flag value from the register.

10. The apparatus of claim 9, wherein the processing circuits are configured to reset the counter when the second ramping threshold voltage reaches the second breakpoint voltage.

11. The apparatus of claim 6, wherein the static threshold voltage is a first static threshold voltage; and
wherein the processing circuits are configured to:
compare the first voltage against a second static threshold voltage representing a saturation capacity of the charge storage unit to generate a fourth decision;
store a second flag value indicating the fourth decision in the register;
store, based on the fourth decision, a third count value from the counter as a third digital value, the first digital value, or the second digital value in the memory; and
output, based on the first flag value and the second flag value, one of the first digital value, the second digital value or the third digital value from the memory to represent the intensity of light received by the photodiode.

12. The apparatus of claim 11, wherein the processing circuits are configured to:
compare the first voltage against the second static threshold voltage within a pre-determined time period;
determine a first status of the fourth decision when a pre-determined portion of the time period has elapsed;
store the first flag value indicating the first status of the fourth decision in the register;
determine a second status of the fourth decision when the time period has elapsed;
store the second flag value indicating the second status of the fourth decision in the register; and
output, based on the first flag value and the second flag value, one of the first digital value, the second digital value or the third digital value from the memory to represent the intensity of light received by the photodiode.

13. The apparatus of claim 12, wherein the processing circuits are configured to reset the counter when the pre-determined portion of the time period has elapsed.

14. The apparatus of claim 1, wherein a charge storage capacity of the charge storage unit is configurable by the processing circuit;
wherein the processing circuits are configured to:
configure the charge storage unit to have a first capacity to develop the first voltage; and
configure the charge storage unit to have a second capacity smaller than the first capacity to develop the second voltage.

15. The apparatus of claim 14, wherein the charge storage unit comprises a floating drain node and a capacitor.

16. The apparatus of claim 1, wherein the first digital value and the second digital value are generated from a counter; and
wherein the counter is reset based on at least one of: the first ramping threshold voltage reaching a first voltage break point, or the second ramping threshold voltage reaching a second voltage break point.

17. A method comprising:
transferring overflow charge from a photodiode to a charge storage unit to develop a first voltage;
comparing the first voltage against a first ramping threshold voltage to generate a first decision;
generating, based on the first decision, a first digital value;

transferring residual charge from the photodiode to the charge storage unit to develop a second voltage;

comparing the second voltage against a static threshold voltage to determine whether the photodiode saturates to generate a second decision, wherein the static threshold voltage is based on a quantity of the residual charge equal to a saturation capacity of the photodiode;

comparing the second voltage against a second ramping threshold voltage to generate a third decision;

generating, based on the third decision, a second digital value; and outputting, based on the second decision, one of the first digital value or the second digital value to represent an intensity of light received by the photodiode.

18. The method of claim 17, wherein the static threshold voltage is a voltage offset representing a dark charge deposited by dark current.

19. The method of claim 17, wherein the second ramping threshold voltage starts or ends from the static threshold voltage.

20. The method of claim 17, further comprising:
storing, based on the first decision, a first count value from a counter in a memory as the first digital value;
storing, based on the third decision, a second count value from the counter in the memory as the second digital value; and
outputting, from the memory, one of the first digital value or the second digital value based on the second decision.

21. An apparatus, comprising:
a photodiode;
a charge storage unit; and
a processing circuit configured to:
transfer overflow charge from the photodiode to the charge storage unit to develop a first voltage;
perform a first quantization operation to generate a first digital value;
perform a second quantization operation to generate a second digital value; and
output one of the first digital value or the second digital value to represent an intensity of light received by the photodiode,
wherein the first quantization operation comprises:
comparing the first voltage against a first ramping threshold voltage to generate a first decision; and
generating, based on the first decision, a first digital value from a counter;
wherein the second quantization operation comprises:
transferring residual charge from the photodiode to the charge storage unit to develop a second voltage;
comparing the second voltage against a second ramping threshold voltage to generate a second decision; and
generating, based on the second decision, a second digital value from the counter;
and
wherein the counter is reset based on at least one of: the first ramping threshold voltage reaching a first voltage break point during the first quantization operation, or the second ramping threshold voltage reaching a second voltage break point during the second quantization operation.

22. The apparatus of claim 21, wherein the processing circuit is configured to output one of the first digital value or the second digital value based on at least one of the first decision or the second decision.

23. The apparatus of claim 21, wherein the process circuit is configured to compare the second voltage against a second static threshold voltage to generate a third decision indicating whether the photodiode is saturated by the residual charge; and
output, based on the third decision, one of the first digital value or the second digital value to represent an intensity of light received by the photodiode.

24. The apparatus of claim 21, wherein the processing circuit is configured to:
perform a third quantization operation comprising:
comparing the first voltage against a first static threshold voltage to generate a fourth decision; and
generating, based on the fourth decision, a third digital value from the counter; and
output one of the first digital value, the second digital value, or the third digital value to represent the intensity of light received by the photodiode; and
wherein the counter is reset based on at least one of: the first ramping threshold voltage reaching a first voltage break point during the first quantization operation, the second ramping threshold voltage reaching a second voltage break point during the second quantization operation, or a time break point is reached during the third quantization operation.

* * * * *